(12) United States Patent
Wada et al.

(10) Patent No.: US 7,196,780 B2
(45) Date of Patent: Mar. 27, 2007

(54) VELOCIMETER, DISPLACEMENT METER, VIBROMETER AND ELECTRONIC DEVICE

(75) Inventors: Hideo Wada, Kitakatsuragi-gun (JP); Hisakazu Sugiyama, Takarazuka (JP); Takayuki Taminaga, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 10/913,506

(22) Filed: Aug. 9, 2004

(65) Prior Publication Data

US 2005/0030520 A1 Feb. 10, 2005

(30) Foreign Application Priority Data

| Aug. 8, 2003 | (JP) | .................. P2003-290922 |
| Sep. 22, 2003 | (JP) | .................. P2003-329907 |
| Sep. 22, 2003 | (JP) | .................. P2003-329917 |
| Nov. 6, 2003 | (JP) | .................. P2003-376844 |

(51) Int. Cl.
*G01P 3/36* (2006.01)
*G01B 9/02* (2006.01)

(52) U.S. Cl. ..................... 356/28.5; 356/499

(58) Field of Classification Search ............... 356/28.5, 356/487, 488, 499
See application file for complete search history.

(56) References Cited

U.S. PATENT DOCUMENTS

| 5,327,222 A | 7/1994 | Takamiya et al. |
| 5,640,239 A | 6/1997 | Takamiya et al. |
| 6,362,876 B1 | 3/2002 | Lai |

FOREIGN PATENT DOCUMENTS

| JP | 3-235060 | 10/1991 |
| JP | 4-204104 | 7/1992 |
| JP | 8-15435 | 1/1996 |

*Primary Examiner*—Gregory J. Toatley, Jr.
*Assistant Examiner*—Marissa J. Detschel
(74) *Attorney, Agent, or Firm*—Nixon & Vanderhye P.C.

(57) ABSTRACT

A first luminous flux emitted from the front end face of a LD is reflected by a mirror to be made incident on a detection point on the surface of a measuring object, and a second luminous flux emitted from the rear end face of the LD is reflected by another mirror to be made incident on the detection point. Scattered light from the first detection point is received in a photodiode. A signal processing circuit part calculates the frequency shift quantity of the scattered light based on output from the photodiode. As a result, a velocimeter is provided which detects the moving speed of a measuring object highly precisely.

89 Claims, 19 Drawing Sheets

V : MOVING SPEED

BEAT SIGNAL

DC NOISE          DC NOISE

SHIFT

V : MOVING SPEED

V : MOVING SPEED

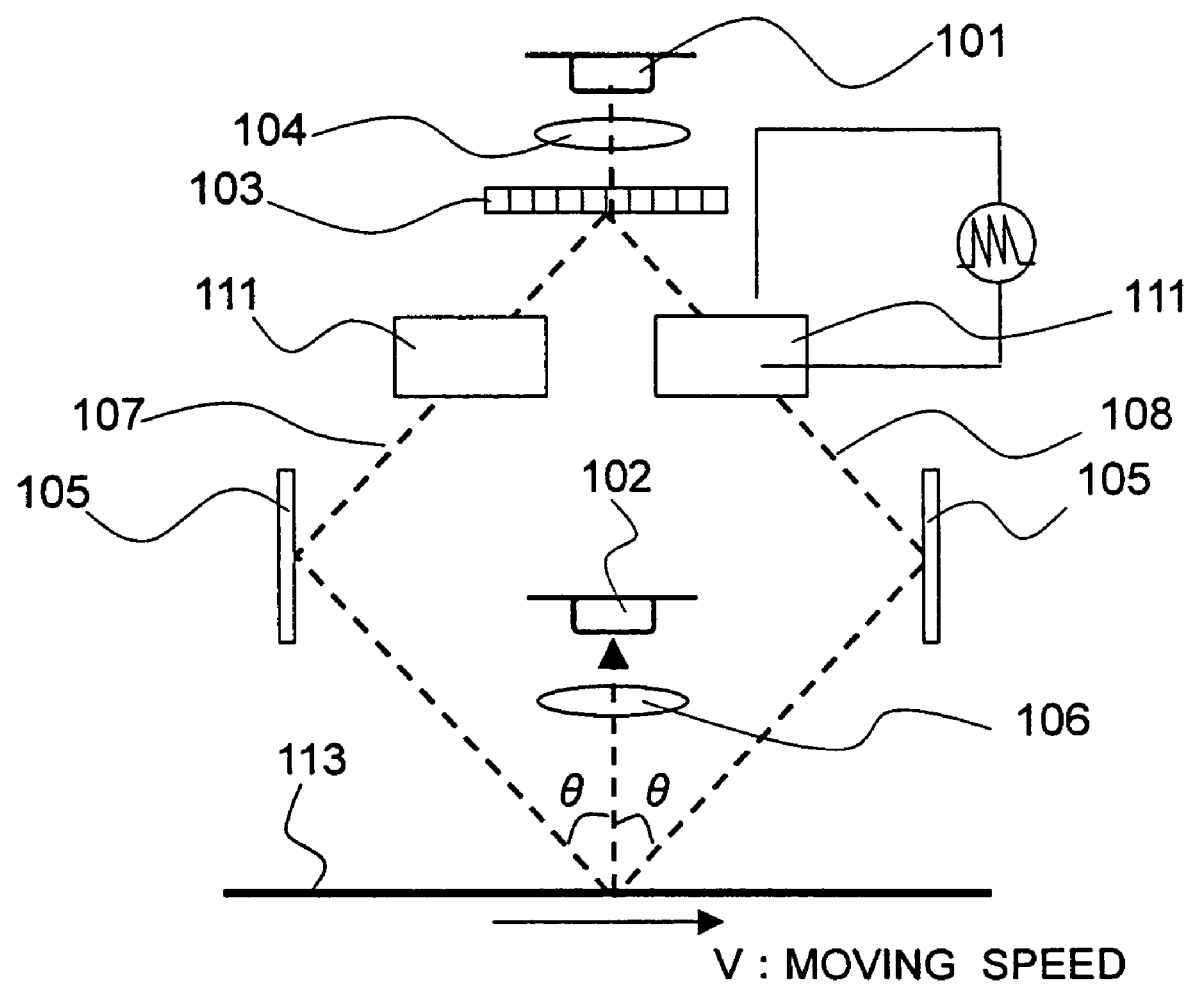

VELOCIMETER, DISPLACEMENT METER, VIBROMETER AND ELECTRONIC DEVICE

This application claims priority to JP Application No. 2003-290922, filed 08 Aug. 2003, JP Application No. 2003-329907, filed 22 Sep. 2003, JP Application No. 2003-329917, filed 22 Sep. 2003 and JP Application No. 2003-376844, filed 06 Nov. 2003. The entire contents of these applications are incorporated herein by reference.

BACKGROUND OF THE INVENTION

The present invention relates to a velocimeter which irradiates laser light onto a moving measuring object and receives scattered light from the measuring object and measures an optical frequency shift quantity corresponding to the moving speed of the measuring object so as to detect the speed of the measuring object.

As a general rule, when a light source and an observer move relative to each other, light is subjected to frequency changes by the Doppler effect. The laser Doppler velocimeter (hereinafter, referred to as LDV) uses this effect to measure the moving speed of a measuring object by irradiating laser light onto the object and measuring a Doppler frequency shift of the scattered light derived from the measuring object. This laser Doppler velocimeter, which was disclosed by Yeh and Cummins in 1964 (Appl. Phys. Lett. 4–10 (1964) 176), is widely known and is in practical use today.

FIG. 15 shows an optical system diagram of a conventionally typical LDV.

In FIG. 15, 101 denotes a laser diode (hereinafter, referred to as LD) as a semiconductor laser, 102 denotes a photodiode as a photodetector (hereinafter, referred to as PD), 103 denotes a diffraction grating, 104 denotes a collimator lens (hereinafter, referred to as CL), 105 denotes a mirror, 106 denotes a condenser lens, 107 denotes a first luminous flux of +first order diffracted light by the diffraction grating 103, 108 denotes a second luminous flux of –first order diffracted light by the diffraction grating 103, and 113 denotes a measuring object.

In the optical system as constituted above, laser light emitted from the LD 101 is converted by the CL 104 into a parallel luminous flux, and then is split into ±first order diffracted lights at a diffraction angle of θ by the diffraction grating 103 to become the first luminous flux 107 and the second luminous flux 108. The first luminous flux 107 and the second luminous flux 108 are respectively reflected by the mirror 105 and are then made incident on the surface of the measuring object 113 at an incident angle of θ to be overlapped each other again. The first luminous flux 107 and the second luminous flux 108 scattered by the measuring object 113, which are Doppler frequency-shifted, are slightly different from the LD 101 in oscillating frequency. As a result, the interferential waves of the first luminous flux 107 and the second luminous flux 108 scattered by the measuring object 113 generate beat. This beat is termed beat signal. The moving speed of the measuring object 113 is obtained by heterodyne-detecting the beat frequency of the beat signal using the PD 102. Hereinafter, this conventionally typical LDV will be described in further detail.

Here, when the direction in which the measuring object 113 moves to the right, as shown in FIG. 15 is set as the normal direction, the frequency shift of the first luminous flux 107 is Doppler frequency-shifted by $-f_d$ and the second luminous flux 108 is Doppler frequency-shifted by $+f_d$, so that the apparent frequency of the first luminous flux 107 becomes $(f_0-f_d)$ and the apparent frequency of the second luminous flux 108 becomes $(f_0+f_d)$. Note that $f_0$ represents the oscillating frequency of the LD 101. In this case, since an electric field of the light emitted from the LD 101 is represented as $E_0 \cdot \cos(2\pi f_0 t)$, the first luminous flux 107 is indicated by the following Equation 1 and the second luminous flux 108 by the following Equation 2:

$$I_A = E_A \cdot \cos\{2\pi(f_0 - f_d)t + \phi_A\} \quad (1)$$

$$I_B = E_B \cdot \cos\{2\pi(f_0 + f_d)t + \phi_B\} \quad (2)$$

Note that $f_0$ denotes the frequency of outgoing beam from the LD 101, $E_0$ denotes the amplitude of the outgoing beam from the LD 101, $E_A$ denotes the amplitude of the first luminous flux 107, $E_B$ denotes the amplitude of the second luminous flux 108, $\phi_A$ the phase of the first luminous flux 107 and $\phi_B$ denotes the phase of the second luminous flux 108.

Since the frequency of light is generally 100 THz ($10^{14}$ Hz), it is impossible to measure the frequency information of Equation 1 and Equation 2 directly. Therefore, since heterodyne detection is generally employed for direct measurement as mentioned above, and $f_0 \gg f_d$ is established, the interferential waves of Equation 1 and Equation 2 are indicated by the following equation:

$$\langle |I_A + I_B|^2 \rangle = \frac{E_A^2 + E_B^2}{2} + E_A \cdot E_B \cdot \cos\{2\pi(2f_d)t - (\phi_A - \phi_B)\} \quad (3)$$

Note that < > in the left side of Equation 3 represents time average. Consequently, the PD 102 allows the frequencies of these interferential waves to be measured.

FIG. 16 shows a case in which the measuring object 113 moves at a speed of V, two luminous fluxes are made incident on the object 113 at arbitrary angles of α and β respectively, and the observation point receives scattered light at an arbitrary angle of γ.

Frequency shift quantity due to the Doppler effect, which is obtained using the Lorentz transformation based on relativism in a precise sense, is approximately obtained as follows when the moving speed V is sufficiently smaller than speed of light c. Relative velocities $V_{A1}$ and $V_{B1}$ of light from a light source A and a light source B and a moving object is indicated by the following equations:

$$V_{A1} = c - V \sin\alpha$$

$$V_{B1} = c + V \sin\beta \quad (4)$$

Also, apparent frequencies $f_{A1}$ and $f_{B1}$ of the respective lights seen from the measuring object 113 are indicated by the following equations:

$$f_{A1} = \frac{V_{A1}}{\lambda} = \frac{1}{\lambda} \cdot (c - V\sin\alpha) \quad (5)$$

$$f_{B1} = \frac{V_{B1}}{\lambda} = \frac{1}{\lambda} \cdot (c + V\sin\beta)$$

Relative velocities $V_{A2}$ and $V_{B2}$ of the respective scattered (reflected) lights and the measuring object 113 are indicated by the following equations:

$$V_{A2} = c - V \sin\gamma$$

$$V_{B2} = c - V \sin\gamma \quad (6)$$

Consequently, frequencies $f_{A2}$ and $f_{B2}$ of lights seen from the observation point are indicated by the following equations:

$$f_{A2} = \frac{c}{V_{A2}} \cdot f_{A1} = \frac{c}{\lambda} \cdot \frac{1 - \frac{V}{c} \cdot \sin\alpha}{1 - \frac{V}{c} \cdot \sin\gamma} \qquad (7)$$

$$f_{B2} = \frac{c}{V_{B2}} \cdot f_{B1} = \frac{c}{\lambda} \cdot \frac{1 + \frac{V}{c} \cdot \sin\beta}{1 - \frac{V}{c} \cdot \sin\gamma}$$

The difference between the frequency in Equation 7 and the frequency of incident light ($f_0$) becomes a Doppler frequency shift quantity $f_d$. Here, the beat frequency of the two luminous fluxes measured at the observation point $2f_d$ is indicated by the following equation using c>>V:

$$2f_d = |f_{B2} - f_{A1}| \qquad (8)$$
$$= \frac{V}{\lambda} \cdot (\sin\alpha + \sin\beta)$$

It can be seen that $2f_d$ is independent of a position of the observation point (angle: $\gamma$). In FIG. 15, in which $\alpha=\beta=\theta$ is valid, the following equation is established based on Equation 8 according to the typical optical system of the LDV of FIG. 15:

$$2f_d = \frac{2V}{\lambda} \cdot \sin\theta \qquad (9)$$

Consequently, the moving speed V of the measuring object 113 is obtained by measuring the frequency $2f_d$ indicated in Equation 3 and calculating using Equation 9.

It is also possible to present Equation 9 geometrically as follows: FIG. 17 is an enlarged view of an area in which the two luminous fluxes in FIG. 15 (the first luminous flux 107 and the second luminous flux 108) overlap each other again. The two luminous fluxes intersect at $\theta$ incident angles respectively, and the broken lines in FIG. 17 show parts of the equal wave surfaces of the respective luminous fluxes. An interval between the broken lines shows the wavelength of light $\lambda$. The vertical heavy lines show the bright parts of interference fringes, and when the interval between the vertical heavy lines is set as $\Delta$, this $\Delta$ is indicated by the following Equation 10:

$$\Delta = \frac{\lambda}{2\sin\theta} \qquad (10)$$

As shown in FIG. 17, when an object (shown as •) passes perpendicularly to the interference fringes at a velocity of V, the frequency f is indicated by the following equation:

$$f = \frac{V}{\Delta} = \frac{2V}{\lambda} \cdot \sin\theta = 2f_d \qquad (11)$$

This equation is made equal to Equation 9.

The moving speed V of a typical LDV is thus obtained; however, it is impossible to detect the moving direction of a measuring object. In contrast, detecting a moving direction is made possible by rotating the diffraction grating 103 in FIG. 15 at a velocity of $V_g$ (see JP H03-235060A). As a result, when light is reflected by the diffraction grating 103, since the respective luminous fluxes are Doppler frequency-shifted in proportion to $V_g$, the beat frequency $2f_d$ to be measured in the PD 102 is obtained by the following equation:

$$2f_d = \frac{2V}{\lambda} \cdot (V + V_g) \cdot \sin\theta \qquad (12)$$

Consequently, a moving direction is obtained since the magnitude correlation of $2f_d$ is determined according to the positive and negative signs of the moving speed V relative to a given velocity of $V_g$. According to the abovementioned optical system, however, a rolling mechanism of the diffraction grating 103 is required with result that the device becomes larger in size and higher in cost. In addition, the diffraction grating 103, the rotational speed of which needs to be precisely maintained, is difficult to employ for precise measurement due to problems such as error caused by eccentricity and so on, and vibration and so on caused by rotation.

A velocimeter which solves the above problems is disclosed in JP H04-204104A. In JP H04-204104A, the moving direction of a measuring object is detected by using a frequency shifter to change the frequency of an incident luminous flux.

FIG. 18 shows an optical schematic diagram of the velocimeter disclosed in JP H04-204104A.

According to the velocimeter, light emitted from a laser source 1 become a parallel luminous flux by a CL 104, and then are split into two luminous fluxes by a beam splitter (hereinafter, referred to as BS) 109. The luminous fluxes are reflected by a mirror 105 and are then frequency-shifted by $f_1$ and $f_2$ by an acousto-optic device (hereinafter, referred to as AOM) 110. The light is again collected on the surface of a measuring object 113 by a diffraction grating 103 so as for the beat frequency of scattered light from the measuring object 113 to be detected using a PD 102. The frequency $2f_d$ to be detected here is indicated by the following equation:

$$2f_d = (|f_1 - f_2|) + \frac{2V}{\lambda} \cdot \sin\theta \qquad (13)$$

Consequently, the moving direction of the measuring object 113 is detected by the magnitude correlation of $2f_d$ relative to a given frequency shift quantity $|f_1-f_2|$ since the sign of V changes according to the moving direction of the measuring object 113.

Also in JP H08-15435A, frequency is changed using an electro-optical device (hereinafter, referred to as EOM) 111 shown in FIG. 19 based on the same principle as the principle employed in JP H04-204104A. More specifically, light emitted from a LD 101, which is a laser source, becomes a parallel luminous flux by a CL 104, and is then split into two luminous fluxes, a first luminous flux 107 and a second luminous flux 108, by a diffraction grating 103. The first luminous flux 107 and the second luminous flux 108 are together made incident on the EOM 111. Here, bias is applied to the second luminous flux 108 to shift frequency by $f_R$. The first luminous flux 107 and the second luminous flux 108 are reflected by a mirror 105, and then are collected on the surface of the measuring object 113. The beat frequency of scattered light from the surface of the measuring object 113 is detected using a PD 102. The frequency $2f_d$ to be detected here is indicated by the following equation:

$$2f_d = f_R + \frac{2V}{\lambda} \cdot \sin\theta \qquad (14)$$

Consequently, similarly to Equation 13, the moving direction of the measuring object 113 is detected by the magnitude correlation of $2f_d$ relative to a given frequency shift quantity $f_R$ since the sign of V changes according to the moving direction of the object.

However, an optical system where the moving direction of the measuring object 113 is detected using frequency shifters such as the AOM 110 and the EOM 111, is disadvantageous in that the device is made larger in size since the optical system becomes more complex and facilities for driving the frequency shifters such as a power source are required, for example, voltage necessary to frequency-modulate by the AOM 110 is about tens of volts and voltage necessary to frequency-modulate by the EOM 111 is about 100 volts with the result that a large-sized power source is required.

Requests for device miniaturization and lower power consumption of various sensors including the LDV have increased, and this tendency is particularly strong for consumer products. Since the LDV detects scattered light, signal light from a measuring object is generally weak and may be different according to a type of the object. One solution is to employ a photomultiplier tube as a photodetector having high photosensitivity, but a photomultiplier tube employed for the LDV causes the device itself to be jumboized. That is, the LDV provided with a photomultiplier tube is not suitable for application to small-sized consumer products. Instead, a photodiode, which is inferior as a photodetector in photosensitivity, is generally employed, so as not to obstruct device miniaturization. Accordingly, as much signal light as possible is preferably made incident on the photodetector. However, there is a limitation on the light reception system simply becoming closer since the distance between the light scattering surface on the measuring object 113 and a condenser lens 106 is usually limited due to factors such as arrangement of optical components. As another measure for as much signal light as possible to be made incident on the photodetector, it is also possible to increase incident light quantity by employing gas lasers and so on of He—Ne and Ar+ as a high-power laser source, but a semiconductor laser is preferred from the viewpoint of device miniaturization and lower power consumption.

SUMMARY OF THE INVENTION

Accordingly, an object of the present invention is to provide a velocimeter which reduces the device size and power consumption and which detects the moving speed of a measuring object highly precisely.

In order to achieve the above object, there is provided a velocimeter comprising:

a semiconductor light-emitting diode for emitting a plurality of luminous fluxes;

an optical axis changing part which is arranged along an optical path of the luminous flux from the semiconductor light-emitting diode to a measuring object, so as to change a direction of an optical axis of at least one luminous flux of the plurality of luminous fluxes;

a photodetector for receiving scattered light by the measuring object; and a signal processing circuit part for calculating frequency shift quantity of the scattered light based on output from the photodetector, wherein at least one luminous flux of the plurality of luminous fluxes is irradiated onto a surface of the measuring object so as to form at least one detection point on the surface of the measuring object.

The velocimeter as constituted above irradiates the surface of the measuring object with at least one luminous flux of the plurality of luminous fluxes emitted from the semiconductor light-emitting diode, to form at least one detection point on the surface of the measuring object. The velocimeter then receives scattered light from the detection point by the photodetector and calculates the frequency shift quantity of the scattered light in the signal processing circuit part based on output from the photodetector. Since this frequency shift quantity is proportional to the moving speed of the measuring object, the moving speed of the measuring object is obtained based on the frequency shift quantity.

The direction of the optical axis of at least one luminous flux emitted from the semiconductor light-emitting diode is shifted in the optical axis changing part, which allows a higher degree of freedom in the design of the optical system.

The detection point is formed using at least two luminous fluxes of the plurality of luminous fluxes emitted from the semiconductor light-emitting diode with the result that scattered light from the detection point increase in light quantity. Therefore, components such as a photomultiplier tube are not required to detect scattered light from the detection point and consequently, miniaturization of the velocimeter is achieved.

Since the quantity of scattered light from the detection point is increased, the semiconductor light-emitting diode does not have to be of high power and, consequently, lower power consumption of the velocimeter is achieved.

Since the quantity of scattered light from the detection point is increased, the frequency shift quantity of the scattered light is detected highly precisely. As a result, the moving speed of the measuring object is detected highly precisely.

In one embodiment of the present invention, one luminous flux of the plurality of luminous fluxes is a first luminous flux which is emitted from a front end face of the semiconductor light-emitting diode, and another luminous flux of the plurality of luminous fluxes is a second luminous flux which is emitted from a rear end face of the semiconductor light-emitting diode.

In one embodiment of the present invention, the first luminous flux and the second luminous flux are overlapped each other on the surface of the measuring object.

In one embodiment of the present invention, the optical axis changing part is provided with a first optical axis changing part and a second optical axis changing part, directions in which the semiconductor light-emitting diode emits the first luminous flux and the second luminous flux are in generally parallel with the surface of the measuring object, a direction of an optical axis of the first luminous flux is changed by the first optical axis changing part and a direction of an optical axis of the second luminous flux is changed by the second optical axis changing part; and an angle regarding the directional change of the optical axis of the first luminous flux by the first optical axis changing part and an angle regarding the directional change of the optical axis of the second luminous flux by the second optical axis changing part are approximately equal.

In one embodiment of the present invention, the optical axes of the first luminous flux and the second luminous flux before passing through the first optical axis changing part and the second optical axis changing part, and the optical axes of the first luminous flux and the second luminous flux after passing through the first optical axis changing part and the second optical axis changing part are contained in the same plane.

In one embodiment of the present invention, the plane which contains the optical axes of the first luminous flux and the second luminous flux is generally perpendicular to the surface of the measuring object.

In one embodiment of the present invention, the directions in which the semiconductor light-emitting diode emits the first luminous flux and the second luminous flux are in generally parallel with a direction in which the measuring object moves.

In one embodiment of the present invention, when an axis perpendicular to the surface of the measuring object is set as a z-axis, the z-axial length of an area where a plurality of luminous fluxes incident on the detection point overlap each other is longer than the z-axial length of an area where the surface of the measuring object is located.

In one embodiment of the present invention, an optical axis of light incident from the detection point on the photodetector is located generally within a plane which bisects an angle made between two luminous fluxes incident on the detection point.

In one embodiment of the present invention, an optical axis of light incident from the detection point on the photodetector and optical axes of the two luminous fluxes incident on the detection point are contained in the same plane.

In one embodiment of the present invention, the semiconductor light-emitting diode is arranged at the approximate middle point between the first optical axis changing part and the second optical axis changing part.

In one embodiment of the present invention, the semiconductor light-emitting diode and the photodetector share the same board to be integrated into one body.

The velocimeter of the present invention forms the detection point by at least two luminous fluxes emitted from the semiconductor light-emitting diode, to increase the quantity of scattered light from the detection point and, consequently components such as a photomultiplier tube are not required to detect scattered light from the detection point with the result that miniaturization of the velocimeter is achieved.

The increase in the quantity of scattered light from the detection point means that the velocimeter does not require a high-power light source, with the result that lower power consumption of the velocimeter is achieved.

Since the frequency shift quantity is detected highly precisely by increasing the quantity of scattered light from the detection point, the moving speed of the measuring object is detected highly precisely.

In one embodiment of the present invention, the optical axis changing part changes the direction of the optical axis of at least one luminous flux of the plurality of luminous fluxes and branches the luminous flux; and at least two detection points are formed on the surface of the measuring object using at least two luminous fluxes of the plurality of luminous fluxes.

The velocimeter as constituted above branches the light flux emitted from the semiconductor light-emitting diode into a plurality of light fluxes in the optical axis changing part. The velocimeter irradiates the surface of the measuring object with this plurality of luminous fluxes to form at least two detection points on the surface of the measuring object. The velocimeter then receives the scattered light from the detection point by the photodetector, and calculates the frequency shift quantity of the scattered light in the signal processing circuit part based on output from the photodetector. Since the frequency shift quantity is proportional to the moving speed of the measuring object, the moving speed of the measuring object is obtained based on the frequency shift quantity.

The light intensity of scattered light from the detection point is made higher by utilizing light emitted from the semiconductor light-emitting diode efficiently for speed detection. As a result, the S/N (Signal/Noise) of the signal from the detection point is improved, with the result that the following three effects are achieved:

Firstly, since a high sensitive optical receiver, for example large-sized optical receivers such as a photomultiplier tube, is not required for use, and optical receivers such as a small-sized photodiode can be employed as a photodetector, miniaturization of the device structure of the velocimeter is achieved.

Secondly, since output of the semiconductor light-emitting diode can be reduced, lower power consumption of the velocimeter is achieved.

Thirdly, since the frequency shift quantity of the scattered light from the detection point is detected highly precisely, the moving speed of the measuring object is detected highly precisely.

In one embodiment of the present invention, one luminous flux of the plurality of luminous fluxes is the first luminous flux which is emitted from the front end face of the semiconductor light-emitting diode, another luminous flux of the plurality of luminous fluxes is the second luminous flux which is emitted from the rear end face of the semiconductor light-emitting diode, and the optical axis changing part is a diffraction grating.

In one embodiment of the present invention, quantity of zero order diffracted light of the diffraction grating is smaller than quantity of first order diffracted light thereof.

In one embodiment of the present invention, one luminous flux of the plurality of luminous fluxes is the first luminous flux which is emitted from the front end face of the semiconductor light-emitting diode, and another luminous flux of the plurality of luminous fluxes is the second luminous flux which is emitted from the rear end face of the semiconductor light-emitting diode;

the optical axis changing part is provided with a first diffraction grating on which the first luminous flux is made incident and a second diffraction grating on which the second luminous flux is made incident;

a first detection point is formed using +first order diffracted light by the first diffraction grating and +first order diffracted light by the second diffraction grating; and a second detection point is formed using −first order diffracted light by the first diffraction grating and −first order diffracted light by the second diffraction grating.

In one embodiment of the present invention, the +first order diffracted light by the first diffraction grating and the +first order diffracted light by the second diffraction grating are overlapped each other on the surface of the measuring object, and the −first order diffracted light by the first diffraction grating and the −first order diffracted light by the second diffraction grating are overlapped each other on the surface of the measuring object.

In one embodiment of the present invention, directions in which the semiconductor light-emitting diode emits the first luminous flux and the second luminous flux are in generally parallel with a direction in which the measuring object moves; and a first plane which contains the +first order diffracted light by the first diffraction grating and the second diffraction grating, a second plane which contains the −first order diffracted light by the first diffraction grating and the second diffraction grating and a third plane which contains the surface of the measuring object form an isosceles triangular prism.

In one embodiment of the present invention, a direction in which a line connecting the first detection point and the second detection point extends is perpendicular to a direction in which the measuring object moves.

In one embodiment of the present invention, an optical axis of the luminous flux incident from the first detection point on the photodetector is located generally within a plane which bisects an angle made between an optical axis of the +first order diffracted light by the first diffraction grating and an optical axis of the +first order diffracted light by the second diffraction grating; and an optical axis of the luminous flux incident from the second detection point on the photodetector is located generally within a plane which bisects an angle made between an optical axis of the −first order diffracted light by the first diffraction grating and an optical axis the of −first order diffracted light by the second diffraction grating.

In one embodiment of the present invention, the velocimeter further comprises:

a phase changing part which is arranged so as for the −first order diffracted light by the second diffraction grating to pass through, for changing a phase of the −first order diffracted light of the second diffraction grating.

According to the velocimeter of the above embodiment, the positive or negative sign of the phase difference between the beat signals from the first detection point and the second detection point is reversed according to the moving direction of the measuring object, so that the moving direction of a measuring object is detected.

In one embodiment of the present invention, the velocimeter further comprises:

a first phase changing part which is arranged so as for the +first order diffracted light by the first diffraction grating to pass through, for changing a phase of the +first order diffracted light of the first diffraction grating;

a second phase changing part which is arranged so as for the −first order diffracted light by the first diffraction grating to pass through, for changing a phase of the −first order diffracted light of the first diffraction grating; and a third phase changing part which is arranged so as for the +first order diffracted light by the second diffraction grating to pass through, for changing a phase of the +first order diffracted light of the second diffraction grating.

In one embodiment of the present invention, when phase changing quantity of light by the phase changing part is set as $\phi_0$, the $\phi_0$ satisfies $0<\phi_0<\lambda/2$.

In one embodiment of the present invention, the $\phi_0=\lambda/4$.

In one embodiment of the present invention, a birefringent material is employed for a material of the phase changing part.

In one embodiment of the present invention, an absolute value of a difference between a phase difference of the respective luminous fluxes which form the first detection point and a phase difference of the respective luminous fluxes which form the second detection point is smaller than $\pi/2$.

In one embodiment of the present invention, when an axis perpendicular to the surface of the measuring object is set as a z-axis, the z-axial length of an area where a plurality of luminous fluxes incident on the detection point overlap each other is longer than the z-axial length of an area where the surface of the measuring object is located.

In one embodiment of the present invention, the velocimeter further comprises a condenser lens which is arranged between the detection point and the photodetector, and which is a single component made of a lens array.

In one embodiment of the present invention, the photodetector is a one-chip element which receives scattered light from at least two of the detection points.

In one embodiment of the present invention, the photodetector is a divided type photodiode.

In one embodiment of the present invention, the semiconductor light-emitting diode is arranged at the approximate middle point between the first diffraction grating and the second diffraction grating.

In one embodiment of the present invention, an optical axis of light incident from the first detection point on the photodetector is contained in a plane which is regularly reflected the first plane relative to the third plane, and an optical axis of light incident from the second detection point on the photodetector is contained in a plane which is regularly reflected the second plane relative to the third plane.

In one embodiment of the present invention, an area where the +first order diffracted light by the first diffraction grating and the +first order diffracted light by the second diffraction grating overlap each other is separated from an area where the −first order diffracted light by the first diffraction grating and the −first order diffracted light by the second diffraction grating overlap each other.

According to the velocimeter of the present invention, the light intensity of scattered light from the detection point is made higher by utilizing light emitted from the semiconductor light-emitting diode efficiently for speed detection. As a result, the S/N of the signal is improved, with the result that the following three effects are achieved:

Firstly, since a high sensitive optical receiver, for example large-sized optical receivers such as a photomultiplier tube, is not required for use, and optical receivers such as a small-sized photodiode can be employed as a photodetector, miniaturization of the device structure of the velocimeter is achieved.

Secondly, since output of the semiconductor light-emitting diode can be reduced, lower power consumption of the velocimeter is achieved.

Thirdly, since the S/N of the signal is improved, the frequency shift quantity of the scattered light is detected highly precisely so that the moving speed is detected highly precisely.

In one embodiment of the present invention, the semiconductor light-emitting diode emits the first luminous flux from the front end face thereof and emits the second luminous flux from the rear end face thereof;

the optical axis changing part is composed of a first optical branch device group for changing a direction of the optical axes of the first luminous flux and the second luminous flux, and for branching the first luminous flux and the second luminous flux, and a second optical branch device group which is arranged along a plurality of optical axes between the first optical branch device group and the measuring object, for changing a direction of the optical axes of a luminous flux from the first optical branch device group, and for branching a luminous flux from the first optical branch device group; and a first detection point and a second detection point are formed at least along a x-axis of a x-axis and a y-axis which intersect on a plane containing the surface of the measuring object, a third detection point and a fourth detection point are formed at least along the y-axis by irradiating a plurality of luminous fluxes branched in the second optical branch device group onto the surface of the measuring object.

According to the velocimeter as constituted above, the semiconductor light-emitting diode emits the first luminous flux from the front end face of the semiconductor light-emitting diode, and emits the second luminous flux from the rear end face thereof. The first luminous flux and the second luminous flux are split into a plurality of luminous fluxes sequentially via the first optical branch device group and the second optical branch device group. The first detection point and the second detection point are formed at least along the x-axis, and the third detection point and the fourth detection point are formed at least along the y-axis by irradiating the surface of the measuring object with the plurality of luminous fluxes. The scattered lights from the first, second, third and fourth detection points thus formed have frequency shift quantities corresponding to the speed of the measuring object. Therefore, the moving speed of the measuring object along the x-axis direction is detected by calculating the frequency shift quantity of the scattered light from at least either of the first detection point and the second detection point in the signal processing circuit part. Also, the moving speed of the measuring object along the y-axis direction is detected by calculating the frequency shift quantity of the scattered light from at least either of the third detection point and the fourth detection point in the signal processing circuit part.

The moving direction of the measuring object along the y-axis direction is detected based on the phase shift between the frequency of scattered light from the first detection point and the frequency of scattered light from the second detection point.

The moving direction of the measuring object along the x-axis direction is detected based on the phase shift between the frequency of scattered light from the third detection point and the frequency of scattered light from the fourth detection point.

As described above, without varying the frequency of the outgoing beam from the semiconductor light-emitting diode by components such as an AOM and an EOM, the two-dimensional moving speed and moving direction of the measuring object are detected, so that increase of the device size is prevented.

In one embodiment of the present invention, the second optical branch device group contains a first beam splitter, a second beam splitter, a third beam splitter and fourth beam splitter.

In one embodiment of the present invention, the second optical branch device group contains a third diffraction grating, a fourth diffraction grating, a fifth diffraction grating and a sixth diffraction grating.

In one embodiment of the present invention, quantity of zero order diffracted light of the third diffraction grating, the fourth diffraction grating, the fifth diffraction grating and the sixth diffraction is smaller than quantity of first order diffracted light thereof.

In one embodiment of the present invention, the second optical branch device group contains a first optical branch device, a second optical branch device, a third optical branch device and a fourth optical branch device;

one luminous flux branched by the first optical branch device and one luminous flux branched by the third optical branch device form the first detection point;

one luminous flux branched by the second optical branch device and one luminous flux branched by the fourth optical branch device form the second detection point;

another luminous flux branched by the first optical branch device and another luminous flux branched by the third optical branch device form the third detection point; and another luminous flux branched by the third optical branch device and another luminous flux branched by the fourth optical branch device form the fourth detection point.

In one embodiment of the present invention, the first detection point, the second detection point, the third detection point and the fourth detection point are formed by overlapping the luminous fluxes each other on the surface of the measuring object.

In one embodiment of the present invention, a first plane which contains two luminous fluxes incident on the first detection point, a second plane which contains two luminous fluxes incident on the second detection point, and a third plane which contains the surface of the measuring object form an isosceles triangular prism, and two luminous fluxes incident on the respective first and second detection points have an approximately identical angle relative to the third plane.

In this case preferably, the emission directions of the first luminous flux and the second luminous flux are in parallel with the surface of the measuring object, and the first luminous flux is made incident on the first diffraction grating whereas the second luminous flux is made incident on the second diffraction grating.

In one embodiment of the present invention, an angle made between the fourth plane which containing optical axes of two luminous fluxes incident on the third detection point and the third plane;

an angle made between the fifth plane containing optical axes of two luminous fluxes incident on the fourth detection point and the third plane;

are approximately equal; and two luminous fluxes incident on the respective third and fourth detection points have an approximately identical angle relative to the third plane.

In this case preferably, the emission directions of the first luminous flux and the second luminous flux are in parallel with the surface of the measuring object, and the first luminous flux is made incident on the first diffraction grating whereas the second luminous flux is made incident on the second diffraction grating.

In one embodiment of the present invention, the x-axis is orthogonal to the y-axis.

In one embodiment of the present invention, an optical axis of the luminous flux incident from the respective first, second, third and fourth detection points on the photodetector is located generally within a plane which bisects an angle made between two luminous fluxes incident on the respective first, second, third and fourth detection points.

In one embodiment of the present invention, when a z-axis is set perpendicularly to the x-axis and the y-axis, the z-axial length of an area where two luminous fluxes incident on the respective first, second, third and fourth detection points overlap each other is longer than the z-axial length of an area where the surface of the measuring object is located.

In one embodiment of the present invention, the first optical branch device group contains a first diffraction grating and a second diffraction grating, and is provided with a phase changing part which is arranged so as for the −first order diffracted light by the second diffraction grating to pass through, for changing a phase of the −first order diffracted light of the second diffraction grating.

In one embodiment of the present invention, the first optical branch device group contains the first diffraction grating and the second diffraction grating, further comprising:

a first phase changing part which is arranged so as for the +first order diffracted light by the first diffraction grating to pass through, for changing the phase of the +first order diffracted light of the first diffraction grating;

a second phase changing part which is arranged so as for the −first order diffracted light by the first diffraction grating to pass through, for changing the phase of the −first order diffracted light of the first diffraction grating; and a third phase changing part which is arranged so as for the +first order diffracted light by the second diffraction grating to pass through, for changing the phase of the +first order diffracted light of the second diffraction grating.

In one embodiment of the present invention, plurality of devices contained by the second optical branch device group are formed on the same first board, and the phase changing part is arranged on the first board.

In one embodiment of the present invention, a condenser lens is arranged between the first, second, third and fourth detection points and the photodetector, and the condenser lens is formed on the first board.

In one embodiment of the present invention, a condenser lens is arranged between the first, second, third and fourth detection points and the photodetector, and the photodetector is a one-chip element which receives scattered light from at least the first, second, third and fourth detection points.

In one embodiment of the present invention, the semiconductor light-emitting diode is arranged at the approximate middle point between the first optical axis changing part and the second optical axis changing part.

According to the velocimeter of the present invention, since at least the first detection point, the second detection point, the third detection point and the fourth detection point are formed by a plurality of luminous fluxes obtained in the first optical branch device group and the second optical branch device group, the two-dimensional moving speed and moving direction of the measuring object are detected based on the frequency shift quantities of the scattered lights from the first detection point, the second detection point, the third detection point and the fourth detection point.

Without varying the frequency of the outgoing beam from the semiconductor light-emitting diode by components such as an AOM and an EOM, the two-dimensional moving speed and moving direction of the measuring object are detected, so that increase of the device size is prevented.

Also, there is provided a velocimeter comprising:

a semiconductor light-emitting diode for emitting a first luminous flux from a front end face of the semiconductor light-emitting diode and emitting a second luminous flux from a rear end face thereof;

an optical branch device for branching the first luminous flux;

a first detection system for irradiating at least one luminous flux of a plurality of luminous fluxes branched from the first luminous flux onto a first detection point on the surface of the measuring object, and irradiating at least two luminous fluxes of the plurality of luminous fluxes branched from the first luminous flux onto a second detection point on the surface of the measuring object;

the second detection system for irradiating the second luminous flux onto the first detection point;

a photodetector for receiving scattered light from the first detection point and the second detection point; and a signal processing circuit part for calculating frequency shift quantity of the scattered light based on output from the photodetector.

The velocimeter as constituted above emits the first luminous flux from the front end face of the semiconductor light-emitting diode whereas emits the second luminous flux from the rear end face thereof. The first luminous flux is then branched into a plurality of luminous fluxes by the optical branch device. At least one luminous flux of the plurality of luminous fluxes is irradiated onto the first detection point on the surface of the measuring object by the first detection system, and at least two luminous fluxes of the plurality of luminous fluxes branched from the first luminous flux are irradiated onto the second detection point on the surface of the measuring object by the first detection system. The second luminous flux is irradiated onto the first detection point by the second detection system. The scattered lights from the first detection point and the second detection point are received by the photodetector to calculate the frequency shift quantities of the scattered lights in the signal processing circuit part based on output from the photodetector. Since the frequency shift quantity is proportional to the moving speed of the measuring object, the moving speed of the measuring object is obtained based on the frequency shift quantity.

In addition to the first luminous flux emitted from the front end face of the semiconductor light-emitting diode, the second luminous flux emitted from the rear end face thereof is also used for speed detection, so that the light emitted from the semiconductor light-emitting diode is efficiently utilized for speed detection with the result that the light intensities of scattered lights from the first detection points and the second detection points are made higher. As a result, the S/N (Signal/Noise) of the signals from the first detection point and the second detection point is improved, with the result that the following three effects are achieved:

Firstly, since a high sensitive optical receiver, for example large-sized optical receivers such as a photomultiplier tube, is not required for use, and optical receivers such as a small-sized photodiode can be employed as a photodetector, miniaturization of the device structure of the velocimeter is achieved.

Secondly, since output of the semiconductor light-emitting diode can be reduced, lower power consumption of the volocimeter is achieved.

Thirdly, since the frequency shift quantities of the scattered lights from the first detection point and the second detection points are detected highly precisely, the moving speed of a measuring object is detected highly precisely.

Since the moving speed of the measuring object along the y-axis direction is detected from the first detection point as well as the moving speed of the measuring object along the x-axis direction is detected from the second detection point, the two-dimensional moving speed is detected.

In one embodiment of the present invention, the first detection system contains a first optical axis changing part for changing directions of optical axes of plurality of luminous fluxes branched by the optical branch device; and the second detection system contains a second optical axis changing part for changing a direction of optical axis of the second luminous flux.

In one embodiment of the present invention, the optical branch device is a first diffraction grating.

In one embodiment of the present invention, the second detection point is formed using ±first order diffracted lights by the first diffraction grating.

In one embodiment of the present invention, two luminous fluxes incident on the first detection point overlap each other on the surface of the measuring object, and two luminous fluxes incident on the second detection point overlap each other on the surface of the measuring object.

In one embodiment of the present invention, light intensity of zero order diffracted light by the first diffraction grating and light intensity of the second luminous flux is approximately equal.

In one embodiment of the present invention, directions in which the semiconductor light-emitting diode emits the first luminous flux and the second luminous flux are in generally parallel with a plane which contains the surface of the measuring object;

an angle regarding a directional change of an optical axis of zero order diffracted light by the first diffraction grating in the first optical axis changing part is approximately equal to an angle regarding a directional change of an optical axis of the second luminous flux in the second optical axis changing part; and an angle regarding a directional change of an optical axis of the +first order diffracted light by the first diffraction grating in the first optical axis changing part is approximately equal to an angle regarding a directional change of an optical axis of the −first order diffracted light by the first diffraction grating in the first optical axis changing part.

In one embodiment of the present invention, directions in which the semiconductor light-emitting diode emits the first luminous flux and the second luminous flux are in generally parallel with a plane which contains the surface of the measuring object;

a plane which contains optical axes of two luminous fluxes incident on the first detection point is perpendicular to a plane which contains the surface of the measuring object; and a plane which contains optical axes of two luminous fluxes incident on the second detection point is perpendicular to a plane which contains the surface of the measuring object.

In one embodiment of the present invention, the first detection point is located within a plane which contains optical axes of two luminous fluxes incident on the second detection point; and the second detection point is located within a plane which contains optical axes of two luminous fluxes incident on the first detection point.

In one embodiment of the present invention, an optical axis of light incident from the first detection point on the photodetector is located within a plane which bisects an angle made between two luminous fluxes incident on the first detection point; and an optical axis of light incident from the second detection point on the photodetector is located within a plane which bisects an angle made between two luminous fluxes incident on the second detection point.

In one embodiment of the present invention, the velocimeter further comprises:

a first phase changing part which is arranged along an optical path of a luminous flux which connects the first diffraction grating to the second detection point, for changing a phase of light incident on the second detection point;

a second diffraction grating for branching a luminous flux passing from the second detection point to the photodetector; and a first linear polarizer group which is arranged along optical paths of a plurality of luminous fluxes branched by the second diffraction grating, wherein a plurality of luminous fluxes passing through the first linear polarizer group are received by the photodetector.

According to the velocimeter of the above embodiment, the positive or negative sign of the phase difference of the beat signals from the second detection point is reversed according to the moving direction of the measuring object, so that the moving direction along the x-axis direction of the measuring object is also detected.

In one embodiment of the present invention, the velocimeter further comprises:

a second phase changing part which is arranged along an optical path of a luminous flux which connects the semiconductor light-emitting diode to the first detection point, for changing a phase of light incident on the first detection point;

a third diffraction grating for branching a luminous flux passing from the first detection point to the photodetector; and a second linear polarizer group which is arranged along optical paths of a plurality of luminous fluxes branched by the third diffraction grating, wherein a plurality of luminous fluxes passing through the second linear polarizer group are received by the photodetector.

According to the velocimeter of the above embodiment, the positive or negative sign of the phase difference of the beat signals from the first detection point is reversed according to the moving direction of the measuring object, so that the moving direction along the y-axis direction of the measuring object is also detected.

In one embodiment of the present invention, when an axis perpendicular to the surface of the measuring object is set as a z-axis;

the z-axial length of an area where a plurality of luminous fluxes incident on the first detection point overlap is longer than the z-axial length of an area where the surface of the measuring object is located; and the z-axial length of an area where a plurality of luminous fluxes incident on the second detection point is longer than the z-axial length of an area where the surface of the measuring object is located.

In one embodiment of the present invention, the semiconductor light-emitting diode is arranged at the approximate middle point between the first optical axis changing part for changing an optical axis of zero order diffracted light by the first diffraction grating and the second optical axis changing part.

According to the velocimeter of the present invention, the light intensity of the scattered light from the detection point is made higher by utilizing light emitted from the semiconductor light-emitting diode efficiently for speed detection. As a result, the S/N of the signals from the first detection point and the second detection point is improved, with the result that the following three effects are achieved:

Firstly, since a high sensitive optical receiver, for example large-sized optical receivers such as a photomultiplier tube, is not required for use, and optical receivers such as a small-sized photodiode can be employed as a photodetector, miniaturization of the device structure of the velocimeter is achieved.

Secondly, since output of the semiconductor light-emitting diode can be reduced, lower power consumption of the velocimeter is achieved.

Thirdly, since the frequency shift quantities of the scattered light from the first and second detection points are detected highly precisely, the moving speed of the measuring object is detected highly precisely.

Since the moving speed of the measuring object along the y-axis direction is detected from the first detection point as well as the moving speed of the measuring object along the x-axis direction is detected from the second detection point, the two-dimensional moving speed is detected.

In one embodiment of the present invention, a condenser lens is arranged between the detection point and the photodetector.

In one embodiment of the present invention, processing is applied on an end face of the semiconductor light-emitting diode so as to approximately equalize light quantities of a plurality of luminous fluxes incident on the respective detection points.

In one embodiment of the present invention, an aperture is arranged between the semiconductor light-emitting diode and the optical axis changing part so as for at least one luminous flux of a plurality of luminous fluxes emitted from the semiconductor light-emitting diode to pass through.

In one embodiment of the present invention, a lens group is arranged between the semiconductor light-emitting diode and the optical axis changing part so as for at least one luminous flux of a plurality of luminous fluxes emitted from the semiconductor light-emitting diode to pass through.

In one embodiment of the present invention, the semiconductor light-emitting diode is a laser diode.

In one embodiment of the present invention, the semiconductor light-emitting diode has a plurality of light emission points.

In one embodiment of the present invention, the photodetector incorporates a signal processing circuit.

Also, there is provided a displacement meter which is provided with the above velocimeter, for obtaining position information of the measuring object based on speed information and time information regarding the measuring object.

Also, there is provided a vibrometer which is provided with the above velocimeter, for obtaining information regarding vibration of the measuring object based on speed information and time information regarding the measuring object.

Also, there is provided an electronic device which is provided with one of the above velocimeter, the above displacement meter, and the above vibrometer.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 19 is a schematic structural diagram of a substantial part of another conventional LDV;

DETAILED DESCRIPTION OF THE PREFERRED EMBODIMENTS

The velocimeter of this invention will be described in further detail by way of preferred embodiments with reference to the accompanying drawings.

(First Embodiment)

Figure 1:
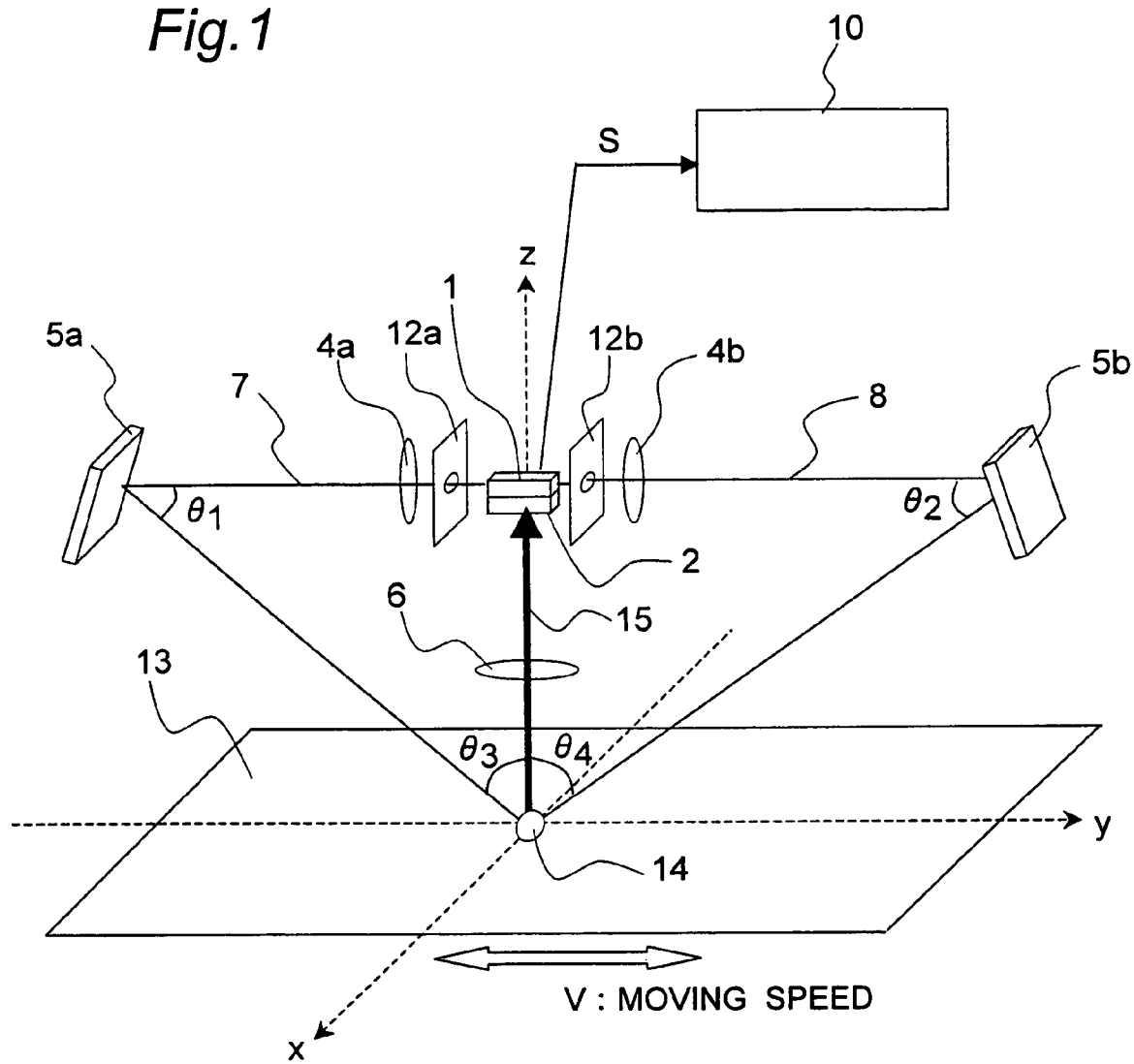
FIG. 1 is a schematic structural diagram of the velocimeter in the first embodiment of the present invention.

FIG. 1 is a schematic structural diagram of the velocimeter in the first embodiment of the present invention. FIG. 1 shows only the arrangement of components such as respective optical components and omits other components holding the respective optical components. The arrow shown as a broken line in FIG. 1 denotes the coordinate axis.

The velocimeter is provided with an LD 1 as an example of a semiconductor light-emitting diode, a PD 2 as an example of a photodetector, CLs 4a and 4b as examples of lens groups, mirrors 5a and 5b as examples of first and second optical axis changing parts, a condenser lens 6 as an example of a condenser lens, a signal processing circuit part 10 as an example of a signal processing circuit part and apertures 12a and 12b as examples of apertures.

The LD 1 is arranged at a coordinate point $(0, 0, z_1)$. Components such as an LED (Light Emitting Diode) may be employed instead of the LD 1, but an LD is preferable to an LED for use because an LD has much better coherence than an LED with the result that beat is easily generated by the interference of the two luminous fluxes indicated by the above Equation 3. The PD 2 is arranged at $(0, 0, z_2)$, the CL 4a at $(0, -y_4, z_1)$, the CL 4b at $(0, y_4, z_1)$, the mirror 5a at (0, −$y_5$, $z_1$), the mirror 5b at (0, $y_5$, $z_1$), the aperture 12a at (0, −$y_{12}$, $z_1$) and the aperture 12b at (0, $y_{12}$, $z_1$).

In FIG. 1, 7 denotes a first luminous flux, 8 a second luminous flux, 14 denotes a detection point (a beam overlapping area) and 15 denotes a beat signal which advances along the z-axis. The first luminous flux 7 and the second luminous flux 8 are emitted from the end face of the LD 1 in parallel with the y-axis. The plane including the x-axis and y-axis, namely, the xy-plane, approximately corresponds to the surface of the measuring object 13. At a coordinate point (x, y, z)=(0, 0, 0), namely, at the origin, the detection point 14 is located.

The LD 1 is typically made by applying prescribed processes to a wafer and then cleaving the wafer into chip shape pieces having a prescribed length. Ordinarily, most electronic devices use laser light emitted from the front end face (the forward end face) as various usages and directly receive laser light emitted from the rear end face (the backward end face) with a PD. The output from the PD is fed back to the driver of the LD to stabilize the emission intensity of the LD.

The signal processing circuit part 10 calculates the frequency shift quantity contained in the scattered light generated at the detection point 14 based on output S from the PD 2.

Hereinafter, the structure and functions of the optical system in FIG. 1 will be described.

The first luminous flux 7 is emitted from the front end face of the LD 1 in parallel with the y-axis and the second luminous flux 8 is emitted from the rear end face of the LD 1 in parallel with the y-axis. The first luminous flux 7 and the second luminous flux 8 become an ideal parallel luminous flux via the apertures 12 and the CLs 4a and 4b. Generally, the intensity distribution of the light emitted from the LD 1 is the Gaussian distribution centering around the optical axis of the light, and the bottom spreading of the Gaussian distribution has a far field pattern (FFP) which differs corresponding to the polarization direction of lights. As a result, when the light emitted from the LD 1 is directly irradiated onto the detection point 14, uneven intensity in light is formed on the detection point 14 so that the intensity of the interference fringes shown in FIG. 17 becomes uneven, with the result that the highly precise evaluation of the beat signal 15 is made more difficult. A luminous flux having even light intensity is formed by providing the apertures 12a and 12b, as shown in FIG. 1, to cut a part having weak light intensity located at the peripheral portion of the luminous flux emitted from the LD 1.

Figure 17:
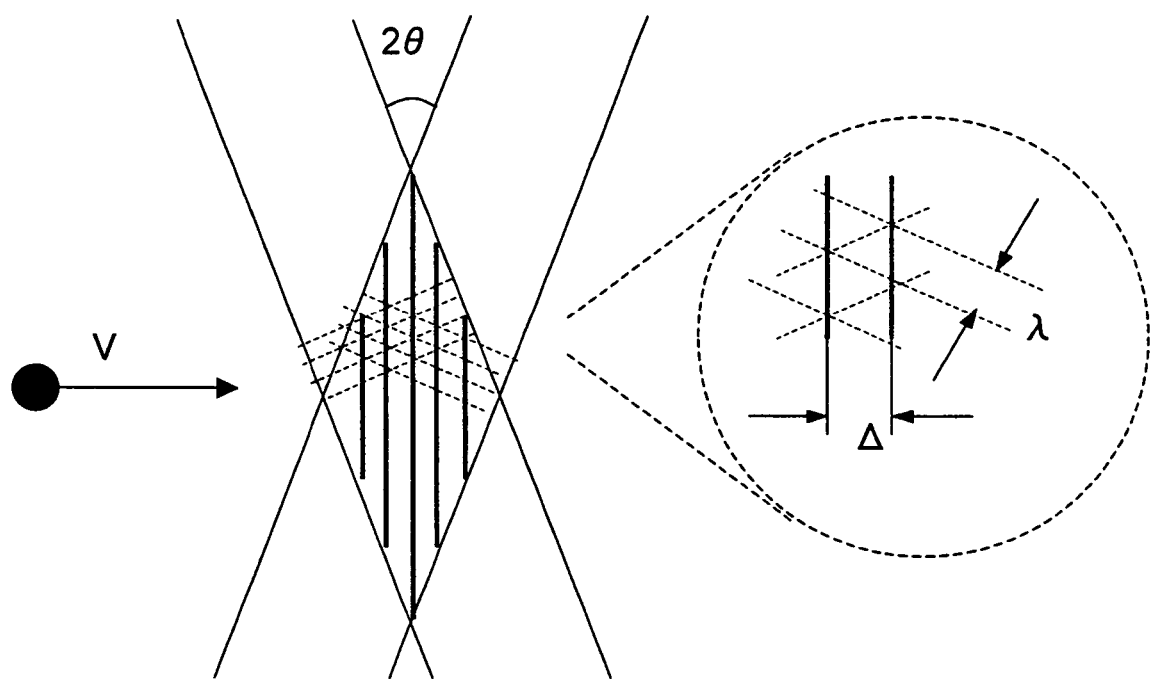
FIG. 17 is a view to explain an equation which relates moving speed of a measuring object with Doppler shift frequency.
Figure 18:
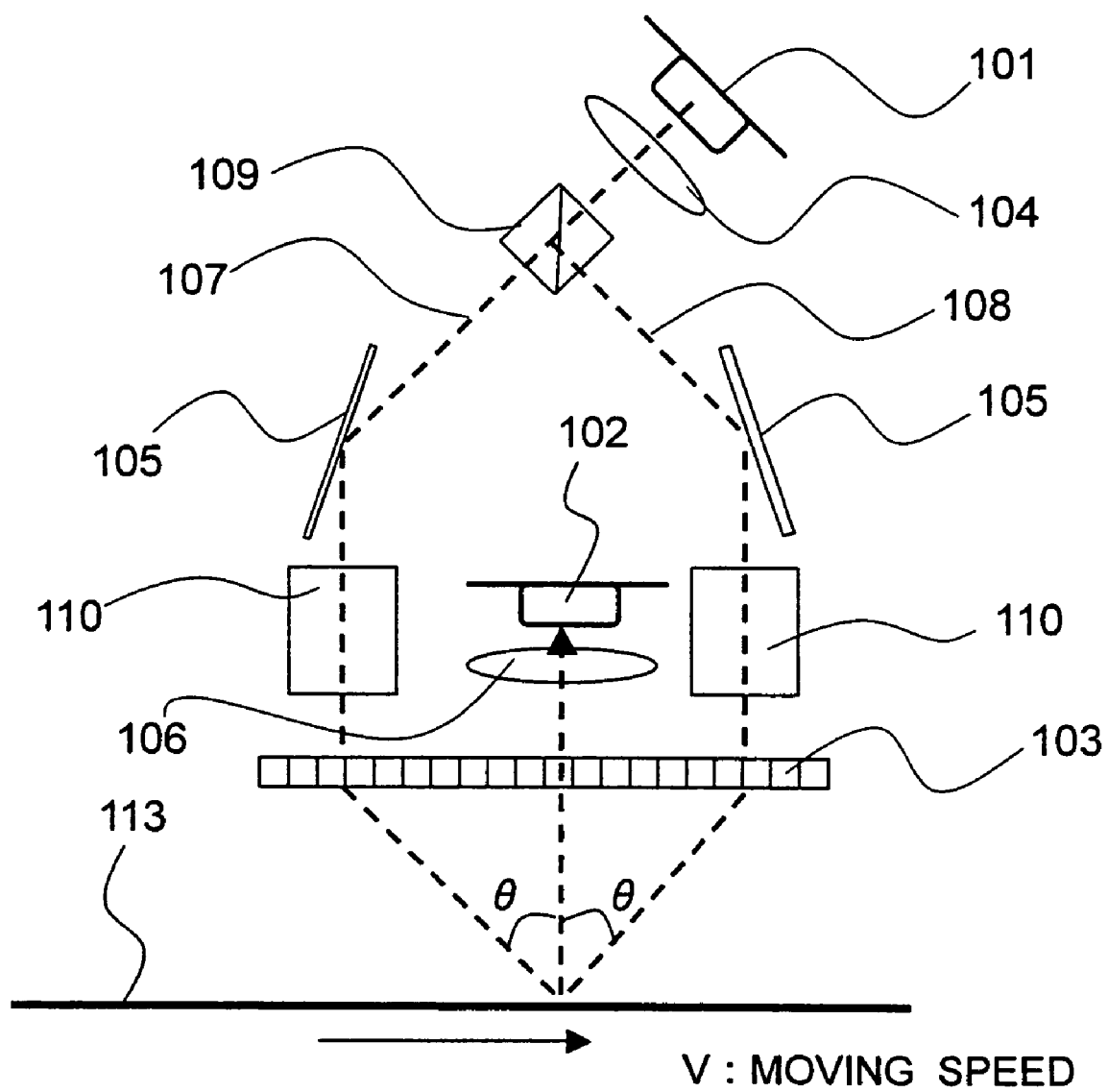
FIG. 18 is a schematic structural diagram of a substantial part of another conventional LDV.

Light emitted from the LD 1 advances expanding at a certain angle. When the light is directly irradiated onto the measuring object 13, the wave front of the light is shifted from a planar shape to a shape which is closer to that of a sphere, as the light advances further, with the result that the interference fringes of FIG. 17 are not formed at the detection point 14. The luminous flux of the light expands resulting in variance of light intensity and consequently, the S/N of the signal becomes lower. The wave front of the light becomes a planar shape independently of the advance distance of the light by placing the CLs 4a and 4b, as shown in FIG. 1, in appropriate positions to make light emitted from the LD 1 a parallel luminous flux.

The description above of the respective components in FIG. 1 relates to all of the following embodiments; however, the description is given only for the present embodiment and will be omitted for the following embodiments.

The first luminous flux 7 and the second luminous flux 8 emitted from the LD 1 are beam-formed into parallel luminous fluxes by the CLs 4a and 4b, and are then reflected by the mirrors 5a and 5b at respective reflection angles $\theta_1$ and $\theta_2$ and are made incident on the surface of the measuring object 13 at respective incident angles $\theta_3$ and $\theta_4$. As a result, the one detection point 14 is formed on the surface of the measuring object 13. The scattered light, which is frequency-shifted in proportion to the moving speed V of the measuring object 13, is collected by the condenser lens 6 and received by the PD 2. The beat frequency $2f_d$ is detected based on output S from the PD 2. The $2f_d$ to be detected here is indicated by the following equation based on the above Equation 8:

$$2f_d = \frac{V}{\lambda} \cdot (\sin\theta_3 + \sin\theta_4) \qquad (15)$$

Figure 2A:
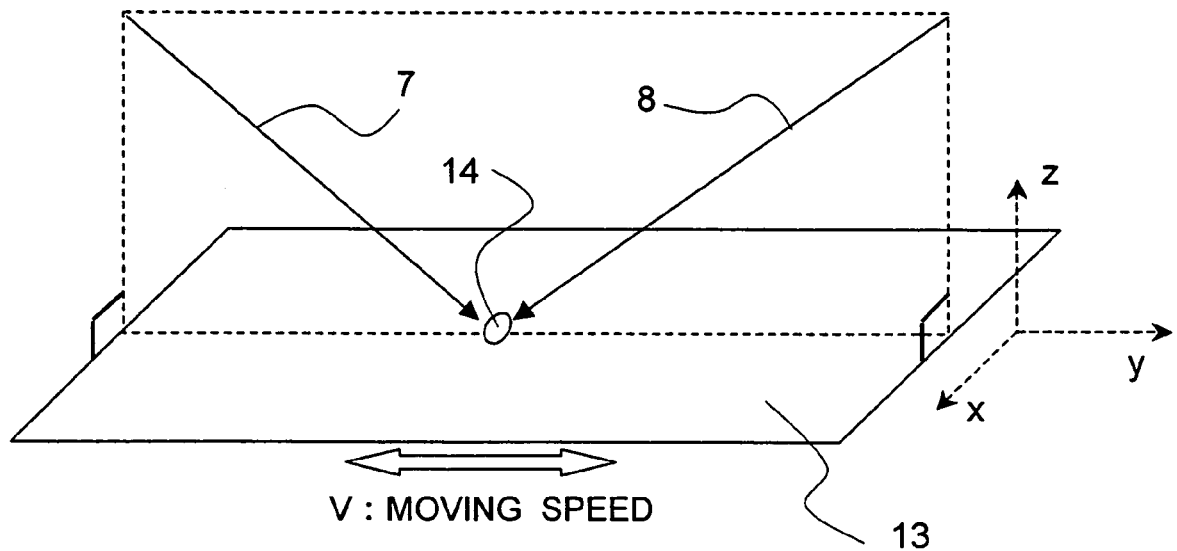
FIG. 2A is a schematic diagram of an area adjacent to a detection point under an ideal condition in the first embodiment.

In the optical system of this embodiment, the LD 1 is arranged at a position where the first luminous flux 7 and the second luminous flux 8 emitted from the LD 1 are in parallel with the y-axis, wherein the first luminous flux 7 is reflected by the mirror 5a at a reflection angle of $\theta_1$ whereas the second luminous flux 8 is reflected by the mirror 5b at a reflection angle of $\theta_2$ as shown in FIG. 1. Since the reflection angle $\theta_1$ and the reflection angle $\theta_2$ are made equal, the incident angle of the first luminous flux 7 on the measuring object 13 and the incident angle of the second luminous flux 8 on the measuring object 13 are equal. That is, $\theta_3=\theta_4$. In addition, after reflection, the two luminous fluxes of the first luminous flux 7 and the second luminous flux 8 are flush with the yz-plane and the surface of the measuring object 13 is flush with the xy-plane as shown in FIG. 2A. Consequently, the $2f_d$ to be detected here is indicated by the following equation based on the above Equation 15:

$$2f_d = \frac{2V}{\lambda} \cdot \sin\theta_3 \qquad (16)$$

As a result, one adjustment item for the arrangement angles of respective optical components is removed.

Figure 2B:
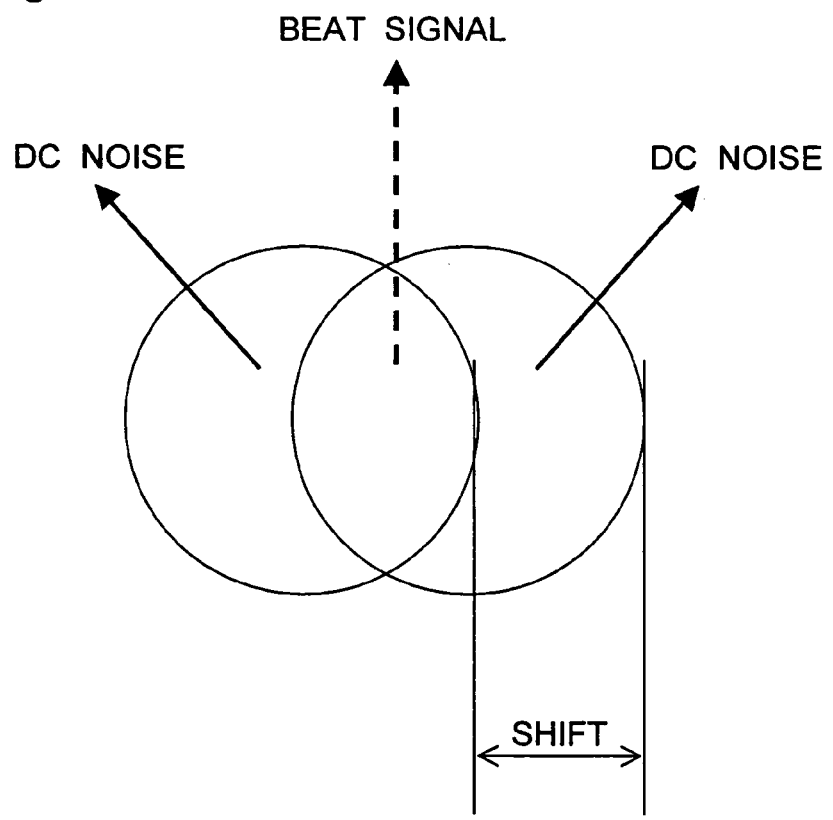
FIG. 2B is a schematic diagram of the detection point in the first embodiment.

As shown in Equation 3, a beat signal is generated by interference of two luminous fluxes. When the overlapped areas of the two luminous fluxes are shifted away each other as shown in FIG. 2B, the scattered light from the non-overlapped areas are detected as DC noise by the PD 2, which has an effect of lowering the S/N ratio. The two luminous fluxes emitted from the LD 1 are emitted in parallel with the y-axis and reflected by the mirrors 5a and 5b at the identical angle as well as in the same plane, so that the luminous fluxes are well overlapped at the detection point 14.

It is possible to obtain the beat signal by overlapping the luminous fluxes at arbitrary angles irrespective of the conditions for overlap specified above; however, the above conditions allow the beat signal to be detected highly precisely.

The moving speed of the measuring object 13 is detected highly precisely by arranging the whole optical system so that the moving direction of the measuring object 13 is in parallel with the y-axis, so as to make the interference fringe direction (the extending direction of the interference fringes) of the detection point 14 perpendicular to the moving direction of the measuring object 13, as shown in FIG. 17.

Figure 3:
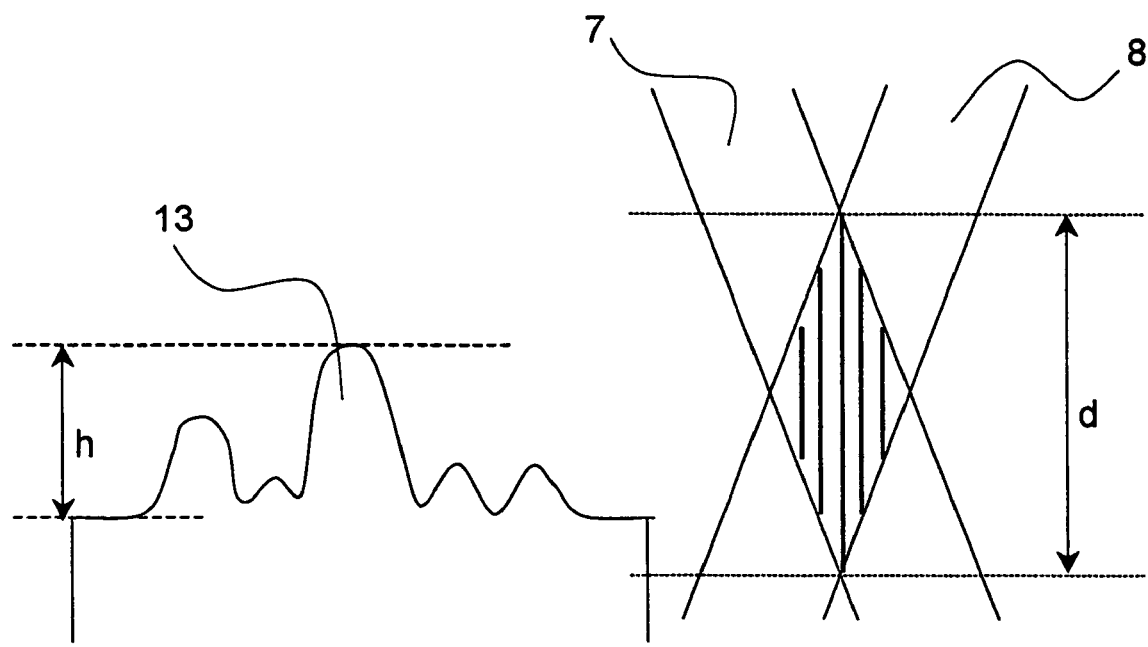
FIG. 3 shows conditions for a PD to detect a beat signal continuously.

For the PD 2 to detect the beat signal 15 continuously in this embodiment, when a z-axis is set perpendicular to the surface of the measuring object 13, the z-axial length of the area where the two luminous fluxes incident on the detection point 14 overlap is required to be longer than the z-axial length of the area where the surface of the measuring object 13 is located. More particularly, irregularities (=h) of the measuring object 13 in the z-axis direction are required to be smaller than the z-axial length (=d) of the overlapping area of the first luminous flux 7 and the second luminous flux 8, as shown in FIG. 3. Here, since the angle made between the two luminous fluxes is $2·\theta_3$, as shown in FIG. 1, when the length twice as long as the diameter of the first and second luminous fluxes is set as φ, 2d is indicated by the following Equation 17:

$$d = \frac{\varphi}{2\sin\theta_3} \quad (17)$$

Discontinuity of the beat signal is prevented by setting an angle $\theta_3$ so as to meet h<d using the above Equation 17. This condition is established for all the following embodiments and the description thereof will be omitted hereinafter.

The optical axis of the luminous flux incident on the PD 2 from the detection point 14 is located generally in the plane which bisects the intersection angle of the first luminous flux 7 and the second luminous flux 8 incident on the detection point 14. In this case, the light intensity of scattered light from the first luminous flux 7 and the light intensity of scattered light from the second luminous flux 8 are approximately equal, so that the beat signal 15 becomes clearer with the result that the moving speed is detected highly precisely.

In FIG. 1, the PD 2 is flush with the plane formed by the two luminous fluxes incident on the PD 2 (the yz-plane). That is, the PD 2 is arranged on the z-axis. In this case, in addition to the effect that the beat signal becomes clearer as mentioned above, the beat signal intensity is maximized with the result that the S/N is improved.

In FIG. 1, the LD 1 is arranged at the middle point between the mirrors 5a and 5b. In this case, the LD 1 and the PD 2, which are arranged on the same z-axis, can be respectively incorporated on the frontside and the backside of the same substrate. That is, the LD 1 and the PD 2 can be integrated by fabricating the LD 1 and the PD 2 on the same substrate. The whole device structure is thus miniaturized.

In this embodiment, the case in which the light emitted from the LD 1 is formed into a parallel luminous flux by the CLs 4a and 4b, is described by way of an example; however, the CLs 4a and 4b may be arranged, for example, at a position where the luminous flux is sufficiently converged at the detection point 14 by shifting the distances between the CLs 4a and 4b and the LD 1 away from the focal length of these lenses so as to collect the luminous flux gradually when the beat signal intensity is low. The lenses may also be arranged so that the two luminous fluxes incident on the detection point 14 pass through the lenses. That is, the lenses may be arranged along the optical path between the mirrors 5a and 5b and the detection point 14. As a result, the luminous flux, when made incident on the detection point 14, sufficiently converges so that the light quantity per unit area is increased at the detection point 14 with the result that the signal intensity obtained in the PD 2 is also increased. This allows the beat signal having an improved S/N to be detected and the moving speed of the measuring object 13 to be detected highly precisely. The following embodiments will also be described by arranging the CLs to form the luminous flux incident on the detection point into a parallel luminous flux, and omitting the lenses for collecting the luminous flux incident on the detection point, but are not limited to a parallel luminous flux as in this embodiment.

In FIG. 1, the condenser lens 6 is arranged between the PD 2 and the detection point 14. This condenser lens 6 collects beat signal scattered on the detection point 14 to the PD 2 and, consequently, the signal intensity obtained in the PD 2 is increased. This condenser lens is arranged in the same way in the following embodiments, but the description thereof will be omitted hereinafter.

The beat signal 15 becomes clearer as the light quantities of the two luminous fluxes incident on the detection point 14 become more proximate to each other with the result that the moving speed is detected highly precisely in the PD 2. In the abovementioned Equation 3, the value $E_A+E_B$, which is the quantity of light emitted from the LD 1, is fixed. As a result, when $E_A=E_B$ is valid, the beat (peak-to-peak) intensity of the beat signal 15 is maximized. On the other hand, as the relation of the light quantities of the two luminous fluxes becomes more ill-balanced, namely, the difference between $E_A$ and $E_B$ becomes larger, the beat intensity becomes lowered. In the present embodiment, the light quantities of the first luminous flux 7 and the second luminous flux 8 incident on the detection point 14 are made equal by treating both end faces of the LD 1 appropriately with the result that the beat signal 15 is clearly detected and consequently, the moving speed is detected highly precisely. In all the following embodiments, the treatment is also applied on the both end faces of the LD to make the light intensities of the two luminous fluxes incident on the respective detection points equal to each other, but the description thereof will be omitted hereinafter.

In this embodiment, the description is given for the optical system which detects the beat signal generated by the interference of the two luminous fluxes by irradiating the two luminous fluxes onto the measuring object, but another optical system which obtains the beat signal by irradiating the first luminous flux onto the measuring object and shifting the direction of the optical axis of the second luminous flux as required using components such as a mirror, without irradiating the second luminous flux onto the measuring object, so as to make the second luminous flux interfere with the reflected light of the first luminous flux may be employed.

(Second Embodiment)

Figure 4:
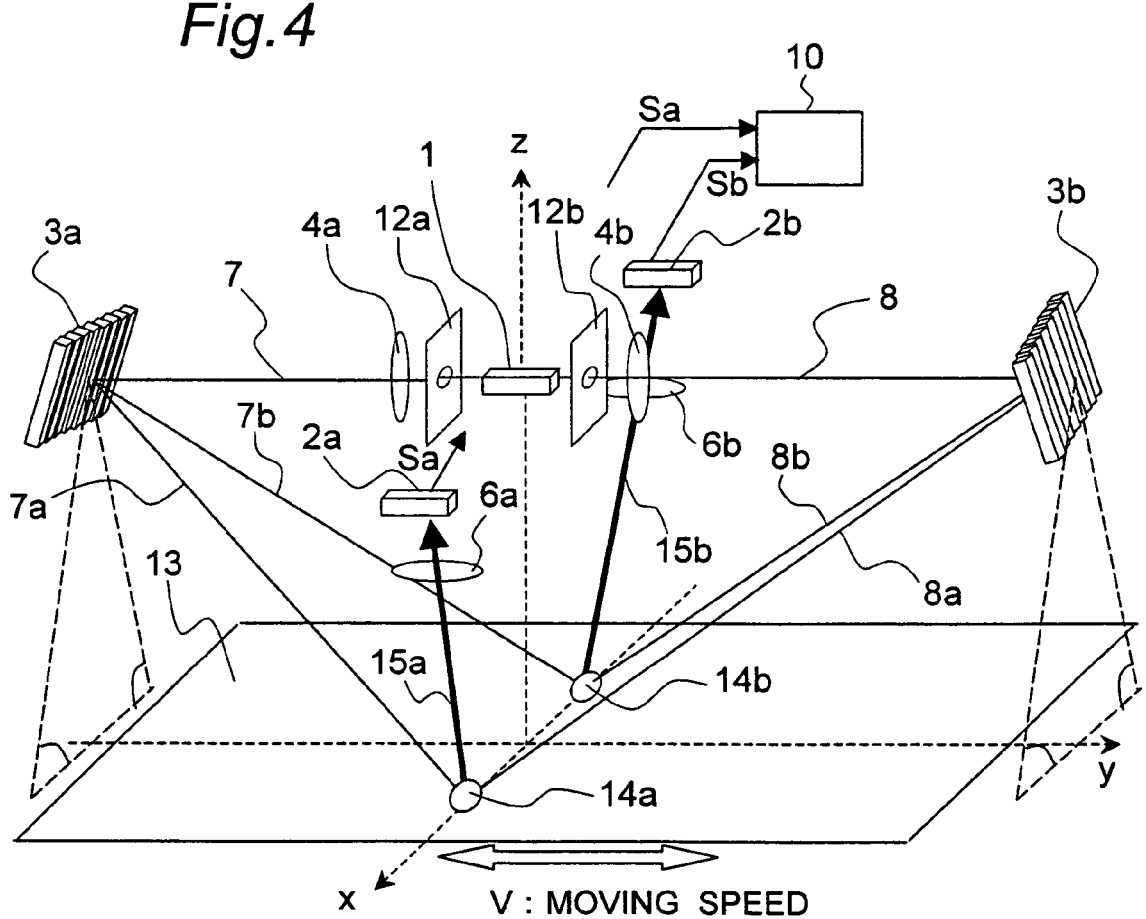
FIG. 4 is a schematic structural diagram of the velocimeter in the second embodiment of the present invention.

FIG. 4 is a schematic structural diagram of the velocimeter in the second embodiment of the present invention. FIG. 4 shows only the arrangement of components such as respective optical components and omits the illustration of other components holding the respective optical components or the like. The arrow shown as a broken line in FIG. 4 denotes the coordinate axis. In FIG. 4, the components identical to the components shown in FIG. 1 have the same reference numerals assigned as in FIG. 1.

The velocimeter is provided with an LD 1, PDs 2a and 2b as examples of photodetectors, CLs 4a and 4b, diffraction gratings 3a and 3b as examples of first and second optical axis changing parts, condenser lenses 6a and 6b as examples of condenser lenses, a signal processing circuit part 10 and apertures 12a and 12b.

The LD 1 is arranged at a coordinate point $(0, 0, z_1)$, the PDs 2a and 2b at $(\pm x_2, 0, z_2)$, the diffraction gratings 3a and $3b$ at $(0, \pm y_3, z_1)$, the CLs $4a$ and $4b$ at $(0, \pm y_4, z_1)$, the condenser lenses $6a$ and $6b$ at $(0, \pm y_6, z_6)$, apertures $12a$ and $12b$ at $(0, \pm y_{12}, z_1)$.

In FIG. 4, 7 denotes a first luminous flux, $7a$ and $7b$ denote ±first order diffracted lights of the diffraction grating $3a$, 8 denotes a second luminous flux, $8a$ and $8b$ denote ±first order diffracted lights of the diffraction grating $3b$, 13 denotes a measuring object, $14a$ and $14b$ denote detection points (beam overlapping areas), and $15a$ and $15b$ denote beat signals. The detection points $14a$ and $14b$ are formed at coordinate points $(\pm x_{14}, 0, 0)$. The surface of the measuring object 13 generally corresponds to the xy-plane.

The signal processing circuit part 10 calculates the frequency shift quantity contained in the scattered light generated at the detection point $14a$ based on output Sa from the PD $2a$, as well as calculates the frequency shift quantity contained in the scattered light generated at the detection point $14b$ based on output Sb from the PD $2b$.

Hereinafter, the structure and functions of the optical system in FIG. 4 will be described.

The first luminous flux 7 is emitted from the front end face of the LD 1 and the second luminous flux 8 is emitted from the rear end face of the LD 1. The first luminous flux 7 and the second luminous flux 8 become a parallel luminous flux through the CLs $4a$ and $4b$ after passing the apertures $12a$ and $12b$. The first luminous flux 7 and the second luminous flux 8 are then split into a plurality of luminous fluxes by the diffraction gratings $3a$ and $3b$, respectively. Here, the incident luminous flux is equiangularly split by the diffraction gratings $3a$ and $3b$ and the splitting angle is dependent on the wavelengths of the incident luminous flux, and consequently, the two luminous fluxes easily overlap each other at the respective detection points $14a$ and $14b$. Hence, the diffraction gratings $3a$ and $3b$ are suitable as optical branch devices for this embodiment.

FIG. 4 shows only ±first order diffracted lights $7a$, $7b$, $8a$ and $8b$ out of ±n order diffracted lights (n represents a natural number, including zero). The ±first order diffracted lights $7a$, $7b$, $8a$ and $8b$ form the detection points $14a$ and $14b$. The beat signal $15a$ scattered on the detection point $14a$ is detected in the PD $2a$ through the condenser lens $6a$, whereas the beat signal $15b$ scattered on the detection point $14b$ is detected in the PD $2b$ through the condenser lens $6b$. The moving speed of the measuring object 13 is detected using the beat signals $15a$ and $15b$ thus detected in a similar process to that described in the abovementioned first embodiment.

As a general rule, when coherent light is made incident on an optically rough surface, the scattered light from the surface is reflected forward in various directions so that a bright and dark pattern called a speckle pattern appears due to the interference of the scattered light. While the bright part is incident on the PD $2a$ and $2b$, the PD $2a$ and $2b$ detect the beat signals so that the moving speed of the measuring object 13 is detected. While the dark part is continuously incident on the PD $2a$ and $2b$, on the other hand, a signal non-sensitive state, so-called dropout, occurs. In this embodiment, where the two detection points $14a$ and $14b$ are formed and the signals are detected by the two light reception systems, even when it is impossible to detect output from either of the systems due to dropout, the signal non-sensitive state is prevented by detecting output from the other system.

In the optical system of this embodiment, where the diffraction gratings $3a$ and $3b$ are employed for splitting a luminous flux, the quantity of light incident on the detection points $14a$ and $14b$ is required to be increased so that the beat signal intensity is increased. As a general rule, a luminous flux is equiangularly split per order into zero order diffracted light, ±first order diffracted lights . . . ±n order diffracted lights; however, when the difference in optical distance caused by the depth of the groove of the diffraction grating is set equal to a quarter of the wavelength of incident light, the difference between optical paths caused by reflection becomes a half of the wavelength thereof so that the phases of lights are shifted away each other by $\pi$, and consequently, almost no zero order diffracted light is emitted. When this condition is applied to the diffraction gratings $3a$ and $3b$, the intensities of the ±first order diffracted lights $7a$, $7b$, $8a$ and $8b$ become approximately 40.5% of the quantities of the incident lights for one side reaching to the maximum so that the quantity of light incident on the detection points $14a$ and $14b$ is maximized, and consequently, the beat signals $15a$ and $15b$ are detected highly precisely. The above description is given for the case in which light is made incident perpendicularly to the diffraction gratings $3a$ and $3b$, i.e., when the diffraction gratings $3a$ and $3b$ are arranged at positions perpendicular to the optical axis of the incident light, whereas in this embodiment shown in FIG. 4, where the diffraction gratings $3a$ and $3b$ are inclined to the −z direction so that the first luminous flux 7 and the second luminous flux 8 as incident luminous fluxes are made incident on the measuring object 13, the depth of the groove of the diffraction gratings $3a$ and $3b$ is required to be adjusted according to the inclination angles of the diffraction gratings $3a$ and $3b$ relative to the z-axis, in a precise sense.

In the optical system of this embodiment, the LD 1 is arranged at a position where the two luminous fluxes emitted from the LD 1 are in parallel with the y-axis, and the extending directions of the grooves of the diffraction gratings $3a$ and $3b$ are in parallel with the yz-plane, as shown in FIG. 4. Therefore, a first plane, a second plane and a third plane form an isosceles triangular prism (isosceles triangles to become the top face and the bottom face of the isosceles triangular prism are shown at both left and right ends (±y directions) in a broken line). Here, the first plane denotes the plane which includes the +first order diffracted light $7a$ by the diffraction grating $3a$ and the +first order diffracted light $8a$ by the diffraction grating $3b$. The second plane denotes the plane which includes the −first order diffracted light $7b$ by the diffraction grating $3a$ and the −first order diffracted light $8b$ by the diffraction grating $3b$. The third plane denotes the plane which includes the surface of the measuring object 13.

When the first plane, the second plane and the third plane form an isosceles triangular prism, the intervals and directions of the interferential fringes shown in FIG. 17 are the same at the detection point $14a$ and the detection point $14b$ with the result that the error in the velocities detected at both detection points $14a$ and $14b$ is minimized even when it is impossible to detect a signal from either of the detection points $14a$ and $14b$ due to dropout.

In addition, since the extending direction of the interference fringes is made perpendicular to the moving direction of the measuring object 13 as shown in FIG. 17 by arranging the whole optical system so that the line which connects the detection point $14a$ with the detection point $14b$ is in parallel with the x-axis and the moving direction of the measuring object 13 is in parallel with the y-axis, the moving speed of the measuring object 13 is detected highly precisely.

The optical axis of the luminous flux incident on the PD $2a$ from the detection point $14a$ is located generally in the plane which bisects the angle made between the two luminous fluxes incident on the detection point 14a (+first order diffracted lights 7a and 8a), as well as the optical axis of the luminous flux incident on the PD 2b from the detection point 14b is located generally in the plane which bisects the angle made between the two luminous fluxes incident on the detection point 14b (−first order diffracted lights 7b and 8b). In this case, the light intensities of scattered lights from the two luminous fluxes are approximately equal at the respective detection points 14a and 14b, so that the beat signals 15a and 15b become clearer with the result that the moving speed of the measuring object 13 is detected highly precisely.

In the optical system of this embodiment, the PDs 2a and 2b are arranged in the regular reflection direction (incident angle=reflection angle) of the xy-plane relative to the first plane and the second plane, respectively. As a general rule, when straightly advancing light reflect, the reflection intensity thereof is highest in the regular reflection direction. Therefore, the beat signal can be detected highest precisely by arranging the light reception system as mentioned above.

Figure 5:
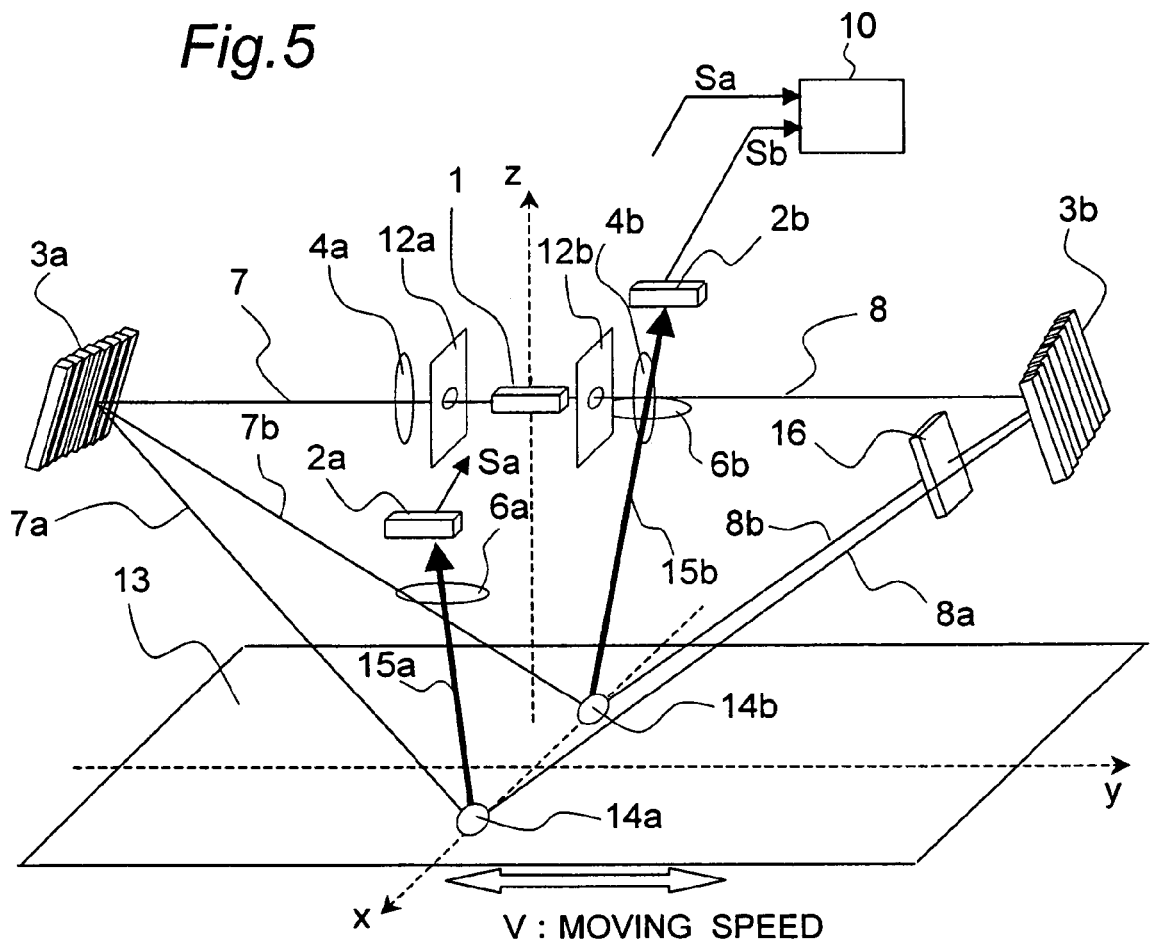
FIG. 5 is a schematic structural diagram of a modified example of the velocimeter of the second embodiment.

FIG. 5 is a schematic structural diagram of a modified example of the velocimeter in this embodiment. FIG. 5 shows only the arrangement of components such as respective optical components and omits other components holding the respective optical components or the like. The arrow shown as a broken line in FIG. 5 denotes the coordinate axis. In FIG. 5, the components identical to the components shown in FIG. 4 have the same reference numerals assigned as in FIG. 4 and the detailed description thereof is omitted here.

The velocimeter shown in FIG. 5 is different from the velocimeter shown in FIG. 4 in that a ¼ wavelength plate 16 through which −first order diffracted light 8b by the diffraction grating 3b transmits is arranged at a coordinate point $(-x_{16}, y_{16}, z_{16})$. The ¼ wavelength plate 16 is an example of a phase changing means.

Generally, the phase of light of the slow phase axis component is delayed in comparison with the phase of light of the fast phase axis component by $\pi/2$ by arranging the optical axis of the ¼ wavelength plate 16 inclined at a 45° relative to the polarization direction of incident light with the result that linear polarized light is converted into circularly polarized light. In FIG. 5, the −first order diffracted light 8b between the ¼ wavelength plate 16 and the measuring object 13 is circularly polarized by the ¼ wavelength plate 16. Referring now to the beat signal detected in the PDs 2a and 2b when the four luminous fluxes (the ±first order diffracted lights 7a, 7b, 8a and 8b) are made incident on the measuring object 13 as shown in FIG. 5 under these circumstances.

The respective luminous fluxes split by the diffraction gratings 3a and 3b, when the distance between the diffraction gratings 3a and the detection point 14a and the distance between the diffraction gratings 3b and the detection point 14b are set to equal, are indicated by the following equations. Note that for the luminous flux which transmits through the ¼ wavelength plate 16 (the −first order diffracted light 8b), only the slow phase axis component after transmitting through the ¼ wavelength plate 16 is shown.

+first order diffracted light 7a: $E_{1a} \cdot \cos(2\pi f_0 t)$ (18)

−first order diffracted light 7b: $E_{1b} \cdot \cos(2\pi f_0 t)$ (19)

+first order diffracted light 8a: $E_{2a} \cdot \cos(2\pi f_0 t)$ (20)

−first order diffracted light 8b: $E_{2b} \cdot \cos(2\pi f_0 t + \pi/2)$ (21)

Here, $E_{1a}$, $E_{1b}$, $E_{2a}$ and $E_{2b}$ denote amplitudes of light, $f_0$ frequency of light and t time.

Next, provided that the +y-axis direction is positive for the moving direction of the measuring object 13, when the Doppler frequency shift component caused by the moving speed V of the measuring object 13 is set as $f_d$, regarding the components of the respective fluxes after being scattered by the measuring object 13, Equations 18–21 become as follows:

+first order diffracted light 7a: $E_{1a} \cdot \cos\{2\pi(f_0 \mp f_d)t\}$ (22)

−first order diffracted light 7b: $E_{1b} \cdot \cos\{2\pi(f_0 \mp f_d)t\}$ (23)

+first order diffracted light 8a: $E_{2a} \cdot \cos\{2\pi(f_0 \pm f_d)t\}$ (24)

−first order diffracted light 8b: $E_{2b} \cdot \cos\{2\pi(f_0 \pm f_d)t + \pi/2\}$ (25)

Consequently, the beat signals 15a and 15b detected in the PDs 2a and 2b are indicated by the following equations:

$$\text{beat signal 15a: } \frac{E_{1a}^2 + E_{2a}^2}{2} + E_{1a} \cdot E_{2a} \cdot \cos\{2\pi(2f_d)t\} \quad (26)$$

$$\text{beat signal 15b: } \frac{E_{1b}^2 + E_{2b}^2}{2} + E_{1b} \cdot E_{2b} \cdot \cos\left\{2\pi(2f_d)t \pm \frac{\pi}{2}\right\} \quad (27)$$

In Equation 27, the sign of the phase component in the cosine of the second term varies according to the moving direction of the measuring object 13. When the object moves along the +y-axis direction, the sign becomes $+\pi/2$, and when the object moves along the −y-axis direction, the sign becomes $-\pi/2$.

Figure 6A:
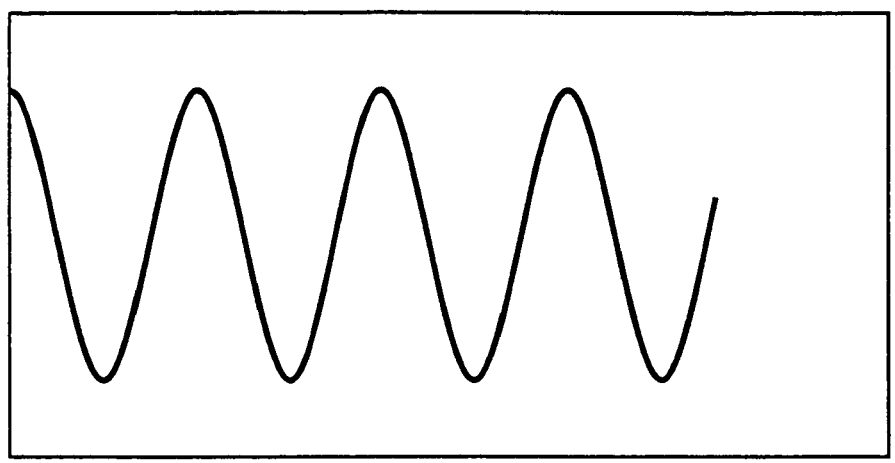
FIGS. 6A–6C are views to illustrate detection of moving direction of a measuring object based on phase information of a beat signal.
Figure 6B:
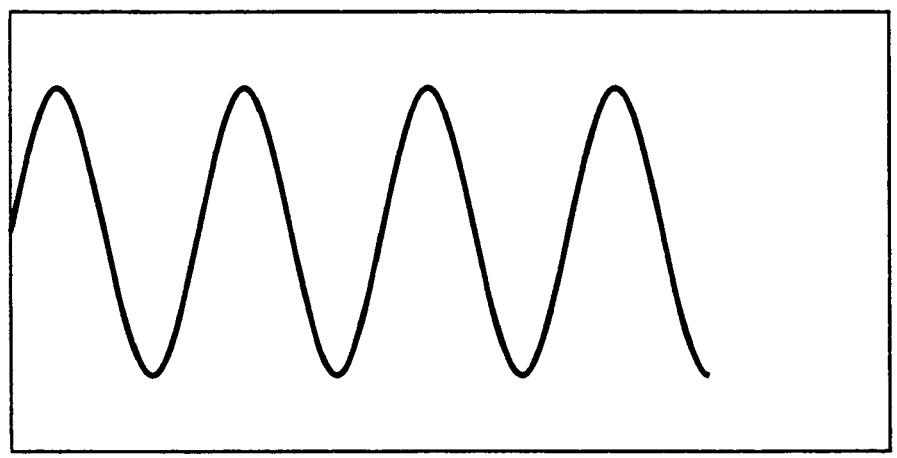
Figure 6C:
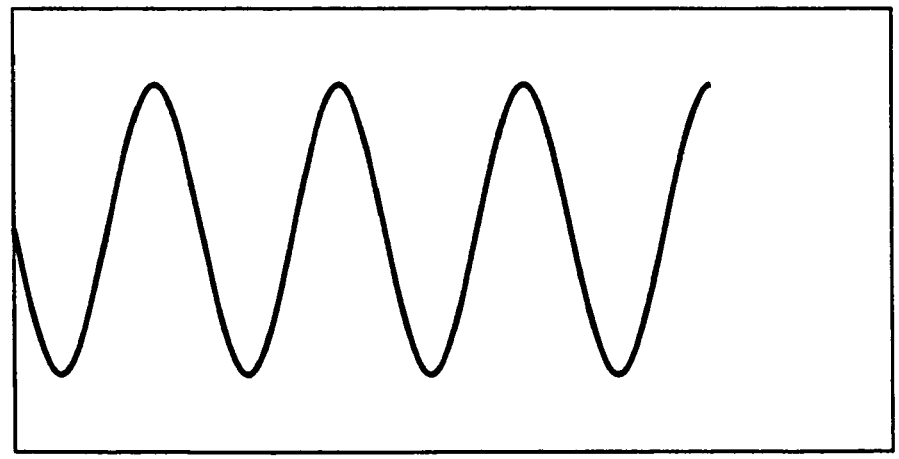

FIGS. 6A–6C show the beat signals 15a and 15b. More specifically, FIG. 6A shows the beat signal 15a which is indicated by the above Equation 26. This beat signal 15a is independent of the moving direction of the measuring object 13. FIG. 6B shows the beat signal 15b when the measuring object 13 moves leftwards (the −y-axis direction), and FIG. 6C shows the beat signal 15b when the measuring object 13 moves rightwards (the +y-axis direction).

It can be seen from FIGS. 6A–6C that the phase of the beat signal 15b is shifted away by $\pi/2$ according to the moving direction of the measuring object 13. Therefore, the moving speed of the measuring object 13 is detected by arranging a linear polarizer (not shown) between the PD 2b and the detection point 14b along the direction where the slow phase axis component transmits so as to detect the beat signal 15. Thus, the moving speed and moving direction of the measuring object 13 are detected by arranging the ¼ wavelength plate 16 through which the −first order diffracted light 8b transmits.

Determining whether the phase of the beat signal 15b is ahead or delayed in comparison with the phase of the beat signal 15a is sufficient to detect the moving direction of the measuring object 13, and accordingly, when the phase difference between the beat signal 15a and the beat signal 15b is set as $\xi$, the phase difference may be within the following range:

$-\pi < \xi < \pi$ (28)

Here, phase changing quantity $\phi$ by the phase changing means is required to be as follows:

$0 < \phi < \lambda/2$ (29)

For a material of a member which gives such a phase difference of light, a birefringent material which varies in a refractive index with respect to the incident direction of light is generally employed. The birefringent material is suitable for a material of the phase changing means.

However, in the actual optical system, where factors such as a shift caused by the arrangement of respective optical components, the distances of the respective luminous fluxes to the detection points 14a and 14b vary. Here, the scattered lights from the respective detection points 14a and 14b are indicated by the following equations:

+first order diffracted light 7a: $E_{1a} \cdot \cos\{2\pi(f_0 \mp f_d)t + \phi_{1a}\}$ (30)

−first order diffracted light 7b: $E_{1b} \cdot \cos\{2\pi(f_0 \mp f_d)t + \phi_{1b}\}$ (31)

+first order diffracted light 8a: $E_{2a} \cdot \cos\{2\pi(f_0 \pm f_d)t + \phi_{2a}\}$ (32)

−first order diffracted light 8b: $E_{2b} \cdot \cos\{2\pi(f_0 \pm f_d)t + \phi_{2b} + \phi_0\}$ (33)

Note that for the −first order diffracted light 8b, only the slow phase axis component after transmitting through the ¼ wavelength plate 16 is shown, $\phi_{1a}$, $\phi_{1b}$, $\phi_{2a}$ and $\phi_{2b}$ denote phase components of the respective luminous fluxes (the ±first order diffracted lights 7a, 7b, 8a and 8b), and $\phi_0$ denotes phase changing quantity by the phase changing means. Consequently, the beat signals 15a and 15b detected in the PDs 2a and 2b are indicated by the following equations:

$$\text{beat signal 15a: } \frac{E_{1a}^2 + E_{2a}^2}{2} + E_{1a} \cdot E_{2a} \cdot \cos\{2\pi(2f_d)t \mp (\phi_{1a} - \phi_{2a})\} \quad (34)$$

$$\text{beat signal 15b: } \frac{E_{1b}^2 + E_{2b}^2}{2} + E_{1b} \cdot E_{2b} \cdot \cos\{2\pi(2f_d)t \mp (\phi_{1b} - \phi_{2b} - \phi_0)\} \quad (35)$$

Based on Equations 28, 34 and 35, the phase condition required for moving direction detection is indicated by the following equation:

$$0 < |(\phi_{1a} - \phi_{1b}) - (\phi_{2a} - \phi_{2b} - \phi_0)| < \pi \quad (36)$$

Detecting the moving direction of the measuring object 13 is made possible by arranging respective optical components so that the above Equation 36 is satisfied. When the ¼ wavelength plate 16 is employed as an example of a phase changing means, the above Equation 36 becomes as follows:

$$0 < |(\phi_{1a} - \phi_{1b}) - (\phi_{2a} - \phi_{2b})| < \frac{\pi}{2} \quad (37)$$

And a margin for arranging respective optical components can be taken against distortion of the phase components of the respective luminous fluxes (the ±first order diffracted lights 7a, 7b, 8a and 8b).

The moving direction of the measuring object 13 is detected based on a similar theory of phase difference to that described above, by arranging the ¼ wavelength plate 16 for the three luminous fluxes (the ±first order diffracted lights 7a, 7b and 8a) other than the −first order diffracted lights 8b and providing no ¼ wavelength plate 16 for the −first order diffracted lights 8b. That is, the moving direction of the measuring object 13 is detected by arranging the ¼ wavelength plate 16 so as for the respective ±first order diffracted lights 7a, 7b and 8a to transmit through the ¼ wavelength plate, while the −first order diffracted lights 8b is not made to transmit through the ¼ wavelength plate.

The discussion of the detection of the moving direction of the measuring object 13 and the phase difference in the modified example of the velocimeter in this embodiment similarly relates to all of the following embodiments and the discussion thereof will be omitted for the following embodiments.

Figure 7:
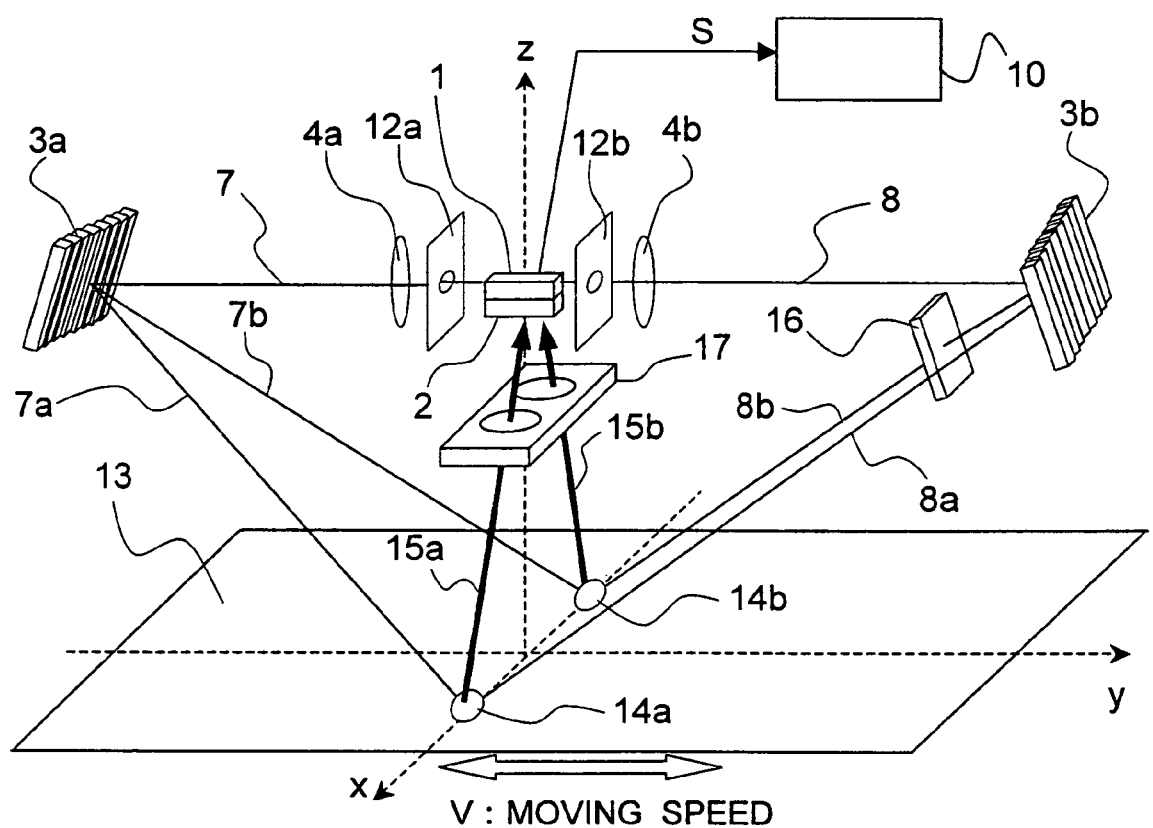
FIG. 7 is a schematic structural diagram of another modified example of the velocimeter of the second embodiment.

FIG. 7 is a schematic structural diagram of another modified example of the velocimeter in this embodiment. FIG. 7 shows only the arrangement of components such as respective optical components and omits other components such as a component holding the respective optical components and a signal processing circuit for a detected signal. The arrow shown as a broken line denotes the coordinate axis. In FIG. 7, the components identical to the components shown in FIG. 5 have the same reference numerals assigned as in FIG. 5 and the detailed description thereof is omitted here.

The velocimeter shown in FIG. 7 is different from the velocimeter shown in FIG. 5 in that a condenser lens array 17, which is a single component, is employed instead of the condenser lenses 6a and 6b for detecting the two beat signals 15a and 15b, and that the PD 2 for detecting the beat signals 15a and 15b is formed in the same chip as the LD 1. The condenser lens array 17 is an example of a condenser lens.

Based on the abovementioned structure, the optical system shown in FIG. 7 reduces the number of components in comparison with the optical systems shown in FIG. 5 and FIG. 6, and the PD 2 is formed in the same chip as the LD 1, so that the device is miniaturized. A photodetector area is further reduced by employing a divided type PD instead of a plurality of PDs formed in the same chip, so that the production cost is lowered and the device can be further miniaturized. The device structure shown in FIG. 7, where the number of components is reduced, similarly relates to all of the following embodiments and the description thereof will be omitted for the following embodiments.

Figure 8:
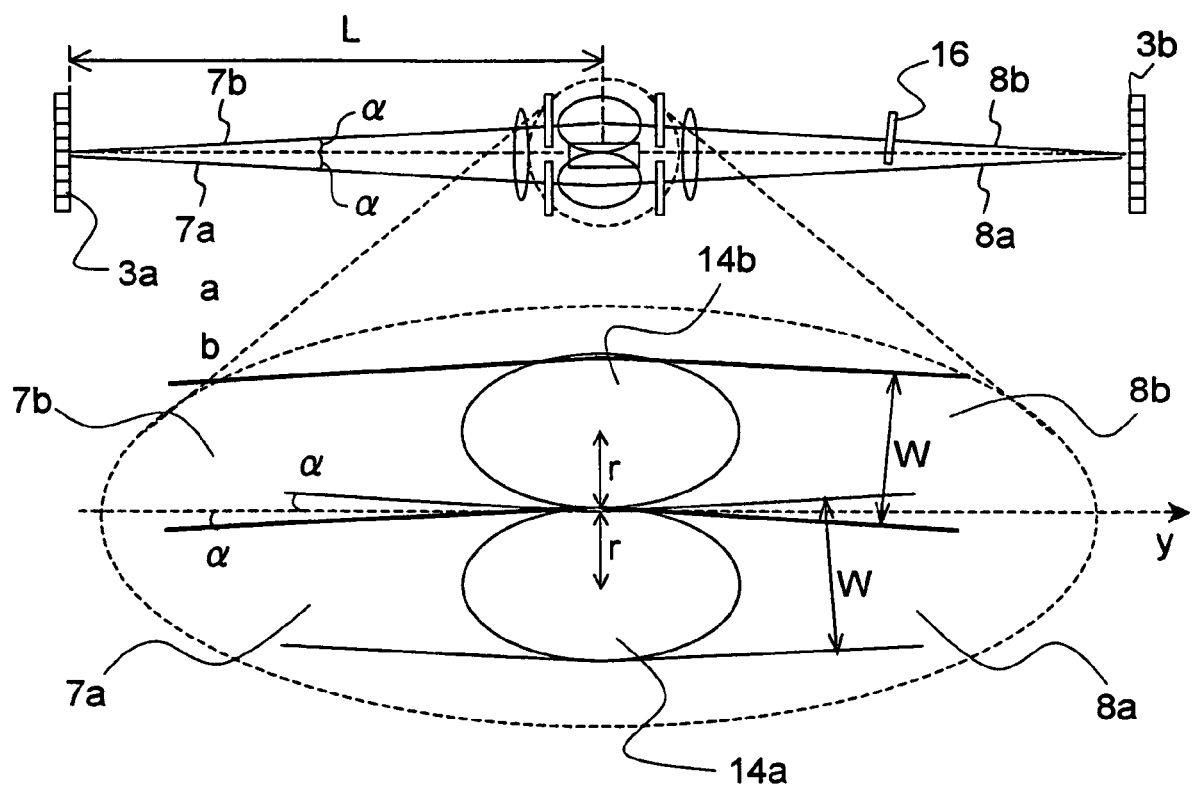
FIG. 8 is a schematic diagram of conditions required for the detection point.

FIG. 8 is an overhead schematic view (viewed from the +z-axial direction) showing the velocimeter of FIG. 7. On the lower side of FIG. 8, there is an enlarged view of the portion enclosed with small circle of dotted line shown on the upper side of FIG. 8. That is, the drawing on the lower side of FIG. 8 shows an enlarged view of an area adjacent to the detection points 14a and 14b.

As the distance between the detection point 14a and the detection point 14b is increased, the device is larger in size and the quantity of light received by the condenser lens array 17 is decreased. Regarding the phase difference of the respective luminous fluxes (the ±first order diffracted lights 7a, 7b, 8a and 8b), when the detection points are separated from each other, the phase difference thereof becomes larger with the result that detecting the moving direction of the measuring object 13 becomes difficult. The distance between the detection point 14a and the detection point 14b is determined by a diffraction angle α of the diffraction gratings 3a and 3b. When the detection point 14a and the detection point 14b overlap each other, the beat signal from the respective detection points 14a and 14b is detected as noise, so that factors such as the pitches of the respective diffraction gratings 3a and 3b, the diameters W of the apertures 12a and 12b and the distances L among the respective components are required to be set to satisfy the following equation, based on FIG. 8:

$$\alpha > \mathrm{Tan}^{-1}\left(\frac{w}{2L}\right) \quad (38)$$

The distance between the detection points similarly relates to all of the following embodiments and the description thereof will be omitted for the following embodiments.

(Third Embodiment)

Figure 9:
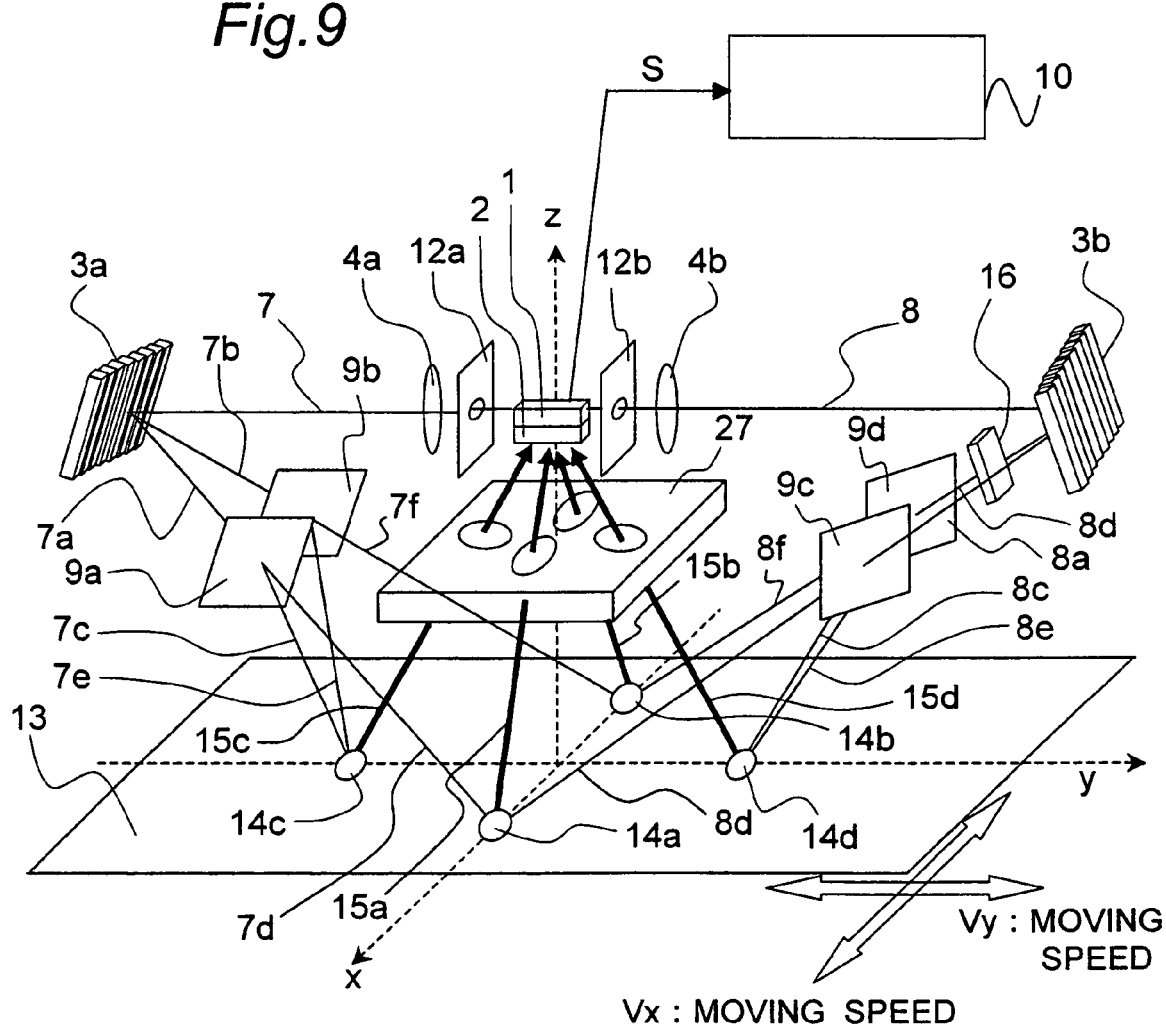
FIG. 9 is a schematic structural diagram of the velocimeter in the third embodiment of the present invention.

FIG. 9 is a schematic structural diagram of the velocimeter in the third embodiment of the present invention. FIG. 9 shows only the arrangement of components such as respective optical components and omits other components such as holding the respective optical components. The arrow shown in a broken line in FIG. 9 denotes the coordinate axis. In FIG. 9, the components identical to the components shown in FIG. 7 have the same reference numerals assigned as in FIG. 7.

The velocimeter shown in FIG. 9 is provided with an LD 1, a PD 2, diffraction gratings 3a and 3b, CLs 4a and 4b, beam splitters (hereinafter, referred to as BS) 9a, 9b, 9c and 9d, a signal processing circuit part 10, apertures 12a and 12b, a ¼ wavelength plate 16 and a condenser lens array 27 as an example of a condenser lens.

The LD 1 is arranged at a coordinate point $(0, 0, z_1)$, the PD 2 at $(0, 0, z_2)$, the diffraction gratings 3a and 3b at $(0, \pm y_3, z_1)$, the CLs 4a and 4b at $(0, \pm y_4, z_1)$, the BSs 9a, 9b, 9c and 9d at $(\pm x_9, \pm y_9, z_9)$, the apertures 12a and 12b at $(0, \pm y_{12}, z_1)$, the ¼ wavelength plate 16 at $(-x_{16}, y_{16}, z_{16})$ and the condenser lens array 27 at $(0, 0, z_{27})$.

In FIG. 9, 7 denotes a first luminous flux, 7a and 7b denote ±first order diffracted lights by the diffraction grating 3a, 7c and 7d denote luminous fluxes obtained by splitting the +first order diffracted light 7a by the BS 9a, 7e and 7f denote luminous fluxes obtained by splitting the −first order diffracted light 7b by the BS 9b, 8 denotes a second luminous flux, 8a and 8b denote the ±first order diffracted lights by the diffraction grating 3b, 8c and 8d denote luminous fluxes obtained by splitting the +first order diffracted light 8a by the BS 9c, 8e and 8f denote luminous fluxes obtained by splitting the −first order diffracted light 8b by the BS 9d, 13 denotes a measuring object, 14a, 14b, 14c and 14d denote detection points (beam overlapping areas), and 15a, 15b, 15c, 15d denote beat signals. The detection points 14a and 14b are formed at $(\pm x_{14}, 0, 0)$ and the detection points 14c and 14d are formed at $(0, \pm y_{14}, 0)$. The surface of the measuring object 13 which is irradiated with the luminous fluxes 7c, . . . , 7f and the luminous fluxes 8c, . . . , 8f approximately corresponds to the xy-plane.

The signal processing circuit part 10 calculates the frequency shift quantity contained in the scattered light generated at the respective detection points 14a, 14b, 14c and 14d based on output S from the PD.

Hereinafter, the structure and functions of the optical system in FIG. 9 will be described.

The first luminous flux 7 is emitted from the front end face of the LD 1 and the second luminous flux 8 is emitted from the rear end face of the LD 1. The first luminous flux 7 and the second luminous flux 8 become a parallel luminous flux by passing the CLs 4a and 4b after passing the apertures 12a and 12b. The first luminous flux 7 and the second luminous flux 8 are then split into a plurality of luminous fluxes by the diffraction gratings 3a and 3b, respectively.

FIG. 9 shows only +first order diffracted lights 7a, 7b, 8a and 8b out of ±n order diffracted lights (n represents a natural number, including zero). As a general rule, a luminous flux is equiangularly split per order into zero order diffracted light, ±first order diffracted lights . . . ±n order diffracted lights; however, when the difference in the optical distance caused by the depth of the groove of the diffraction grating is set equal to a quarter of the wavelength, the difference between optical paths caused by reflection becomes a half of the wavelength so that the phases of lights are shifted away each other by n, and consequently, almost no zero order diffracted light is emitted. That is, the phases of the light reflected by the groove of the diffraction grating and the light reflected by the portion other than the groove of the diffraction grating are shifted away each other by π, so that almost no zero order diffracted light is emitted. When this condition is applied to the diffraction gratings 3a and 3b, the intensities of the ±first order diffracted lights 7a, 7b, 8a and 8b of the diffraction gratings 3a and 3b are about 40.5% of the quantity of the incident light for one side (+n order diffracted lights or −n order diffracted light) reaching to the maximum. As a result, the quantities of light incident on the detection points 14a, 14b, 14c and 14d are maximized, and consequently, the beat signals 15a, 15b, 15c and 15d are detected highly precisely. The above description is given for the case in which light is made incident perpendicularly to the diffraction gratings 3a and 3b, and the diffraction gratings 3a and 3b are arranged at positions perpendicular to the optical axis of the incident light, whereas in this embodiment shown in FIG. 9, since the diffraction gratings 3a and 3b are inclined to the −z direction so that incident luminous fluxes (the first luminous flux 7 and the second luminous flux 8) are made incident on the measuring object 13, the depth of the groove of the diffraction gratings 3a and 3b are required to be adjusted according to the inclination angles of the diffraction gratings in a precise sense.

The first luminous flux 7 is split into two luminous fluxes (the ±first order diffracted lights 7a and 7b) by the diffraction grating 3a and the second luminous flux 8 is split into two luminous fluxes (the ±first order diffracted lights 8a and 8b) by the diffraction grating 3b. Furthermore, the four luminous fluxes (±first order diffracted lights 7a, 7b, 8a and 8b) are split into eight luminous fluxes 7c, 7d, 7e, 7f, 8c, 8d, 8e and 8f by the BSs 9a, 9b, 9c and 9d. The two luminous fluxes of one group (the ±first order diffracted lights 7a and 7b) are split into four luminous fluxes 7c, 7d, 7e and 7f by the BSs 9a and 9b, and the two luminous fluxes of the other group (the ±first order diffracted lights 8a and 8b) are split into four luminous fluxes 8c, 8d, 8e and 8f by the BSs 9c and 9d. More specifically, the +first order diffracted light 7a is split into the luminous fluxes 7c and 7d by the BS 9a and the −first order diffracted light 7b is split into the luminous fluxes 7e and 7f by the BS 9b. Similarly, the +first order diffracted light 8a is split into the luminous fluxes 8c and 8d by the BS 9c and the −first order diffracted light 8b is split into the luminous fluxes 8e and 8f by the BS 9d. In this case, BSs 9a, 9b, 9c and 9d, as optical branch devices, split incident light into two luminous fluxes having a light intensity of 1:1. Since BSs 9a, 9b, 9c and 9d reduce loss of light quantity caused by split, the quantity of light irradiated onto the detection points 14a, 14b, 14c and 14d is increased, with the result that the decreases in the intensities of the beat signals 15a, 15b, 15c and 15d is prevented.

In the optical system of this embodiment, at the detection points 14a and 14b, where respective incident luminous fluxes are made incident from the ±y directions, the interference fringes of a bright and dark pattern are formed along the x-axis direction as shown in FIG. 17 and the velocity component crossing the interference fringes is detected. Therefore, the y-axis component regarding the moving speed of the measuring object 13 is detected based on the beat signals 15a and 15b detected at the detection points 14a and 14b. That is, the moving speed $V_y$ of the measuring object 13 in the y-axis direction is detected.

In the optical system, the luminous fluxes 7c, 7e, 8c and 8e split by the BSs 9a, 9b, 9c and 9d form the detection points 14c and 14d. Since all of the luminous fluxes 7c, 7e, 8c and 8e are made incident on the detection points 14c and 14d from the ±x directions, the interference fringes of a bright and dark pattern are formed along the y-axis direction. Therefore, the x-axis component regarding the moving speed of the measuring object 13 is detected based on the beat signals 15c and 15d detected at the detection points 14c and 14d. That is, the moving speed $V_x$ of the measuring object 13 in the x-axis direction is detected.

Thus, in the optical system of this embodiment, a two-dimensional moving speed can be detected, while the moving direction of the measuring object and the optical axis of the luminous flux incident on the detection point are not required to be adjusted so as to obtain the moving speed.

As described in the first embodiment, when the overlapped areas of the two luminous fluxes incident on the respective detection points 14a, 14b, 14c and 14d are shifted away each other, the scattered light from the shifted areas (areas where the two luminous fluxes do not overlap) are detected as DC noise as shown in FIG. 2B, with the result that the S/N is lowered. As shown in FIG. 9, the optical system of this embodiment is arranged so that the two luminous fluxes emitted from the LD 1 are in parallel with the y-axis and that the groove direction of the diffraction gratings 3a and 3b (the direction to which the grooves extend) are in parallel with the yz-plane, and consequently, the first plane, the second plane and the third plane form an isosceles triangular prism, similarly to the second embodiment. Here, the first plane denotes the plane which includes the ±first order diffracted light 7a by the diffraction grating 3a and the ±first order diffracted light 8a by the diffraction grating 3b. That is, the first plane includes the optical axes of the two luminous fluxes 7d and 8d incident on the detection point 14a. The second plane denotes the plane which includes the −first order diffracted light 7b by the diffraction grating 3a and the −first order diffracted light 8b by the diffraction grating 3b. That is, the second plane includes the optical axes of the two luminous fluxes 7f and 8f incident on the detection point 14b. The third plane denotes the plane which includes the xy-plane. When the forgoing first plane, second plane and third plane form an isosceles triangular prism, the intervals and directions of the interferential fringes shown in FIG. 17 are the same at the detection point 14a and the detection point 14b with the result that the error in the velocities detected at both detection points 14a and 14b is minimized even when it is impossible to detect a signal from either of the detection points 14a and 14b due to dropout.

The BSs 9a, 9b, 9c and 9d are arranged so that the two luminous fluxes incident on the respective detection points 14c and 14d are made incident on the xy-plane at the identical angle. As a result, similarly to the case in which the moving speed $V_y$ of the measuring object 13 in the y-axis direction is detected using the detection points 14a and 14b, the error in the velocities detected at both detection points 14c and 14d is minimized even when it is impossible to detect a signal from either of the detection points 14c and 14c due to dropout.

The optical axis of the luminous flux incident on the PD 2 from the detection point 14a is located generally within the plane which bisects the intersection angle of the two luminous fluxes 7d and 8d incident on the detection point 14a. The optical axis of the luminous flux incident on the PD 2 from the detection point 14b is located generally within the plane which bisects the intersection angle of the two luminous fluxes 7f and 8f incident on the detection point 14b. The optical axis of the luminous flux incident on the PD 2 from the detection point 14c is located generally within the plane which bisects the intersection angle of the two luminous fluxes 7c and 7e incident on the detection point 14c. The optical axis of the luminous flux incident on the PD 2 from the detection point 14d is located generally within the plane which bisects the intersection angle of the two luminous fluxes 8c and 8e incident on the detection point 14d. In this case, the light intensities of the scattered lights from the two luminous fluxes incident on the respective detection points 14a, 14b, 14c and 14d are approximately equal, so that the beat signals 15a, 15b, 15c and 15d become clearer with the result that the moving speed of the measuring object 13 is detected highly precisely.

The −first order diffracted light 8b by the diffraction grating 3b is converted from linear polarized light to circularly polarized light by the ¼ wavelength plate 16 before being split by the BS 9d. Therefore, the luminous fluxes 8e and 8f from the BS 9d are made incident on the measuring object 13 as circularly polarized lights. The luminous fluxes 7c, 7d, 7e, 7f, 8c, 8d, 8e and 8f from the BSs 9a, 9b, 9c and 9d form the detection points 14a, 14b, 14c and 14d. More particularly, the luminous flux 7d and the luminous flux 8d form the detection point 14a, the luminous flux 7f and the luminous flux 8f form the detection point 14b, the luminous flux 7c and the luminous flux 7e form the detection point 14c, and the luminous flux 8c and the luminous flux 8e form the detection point 14d. The beat signals 15a, 15b, 15c and 15d scattered on the respective detection points 14a, 14b, 14c and 14d are detected in the PD 2 through the condenser lens array 27. The principle for detecting the moving speed of the measuring object 13 based on output S from the PD 2 is similar to those employed in the first and the second embodiments.

In the optical system of this embodiment, where the beat signal 15a and the beat signal 15b are different in signal intensity but these beat signals are similar to the second embodiment in terms of detecting the moving speed and moving direction of the measuring object 13, thus the moving speed $V_y$ of the measuring object 13 and the y-axis component of the moving direction of the measuring object 13 are detected by the beat signals 15a and 15b. The moving speed $V_x$ of the measuring object 13 is detected by the beat signals 15c and 15d detected at the detection points 14c and 14c. Since the phase of the luminous flux 8e incident on the detection point 14d is circularly polarized through the ¼ wavelength plate 16, based on a similar principle to the principle for detecting the moving direction of the measuring object 13 in the second embodiment, the x-axis component of the moving direction of the measuring object 13 is detected. In a word, the moving speeds $V_x$ and $V_y$ of the measuring object 13 in the x-axis and y-axis directions are detected by the beat signals 15a, 15b, 15c and 15d, as well as the moving directions of the measuring object 13 regarding the x-axis and y-axis directions are detected.

Thus, in the optical system of this embodiment, which eliminates the need that the arrangement of the moving direction of the measuring object 13 and the axis of the system have to be adjusted, the speed information and moving direction regarding an arbitrary xy-plane movement are detected. The conditions and so on for handling the phase relating to moving direction detection for both the x component and y component are similar to the conditions required in the second embodiment.

As shown in FIG. 9, the velocity components of the two mutually orthogonal directions of the measuring object 13 are detected by forming the detection points 14a and 14b for detecting the y-direction component of the moving speed of measuring object 13 along the x-axis, as well as forming the detection points 14c and 14d for detecting the x-direction component of the moving speed of measuring object 13 along the y-axis. As a result, the moving speed of the measuring object 13 is detected highly precisely.

Figure 10:
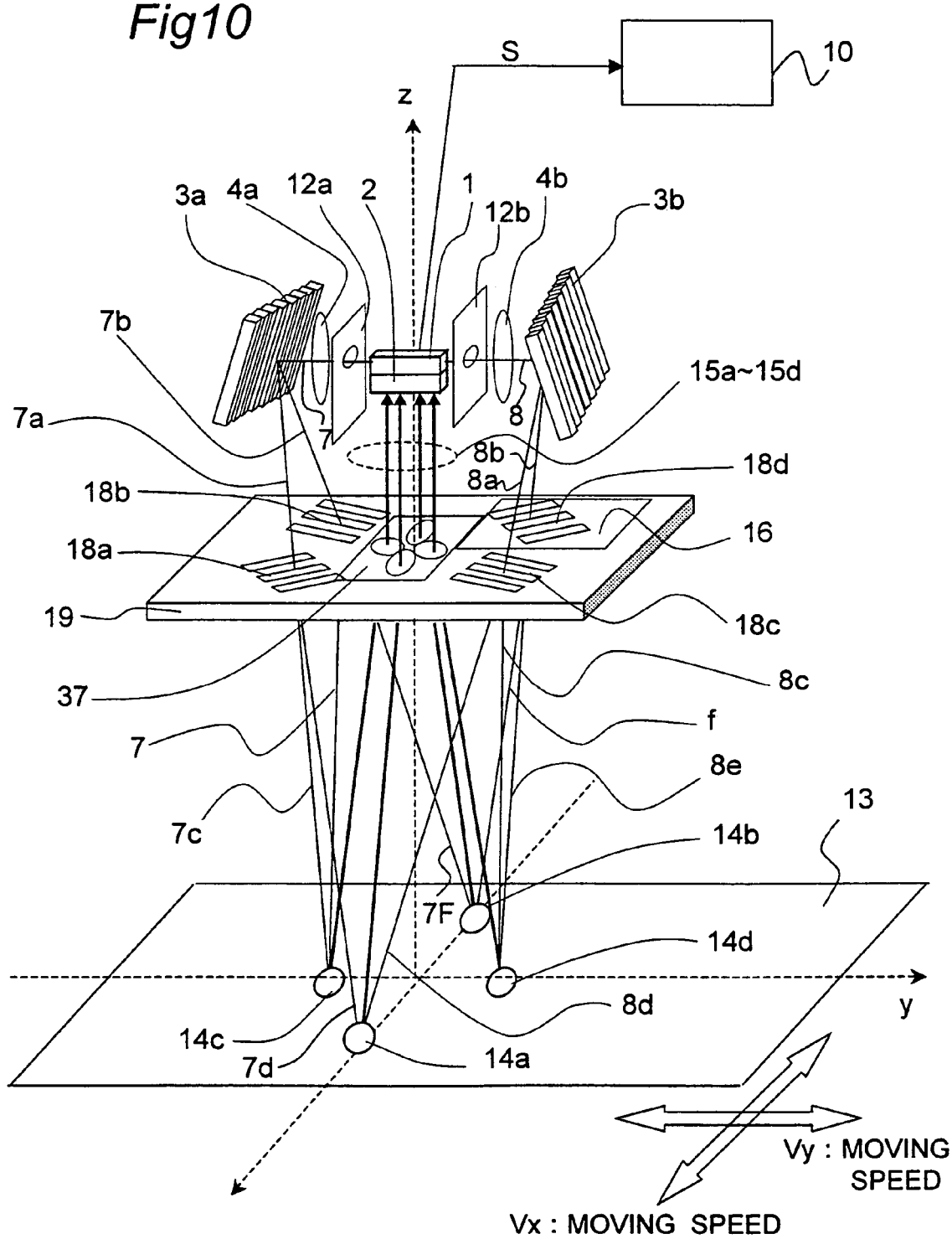
FIG. 10 is a schematic structural diagram of a modified example of the velocimeter of the third embodiment.

FIG. 10 is a schematic structural diagram of a modified example of the velocimeter in this embodiment. FIG. 10 shows only the arrangement of components such as respective optical components and omits other components such as holding the respective optical components. The arrow shown as a broken line in FIG. 10 denotes the coordinate axis. In FIG. 10, the components identical to the components shown in FIG. 9 have the same reference numerals assigned as in FIG. 9.

The velocimeter in FIG. 10 is provided with an LD 1, a PD 2, diffraction gratings 3a and 3b, CLs 4a and 4b, a signal processing circuit part 10, apertures 12a and 12b and a first board 19. On the first board 19, there are provided a ¼ wavelength plate 16, diffraction gratings 18a, 18b, 18c and 18d, and a condenser lens array 37 as an example of a condenser lens. The ¼ wavelength plate 16 is arranged on the diffraction grating 18d.

The LD 1 is arranged at a coordinate point $(0, 0, z_1)$, the PD 2 at $(0, 0, z_2)$, the diffraction gratings 3a and 3b at $(0, \pm y_3, z_1)$, the CLs 4a and 4b at $(0, \pm y_4, z_1)$, the apertures 12a and 12b at $(0, \pm y_{12}, z_1)$, the ¼ wavelength plate 16 at $(-x_{16}, y_3, z_{16})$. The condenser lens array 37 is arranged at $(0, 0, z_{16})$.

In FIG. 10, 7 denotes a first luminous flux, 7a and 7b denote ±first order diffracted lights by the diffraction grating 3a, 7c and 7d denote luminous fluxes obtained by splitting the +first order diffracted light 7a by the diffraction gratings 18a, 7e and 7f denote luminous fluxes obtained by splitting the −first order diffracted light 7b by the diffraction gratings 18b, 8 denotes a second luminous flux, 8a and 8b denote ±first order diffracted lights by the diffraction grating 3b, 8c and 8d denote luminous fluxes obtained by splitting the +first order diffracted light 8a by the diffraction gratings 18c, 8e and 8f denote luminous fluxes obtained by splitting the −first order diffracted light 8d by the diffraction gratings 18d, 13 denotes a measuring object, 14a, 14b, 14c and 14d denote detection points (beam overlapping areas), and 15a, 15b, 15c and 15d denote beat signals. The detection points 14a and 14b are formed at $(\pm x_{14}, 0, 0)$ and the detection points 14c and 14d are formed at $(0, \pm y_{14}, 0)$. The surface of the measuring object 13 which is irradiated with the luminous fluxes 7c, . . . , 7f and the luminous fluxes 8c, . . . , 8f approximately corresponds to the xy-plane.

The signal processing circuit part 10 calculates the frequency shift quantity contained in the scattered lights generated at the respective detection points 14a, 14b, 14c and 14d based on output S from the PD2.

Hereinafter, the structure and functions of the optical system in FIG. 10 will be described.

The first luminous flux 7 is emitted from the front end face of the LD 1 and the second luminous flux 8 is emitted from the rear end face of the LD 1. The first luminous flux 7 and the second luminous flux 8 become a parallel luminous flux by passing the CLs 4a and 4b after passing the apertures 12a and 12b. The first luminous flux 7 and the second luminous flux 8 are then split into a plurality of luminous fluxes by the diffraction gratings 3a and 3b, respectively. FIG. 9 shows only ±first order diffracted lights 7a, 7b, 8a and 8b out of ±n order diffracted lights (n represents a natural number, including zero).

The first luminous flux 7 is split into two luminous fluxes (the ±first order diffracted lights 7a and 7b) by the diffraction grating 3a and the second luminous flux 8 is split into two luminous fluxes (the ±first order diffracted lights 8a and 8b) by the diffraction grating 3b. The +first order diffracted light 7a of the diffraction grating 3a is split into two luminous fluxes 7c and 7d by the diffraction grating 18a, and the −first order diffracted light 7b of the diffraction grating 3a is split into two luminous fluxes 7e and 7f by the diffraction grating 18b. Also, the +first order diffracted light 8a of the diffraction grating 3b is split into two luminous fluxes 8c and 8d by the diffraction grating 18c, and the −first order diffracted light 8b of the diffraction grating 3b is split into two luminous fluxes 8e and 8f by the diffraction grating 18d. Here, the diffraction gratings 18a, 18b, 18c and 18d, which are similar to the case of the diffraction gratings 3a and 3b, the depth of whose groove is set equal to a quarter of the wavelength of incident light, so that almost no zero order diffracted light is emitted and the intensities of the ±first order diffracted lights are maximum. As a result, the quantities of lights incident on the respective detection points 14a, 14b, 14c and 14d are maximized and the intensity of the beat signal is maximized.

The −first order diffracted light 8b of the diffraction grating 3b is converted from linear polarized light to circularly polarized light by the ¼ wavelength plate 16 before being split by the diffraction grating 18d. Therefore, the luminous fluxes 8e and 8f are made incident on the surface of the measuring object 13 as circularly polarized lights. The diffraction gratings 18a, 18b, 18c and 18d are respectively inclined to the x- and y-axis directions at arbitrary angles on the first board 19. The respective luminous fluxes 7c, 7d, 7e, 7f, 8c, 8d, 8e and 8f emitted from the diffraction gratings 18a, 18b, 18c and 18d form the detection points 14a, 14b, 14c and 14d. More specifically, the luminous flux 7d and the luminous flux 8d form the detection point 14a, the luminous flux 7f and the luminous flux 8f form the detection point 14b, the luminous flux 7c and the luminous flux 7e form the detection point 14c, and the luminous flux 8c and the luminous flux 8e form the detection point 14d. The inclination angles of the diffraction gratings 18a, 18b, 18c and 18d on the first board 19 and the distance between the first board 19 and the measuring object 13 are set so that the detection points 14a, 14b, 14c and 14d are formed as described above. That is, angles and the distance are set so that the luminous flux 7d and the luminous flux 8d overlap each other, the luminous flux 7f and the luminous flux 8f overlap each other, the luminous flux 7c and the luminous flux 7e overlap each other, and the luminous flux 8c and the luminous flux 8e overlap each other on the surface of the measuring object 13.

In the velocimeter in FIG. 10, the diffraction gratings 18a, 18b, 18c and 18d are formed on the identical board, so that positional shift caused by the arrangement of the diffraction gratings 18a, 18b, 18c and 18d is prevented. Therefore, the velocimeter in FIG. 10 reduces failure in the overlap of luminous fluxes at the detection points 14a, 14b, 14c and 14d as compared with the velocimeter in FIG. 9.

In the velocimeter in FIG. 10, the beat signals 15a, 15b, 15c and 15d scattered on the respective detection points 14a, 14b, 14c and 14d are detected in the PD 2 through the condenser lens array 37. The detection principle of the moving speed of the measuring object 13 based on output S from the PD 2 is similar to that employed in the first embodiment.

The velocimeter in FIG. 10, where the four detection points 14a, 14b, 14c and 14d are formed, detects the two-dimensional moving speed and moving direction of the measuring object 13 in a similar way to the velocimeter in FIG. 9.

In the velocimeter in FIG. 10, the diffraction gratings 18a, 18b, 18c and 18d, the ¼ wavelength plate 16 and the condenser lens array 37 are built on the first board 19 to become a single component, so that the number of components is reduce as compared with the velocimeter in FIG. 9. Therefore, the production cost of the velocimeter in FIG. 10 is lowered by reducing the number of assembling processes.

In the velocimeter in FIG. 10, the diffraction gratings 18a, 18b, 18c and 18d, the ¼ wavelength plate 16 and the condenser lens array 37 are integrated into a single component, so that the setting accuracy of the diffraction gratings 18a, 18b, 18c and 18d, the ¼ wavelength plate 16 and the condenser lens array 37 in the optical system is improved as compared with the velocimeter in FIG. 9 and design margin to satisfy the conditional equation given by abovementioned Equation 36 is increased.

In this embodiment, the number of the detection points is increased as compared with the second embodiment so as to detect speed along the x-direction. In the second embodiment, the condition that the detection points for detecting speed along the y-direction should be separated from each other is specified by the above Equation 36. The two detection points for detecting the speed of the measuring object along the x-direction in this embodiment have a similar condition that the detection points should be separated from each other. The conditional equation, as is not case with the above Equation 36, is caused by the setting angles of the diffraction gratings 18a, 18b, 18c and 18d, the distance between the measuring object 13 and the LD 1, the distance between the LD 1 and the diffraction grating 3, and the setting angles of the diffraction gratings 3a and 3b. The derivation of the conditional equation is omitted here. The condition is similarly required for the following embodiments, but the description thereof will be omitted for the following embodiments.

Although the −first order diffracted light 8b of the diffraction grating 3b passes through the ¼ wavelength plate 16 in the first embodiment and this modified example, only one of the +first order diffracted light 7a of the diffraction grating 3a, the −first order diffracted light 7b of the diffraction grating 3a and the +first order diffracted light 8a of the diffraction grating 3b may pass through the ¼ wavelength plate. That is, a first phase changing part which is arranged so as for the +first order diffracted light 7a of the diffraction grating 3a to pass through, and which changes the phase of the +first order diffracted light 7a, a second phase changing part which is arranged so as for the −first order diffracted light 7b of the diffraction grating 3a to pass through, and which changes the phase of the −first order diffracted light 7b, and a third phase changing part which is arranged so as for the +first order diffracted light 8a of the diffraction gratings 3b to pass through, and which changes the phase of the +first order diffracted light 8a may be provided.

In the first embodiment and this modified example, a fourth plane which includes the optical axes of the two luminous fluxes 7c and 7e incident on the detection point 14c, a fifth plane which includes the optical axes of the two luminous fluxes 8c and 8e incident on the detection point 14d, and a sixth plane (n) which includes the xy-plane may be arranged to form an isosceles triangular prism, the incident angles of the luminous fluxes 7c and 7e on the sixth plane may be approximately equal, and the incident angles of the luminous fluxes 8c and 8e on the sixth plane may be approximately equal. In this case, the error in the velocities detected at both detection points 14c and 14d is minimized even when it is impossible to detect a signal from either of the detection points 14c and 14d due to dropout. This setting may be employed for the following embodiments.

(Fourth Embodiment)

Figure 11:
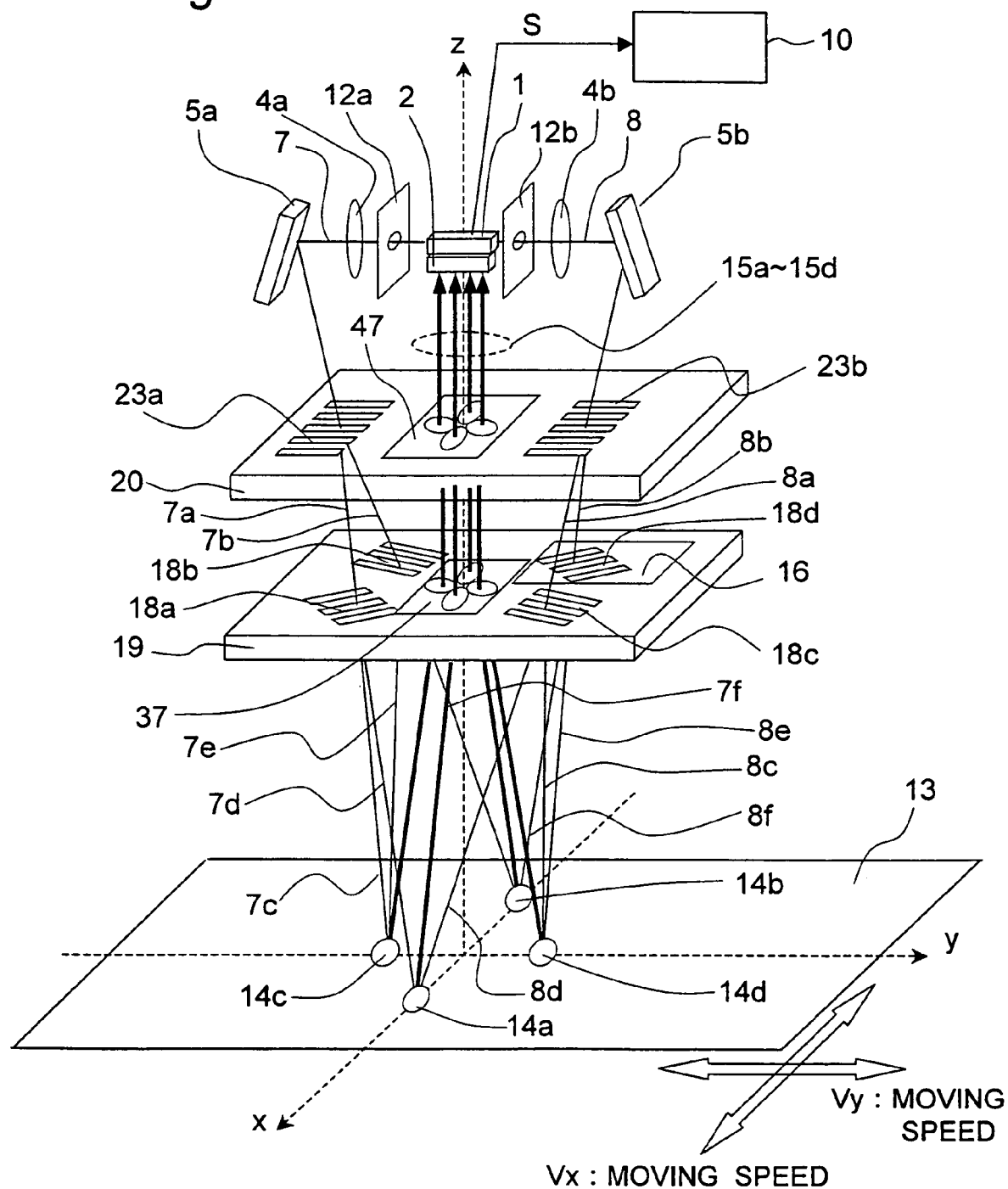
FIG. 11 is a schematic structural diagram of the velocimeter in the fourth embodiment of the present invention.

FIG. 11 is a schematic structural diagram of the velocimeter in the fourth embodiment of the present invention. FIG. 11 shows only the arrangement of components such as respective optical components and omits other components such as holding the respective optical components. The arrow shown as a broken line in FIG. 11 denotes the coordinate axis. In FIG. 11, the components identical to the components shown in FIG. 1 and FIG. 10 have the same reference numerals assigned as in FIG. 1 and FIG. 10.

The velocimeter in FIG. 11 is provided with an LD 1, a PD 2, CLs 4a and 4b, mirrors 5a and 5b, a signal processing circuit part 10, apertures 12a and 12b, a first board 19 and a second board 20.

On the first board 19, there are provided a ¼ wavelength plate 16, diffraction gratings 18a, 18b, 18c and 18d, and a condenser lens array 37 as an example of a condenser lens. The ¼ wavelength plate 16 is arranged on the diffraction grating 18d. On the second board 20, there are provided diffraction gratings 23a and 23b, and a condenser lens array 47 as an example of a condenser lens.

The LD 1 is arranged at a coordinate point $(0, 0, z_1)$, the PD 2 at $(0, 0, z_2)$, the CLs 4a and 4b at $(0, \pm y_4, z_1)$, the mirrors 5a and 5b at $(0, \pm y_5, z_1)$, the apertures 12a and 12b $(0, \pm y_{12}, z_1)$, the first base 19 at $(0, 0, z_{16})$, the second base 20 $(0, 0, z_3)$, the diffraction gratings 23a and 23b at $(0, \pm y_3, z_3)$, the condenser lens array 37 at $(0, 0, z_{16})$, and the condenser lens array 47 at $(0, 0, z_3)$ In FIG. 11, 7 denotes a first luminous flux, 7a and 7b ±first order diffracted lights by the diffraction grating 23a, 7c and 7d luminous fluxes obtained by splitting the +first order diffracted light 7a by the diffraction gratings 18a, 7e and 7f luminous fluxes obtained by splitting the −first order diffracted light 7b by the diffraction gratings 18b, 8 a second luminous flux, 8a and 8b ±first order diffracted lights by the diffraction grating 3b, 8c and 8d luminous fluxes obtained by splitting the +first order diffracted light 8a by the diffraction gratings 18c, 8e and 8f luminous fluxes obtained by splitting the −first order diffracted light 8d by the diffraction gratings 18d, 13 a measuring object, 14a, 14b, 14c and 14d detection points (beam overlapping areas), and 15a, 15b, 15c and 15d beat signals. The surface of the measuring object 13 onto which the luminous fluxes 7c, . . . , 7f and the luminous fluxes 8c, . . . , 8f are irradiated approximately corresponds to the xy-plane.

The signal processing circuit part 10 calculates the frequency shift quantities contained in the scattered lights generated at the respective detection points 14a, 14b, 14c and 14d based on output S from the PD2.

In the velocimeter in this embodiment shown in FIG. 11, the mirrors 5a and 5b which reflect the first luminous flux 7 and the second luminous flux 8 emitted from the both end faces of the LD 1 and the second base 20 are added to the velocimeter without the diffraction gratings 3a and 3b, as compared with the velocimeter shown in FIG. 10. The diffraction gratings 23a and 23b are formed on the same second base 20 in one body. That is, the diffraction gratings 23a and 23b are built on the second base 20. The second base 20 is arranged in parallel with the first base 19.

In the velocimeter of this embodiment, the principle and so on for detecting the moving speed and moving direction of the measuring object 13 are the same as those employed in the first and the second embodiments. In the velocimeter of this embodiment, all the luminous flux-dividing elements are arranged on a plate, so that positional shift and angular shift and so on caused by the arrangement of the diffraction gratings 23a and 23b are prevented. Furthermore, for example, when the first board 19 and the second board 20 are made of plate glass, installation error and so on caused by incorporating a luminous flux dividing element in a housing are considerably reduced. Thus, the velocimeter of this embodiment, regarding the installation of the respective optical components, considerably reduces failure in the overlap of luminous fluxes caused by the installation error at the detection points 14a, 14b, 14c and 14d and the manufacturing yield in the assembling process is considerably improved.

Figure 12:
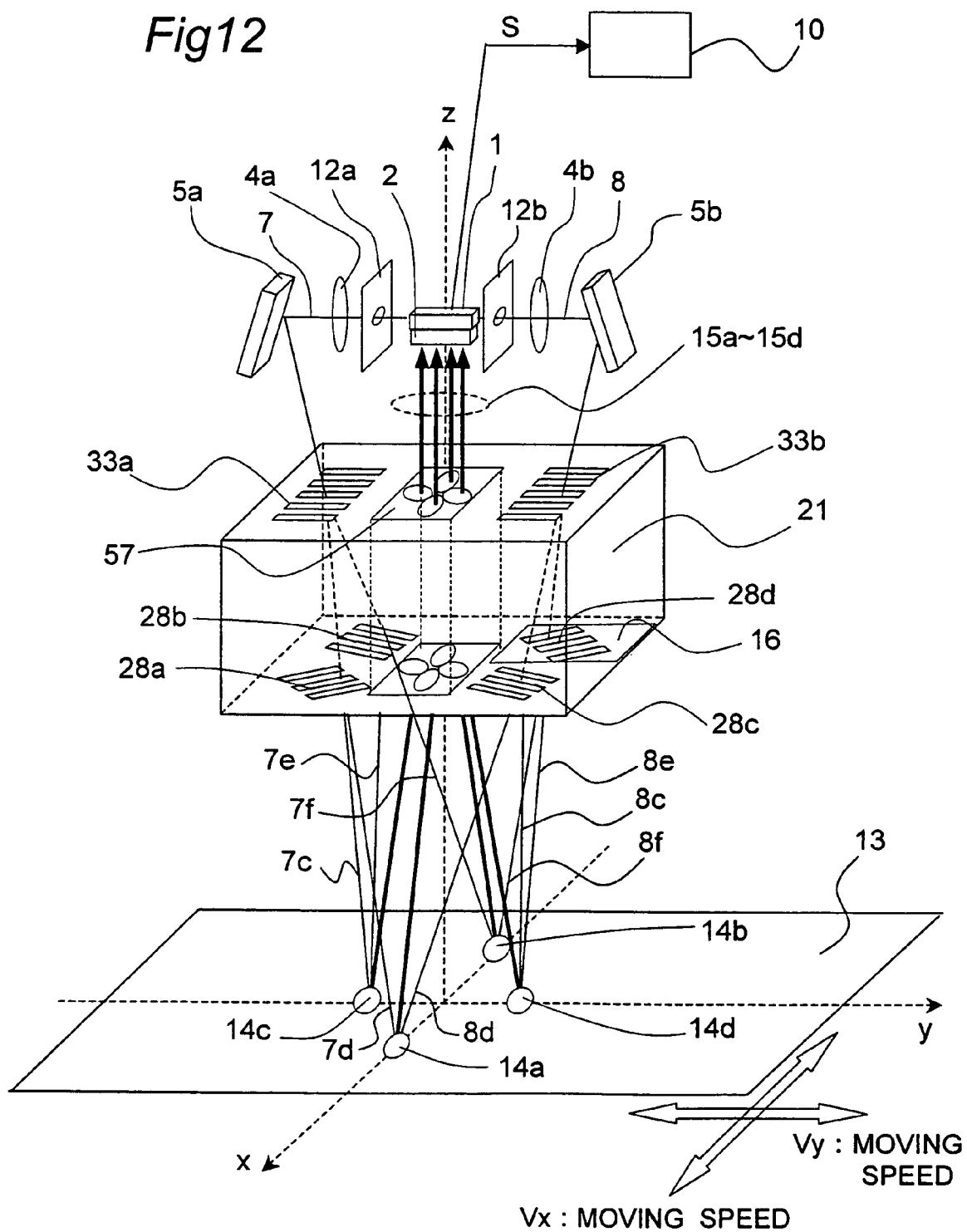
FIG. 12 is a schematic structural diagram of a modified example of the velocimeter of the fourth embodiment.

FIG. 12 is a schematic structural diagram of a modified example of the velocimeter in this embodiment. FIG. 12 shows only the arrangement of components such as respective optical components and omits other components such as holding the respective optical components. The arrow shown as a broken line in FIG. 12 denotes the coordinate axis. In FIG. 12, the components identical to the components shown in FIG. 11 have the same reference numerals assigned as in FIG. 11.

The velocimeter in FIG. 12 is provided with an integrated body of the first board 19 and the second board 20 of the velocimeter in FIG. 11. That is, the velocimeter in FIG. 12 is provided with an optical block 21 instead of the first board 19 and the second board 20. This optical block 21 splits respective luminous fluxes. On the upper surface of the optical block 21, diffraction gratings 33a and 33b are formed and on the lower surface of the optical block 21, diffraction gratings 28a, 28b, 28c and 28d are formed. Near the center of the optical block 21, a condenser lens array 57 for leading beat signals 15a, 15b, 15c and 15d to a PD 2 is formed so as to penetrate from the upper surface through the optical block to the lower surface. The condenser lens array 57 is an example of a condenser lens. On a part of the lower surface, a ¼ wavelength plate 16 is arranged so as to cover the diffraction grating 28d. The thickness of the optical block 21 may be set arbitrarily. This structure allows the moving speed and moving direction of the measuring object 13 to be detected. The principle for detecting the moving speed and moving direction of the measuring object 13 is similar to the principle employed in the third embodiment and the modified example thereof.

In the velocimeter in FIG. 12, as compared with the velocimeter in FIG. 11, since the first board 19 and the second board 20 of this embodiment are integrated into one body, the assembling processes causing installation error is reduced and consequently, the manufacturing yield in the device assembling process is improved.

Although the −first order diffracted light 8b of the diffraction gratings 23b and 33b pass through the ¼ wavelength plate 16 in the fourth embodiment and this modified example, only one of the +first order diffracted light 7a of the diffraction gratings 23a and 33a, the −first order diffracted light 7b of the diffraction gratings 23a and 33a and +first order diffracted light 8a of the diffraction gratings 23b and 33b may pass through the ¼ wavelength plate. That is, a first phase changing part which is arranged so as for the +first order diffracted light 7a of the diffraction gratings 23a and 33a to pass through, and which changes the phase of the +first order diffracted light 7a, a second phase changing part which is arranged so as for the −first order diffracted light 7b of the diffraction gratings 23a and 33a to pass through, and which changes the phase of the −first order diffracted light 7b, and a third phase changing part which is arranged so as for the +first order diffracted light 8a of the diffraction gratings 23b and 33b to pass through, and which changes the phase of the +first order diffracted light 8a may be provided.

(Fifth Embodiment)

Figure 13:
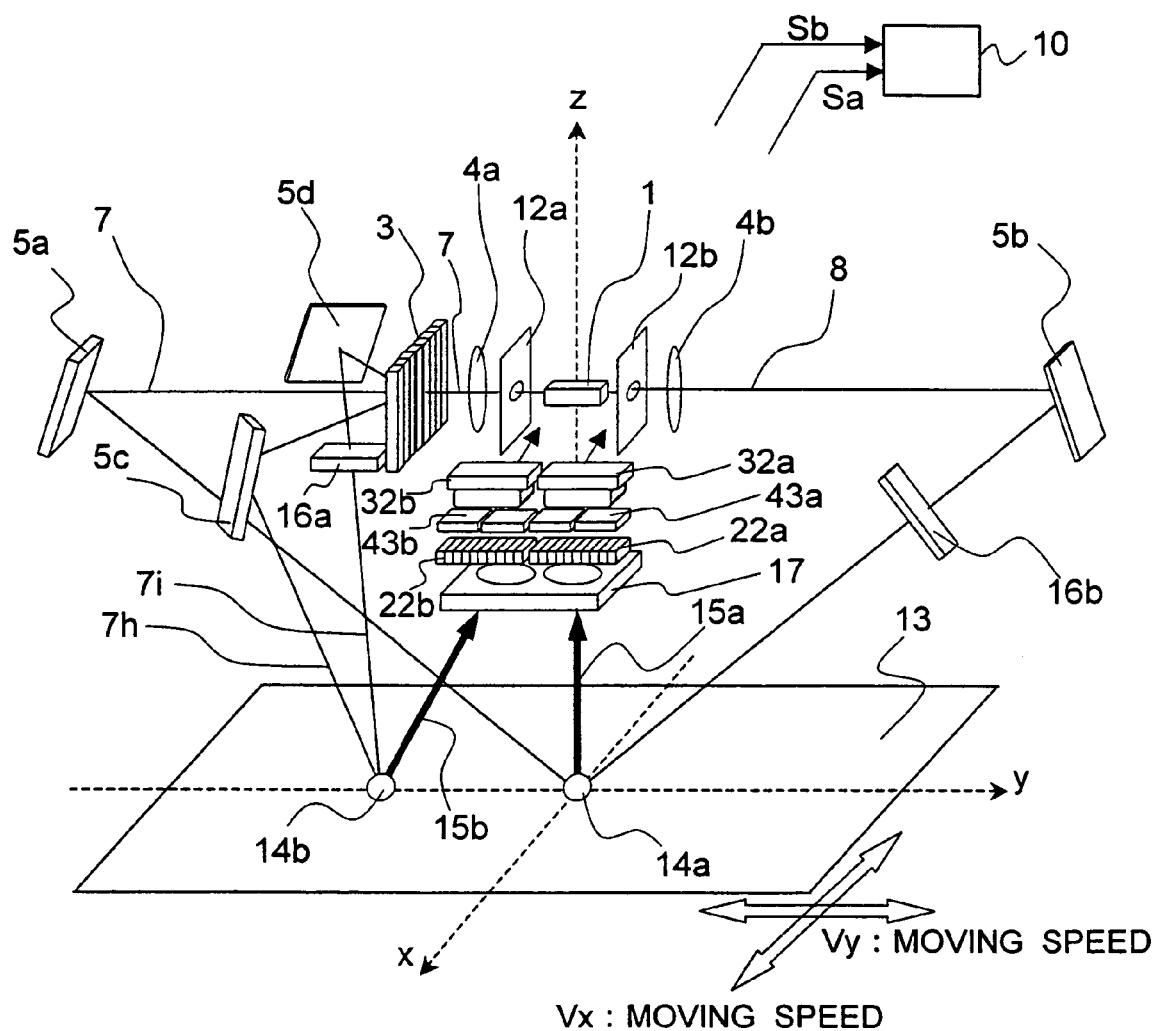
FIG. 13 is a schematic structural diagram of the velocimeter in the fifth embodiment of the present invention.

FIG. 13 is a schematic structural diagram of the velocimeter in the fifth embodiment of the present invention. FIG. 13 shows only the arrangement of components such as respective optical components and omits other components such as holding the respective optical components. The arrow shown as a broken line in FIG. 13 denotes the coordinate axis. In FIG. 13, the components identical to the components shown in FIG. 5 and FIG. 12 have the same reference numerals assigned as in FIG. 5 and FIG. 12.

The velocimeter in FIG. 13 is provided with an LD 1, PDs 32a and 32b, a diffraction grating 3, CLs 4a and 4b, mirrors 5a, 5c and 5d as examples of first optical axis changing parts, a mirror 5b as an example of second optical axis changing part, a signal processing circuit part 10, apertures 12a and 12b, ¼ wavelength plates 16a and 16b and a condenser lens array 17. Between the condenser lens array 17 and the PD 32a, a diffraction grating 22a and a linear polarizer 43a are arranged, and between the condenser lens array 17 and the PD 32b, a diffraction grating 22b and a linear polarizer 43b are arranged.

The LD 1 is arranged at a coordinate point $(0, 0, z_1)$, the PD 32a at $(0, 0, z_2)$, PD 32b at $(0, -y_2, z_2)$, the diffraction grating 3 at $(0, -y_3, z_1)$, the CLs 4a and 4b at $(0, \pm y_4, z_1)$, the mirrors 5a and 5b at $(0, \pm y_5, z_1)$, the apertures 12a and 12b at $(0, \pm y_{12}, z_1)$, the ¼ wavelength plate 16a at $(0, -y_{16a}, z_{16a})$ and the ¼ wavelength plate 16b at $(-x_{16}, y_{16b}, z_{16b})$, the condenser lens array 17 at $(0, -y_{17}, z_{17})$, the diffraction grating 22a at $(0, 0, z_{22})$, the diffraction grating 22b at $(0, -y_{22}, z_{22})$, the linear polarizer 43a at $(0, 0, z_{23})$, and the linear polarizer 43b at $(0, -y_{23}, z_{23})$.

In FIG. 13, 7 denotes a first luminous flux, 7g zero order diffracted light of the diffraction grating 3, 7h first order diffracted light of the diffraction grating 3, 7i −first order diffracted light of the diffraction grating 3, 8 a second luminous flux, 13 a measuring object, 14a and 14b detection points (beam overlapping areas), and 15a and 15b beat signals. The detection point 14a is formed at the origin (0, 0, 0) whereas the detection point 14b is formed at $(0, -y_{14}, 0)$. The surface of the measuring object 13 approximately corresponds to the xy-plane.

The signal processing circuit part 10 calculates the frequency shift quantity contained in the scattered light generated at the detection point 14a based on output $S_a$ from the PD 32a, and calculates the frequency shift quantity contained in the scattered light generated at the detection point 14b based on an output $S_b$ from the PD 32b.

Hereinafter, the structure and functions of the optical system in FIG. 13 will be described.

The first luminous flux 7 is emitted from the front end face of the LD 1 and the second luminous flux 8 is emitted from the rear end face of the LD 1. The first luminous flux 7 and the second luminous flux 8 become a parallel luminous flux by passing the CLs 4a and 4b, and the apertures 12a and 12b. After that, the second luminous flux 8 is reflected by the mirror 5b, converted into circularly polarized light through the ¼ wavelength plate 16, and made incident on the detection point 14a. On the other hand, the first luminous flux 7 is split into a plurality of ±n order diffracted lights by the diffraction grating 3 (n represents a natural number, including zero) (FIG. 13 shows only the zero order diffracted light 7g and the ±first order diffracted lights 7h and 7i by the diffraction grating 3). Since the diffraction grating 3 is arranged at positions perpendicular to the optical axis of the first luminous flux 7, the zero order diffracted light 7g is emitted from the diffraction grating 3 coaxially with the optical axis of the first luminous flux 7 emitted from the LD 1. The zero order diffracted light 7g is reflected by the mirror 5a and made incident on the detection point 14a. The zero order diffracted light 7g and the second luminous flux 8 are overlapped each other at the detection point 14a. That is, the detection point 14a is formed by the zero order diffracted light 7g and the second luminous flux 8.

Since the groove of the diffraction grating 3 is arranged in parallel with the z-axis, the ±first order diffracted lights 7h and 7i thereof are emitted in a plane being parallel with the xy-plane at the identical radiation angle. That is, the plane which includes the ±first order diffracted lights 7h and 7i is parallel with the xy-plane. After the ±first order diffracted lights 7h and 7i are equiangularly reflected by the mirrors 5c and 5d, the +first order diffracted light 7i is made incident on the detection point 14b whereas the −first order diffracted light 7d is converted into circularly polarized light through the ¼ wavelength plate 16a, and made incident on the detection point 14b. At the detection point 14b, the +first order diffracted light 7h and the −first order diffracted light 7i are overlapped each other. That is, the detection point 14b is formed by +first order diffracted light 7h and the −first order diffracted light 7i.

Thus, the intended second detection point is formed by using the diffraction grating 3 which is a transmission type, as a means for dividing a luminous flux. The conditions for the installation of the respective optical components regarding the two luminous fluxes incident on the detection point 14a are similar to the conditions employed in the first embodiment, and the description thereof will be omitted hereinafter.

The plain which includes the ±first order diffracted lights 7h and 7i diffracted by the diffraction grating 3, which is parallel with the xy-plane as described above, and the ±first order diffracted lights 7h and 7i are the reflected by the mirrors 5c and 5d and made incident on the detection point 14b at the identical incident angle. In this case, the plain which includes the two luminous fluxes incident on the detection point 14a is perpendicular to the plane which includes the two luminous fluxes incident on the detection point 14b. In this case, both of the planes are perpendicular to the plane which includes the surface of the measuring object 13 (the surface on which the detection points 14a and 14b are formed). The detection point 14b formed by the ±first order diffracted lights 7h and 7i exists on the y-axis, and the interferential fringes formed at detection point 14b is perpendicular to the x-axis. As a result, the moving speed of the measuring object 13 in the x-axis direction is precisely detected.

Figure 14:
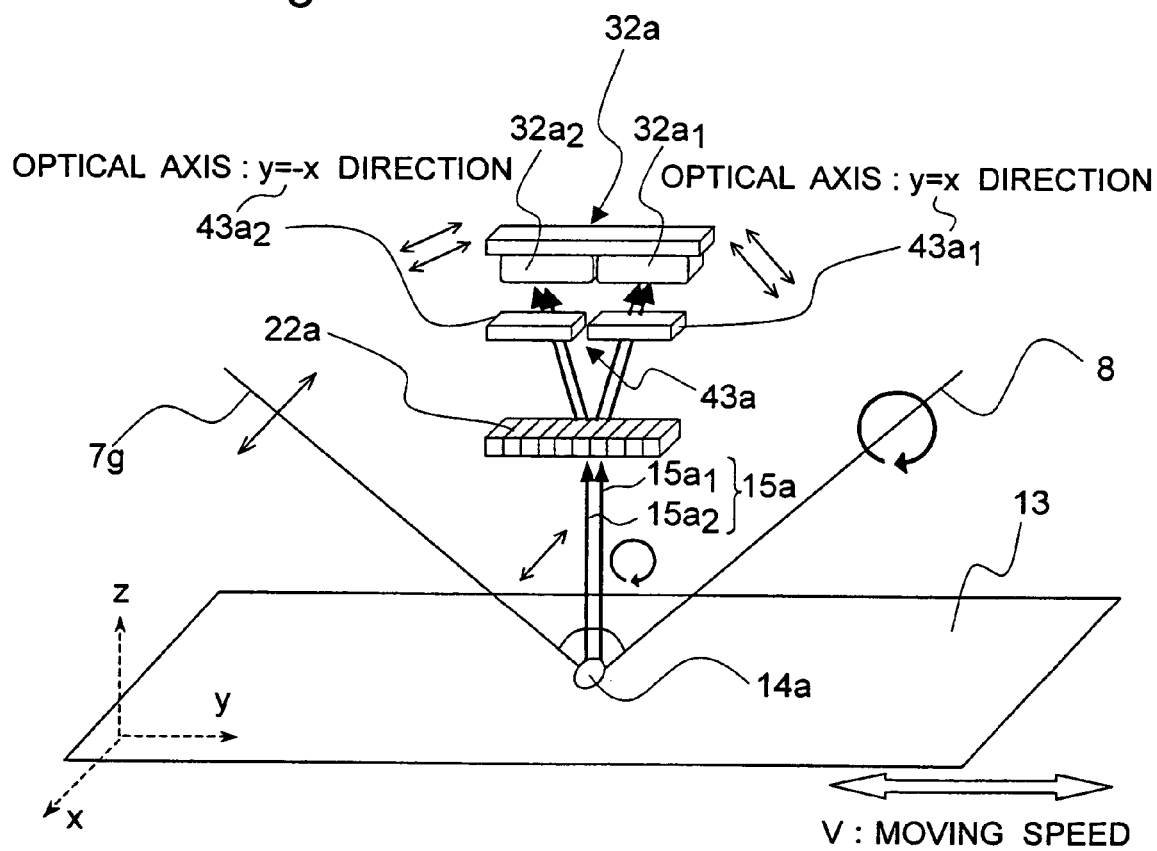
FIG. 14 is an enlarged view of an area adjacent to the detection point and the light reception system of FIG. 13.
Figure 15:
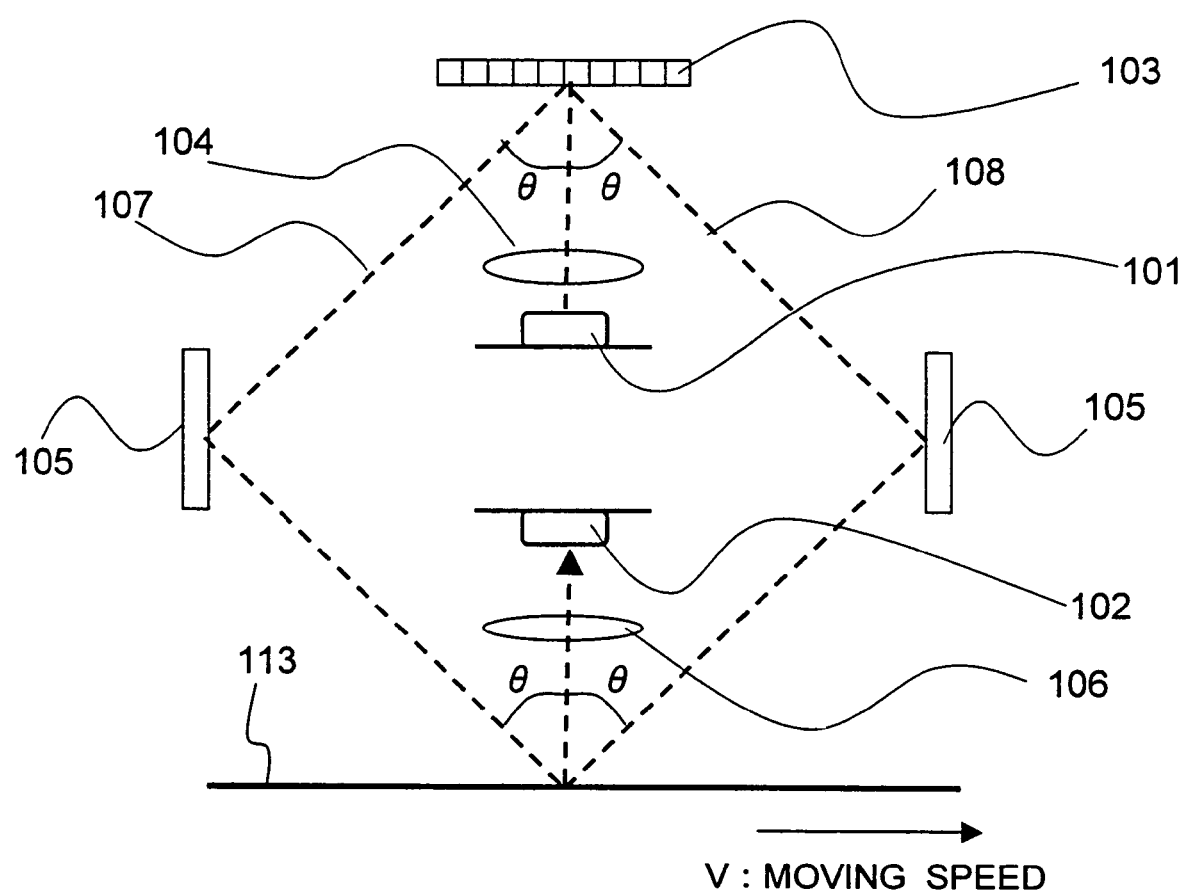
FIG. 15 is a schematic structural diagram of a substantial part of a conventional LDV.
Figure 16:
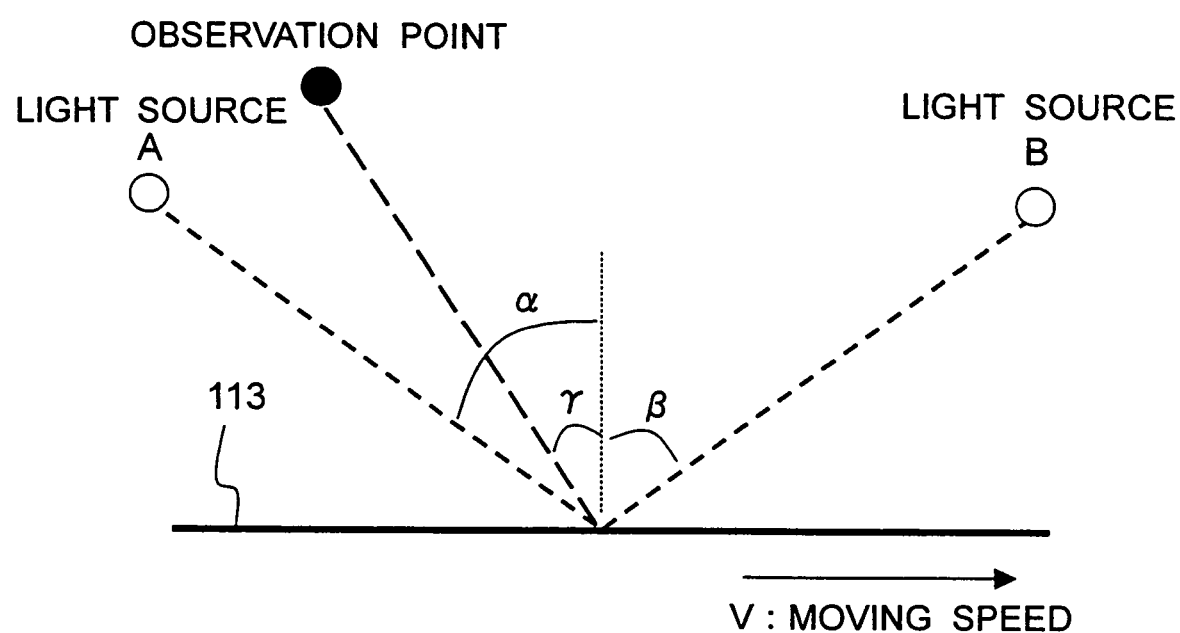
FIG. 16 is an enlarged view of an area adjacent to a detection point of the conventional LDV where luminous fluxes overlap.

FIG. 14 shows an enlarged view of an area adjacent to the detection point 14a and to the light reception system of FIG. 13. Note that FIG. 14 shows only the ±first order diffracted lights as diffracted light by the diffraction grating 22a and does not show other diffracted lights by the diffraction grating 22a. The illustration of the condenser lens array 17 is also omitted. FIG. 14 only shows the detection point 14a; however, the beat signal 15a and the beat signal 15b, which are different in terms of the incident angle on the condenser lens array 17, may be dealt with under the same conditions except that point. Therefore, the description is given only for the beat signal 15a from the detection point 14a, and the description will be omitted for the beat signal 15b from the detection point 14b.

One of the two luminous fluxes incident on the detection point 14a, which passes through the ¼ wavelength plate 16, is converted to circularly polarized light. The two luminous fluxes are scattered on the surface of the measuring object 13, and become the beat signal 15a to be incident on the diffraction grating 22a. The diffraction grating 22a is preferably arranged so that with respect to the wavelength of incident light, the quantity of the zero order diffracted light and the quantities of ±(m) order diffracted lights (m>1) are considerably smaller than the ±first order diffracted lights. Also, the groove of the diffraction grating 22a is preferably formed to extend in parallel with the x-axis.

The beat signal 15a diffracted by the diffraction grating 22a is allowed to transmit only of a component in a specified direction by the linear polarizer 43a. The linear polarizer 43a is composed of a linearly polarizing part $43a_1$ which lets the +first order diffracted light diffracted by the diffraction grating 22a pass through, and a linearly polarizing part $43a_2$ which lets the −first order diffracted light diffracted by the diffraction grating 22a pass through. The optical axes of these linear polarizers are arranged in the mutually orthogonal directions. The linear polarizer 43b (not shown) is also composed of a linearly polarizing part which lets the +first order diffracted light diffracted by the diffraction grating 22b pass through, and a linearly polarizing part which lets the −first order diffracted light diffracted by the diffraction grating 22b pass through.

One example of a setting of an optical axis in this embodiment is described here. The light emitted from the LD 1 is set linear polarized light oscillating in parallel with the x-axis. In this case, the optical axis of the ¼ wavelength plate 16 is arranged in an angle of 45° to the xy-plane. For example, the ¼ wavelength plate 16b is arranged so that the fast phase axis exists on the line y=x and the slow phase axis exists on the line y=−x. In this case, the optical axes of the linearly polarizing parts $43a_1$ and $43a_2$ are respectively set either in the y=x direction or in the y=−x direction. In FIG. 14, the optical axis of the linearly polarizing part $43a_1$ is set in the y=x axis direction and the optical axis of the linearly polarizing part $43a_2$ is set in the y=−x axis direction.

Since the optical axes are thus arranged, the component which transmits through the linearly polarizing part $43a_1$ becomes the linear polarized light of the zero order diffracted light 7g, and the fast phase axis component of circularly polarized light. The component which transmits through the linearly polarizing part $43a_2$ becomes the linear polarized light of the zero order diffracted light 7g, and the slow phase axis component of circularly polarized light. A first signal $15a_1$ contained in the beat signal 15a is detected in a first light-receiving part $32a_1$ and a second signal $15a_2$ contained in the beat signal 15a is detected in a second light-receiving part 32a₂. Since these signals contain phase information, the moving direction of the measuring object 13 along the y-direction is detected based on the principle described in the second embodiment. As described above, the description is omitted for detecting the moving speed and moving direction of the measuring object 13 using the detection point 14b; however, the moving speed and moving direction of the measuring object 13 corresponding to the x-direction are detected by receiving the beat signal 15b from the detection point 14b in the PD 32b. Although not shown, the PD 32b is provided with a first light-receiving part for detecting a first signal contained in the beat signal 15b and a second light-receiving part for detecting a second signal contained in the beat signal 15b.

When both of the first and the second phase changing means (the ¼ wavelength plates 16a and 16b) are arranged, two-dimensional moving speed and moving direction are detected; however, either of the first and the second phase changing means may be arranged as usage of the velocimeter.

In this embodiment, the light quantity of the zero order diffracted light by the diffraction grating 3 and the light quantity of the second luminous flux 8 are preferably equalized so as to detect the beat signal of the detection point 14a precisely. In this embodiment, since the difference between the first luminous flux 7 and the second luminous flux 8 emitted from the LD 1 in light quantity is required, treatment is performed on both end faces of the LD 1 so that this difference is generated.

In the optical system of this embodiment, moving direction is detected by dividing a beat signal by the diffraction grating from one detection point. Therefore, the above Equation 36 becomes as follows:

$$\phi_{1a}=\phi_{1b}, \phi_{2a}=\phi_{2b} \quad (39)$$

Consequently, the phase difference of the respective luminous fluxes is always indicated by the following equation:

$$\text{phase difference of beat signals}=\phi_0(=\pi/2) \quad (40)$$

And the setting accuracy of the respective optical components is greatly improved as compared with the optical systems in the second to the fourth embodiments.

In the above first to fifth embodiments, the LD 1 may be a single chip having a plurality of emission points, for example, a monolithic type laser diode, which is a light source emitting a plurality of luminous fluxes from one side surface. However, the first luminous flux 7 emitted from the front end face of the LD 1 and the second luminous flux 8 is emitted from the rear end face of the LD 1 are employed for sensing speed in the present invention. The light quantity monitoring for stabilizing the light intensity of the LD 1 is performed, for example, by a photodetector (not shown) which is arranged to monitor the light quantity cut by the apertures 12a and 12b. This structure allows the energy of light emitted from the LD 1 to be utilized most efficiently for sensing speed, and sufficient output from the beat signal 15 to be obtained without making the LD 1 higher-powered.

In the above first to fifth embodiments, the PD2, 2a, 2b, 32a and 32b may be a photodetector with a built-in circuit. That is, the PD 2, 2a, 2b, 32a and 32b may incorporate a signal processing circuit. By conducting signal processing such as amplification, waveform shaping and frequency counting for output from the PD2, 2a, 2b, 32a and 32b in the same chip, as compared with the case in which these ICs are separately structured, the number of components is reduced so that the device size is miniaturized, as well as electromagnetic noise and so on from the wire and so on connecting respective components are reduced and consequently, the moving speed of the measuring object 13 is also detected highly precisely.

Although the x-axis and the y-axis intersect at an angle of 90° in the first to fifth embodiments, the x-axis and the y-axis may intersect at an angle of other than 90°.

The Laser Doppler Velocimeter in the above first to fifth embodiments, which detects the moving speed of the measuring object 13, easily converts speed information to displacement amount by incorporating time information of the measuring object in a signal process on a subsequent stage. For popularized electronic devices, for example, the LDV is applicable to displacement meters for detecting sheet feeding amount of printers and copiers. Specifically, since the interference fringe interval of the LDV is generally on a level of a few μm, it is possible to improve the resolution as a displacement meter up to a level of μm, and to further improve the resolution up to a level of submicron by electrical signal processing. Furthermore, since the LDV detects speed by reflected light from a moving object with the result that an measuring object does not need specific processing, the LDV is best suited for the application as a high-resolution encoder. Optical mice, which have been popularized, recognize movement information of a speckle pattern as picture by CCD (Charge Coupled Device) to detect shift amount, and it is possible for this velocimeter to be applied to optical mice. Thus, the velocimeters in all these embodiments are applicable to displacement meters and vibrometers for detecting displacement. That is, position information of a measuring object may be obtained based on the speed information and time information of the measuring object using a displacement meter provided with the abovementioned velocimeter. In addition, information regarding vibration of a measuring object may be obtained based on the speed information and time information of the measuring object using a vibrometer provided with the abovementioned velocimeter. Here, "information regarding vibration" means amplitude, frequency and phase and so on of vibration.

Either one of a velocimeter, displacement meter and vibrometer may be provided for electronic equipment.

It is also possible for the velocimeter of the present invention to be employed for displacement information detectors for calculating displacement information based on the speed information and time information of a measuring object.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A velocimeter comprising:
   a semiconductor light-emitting diode emitting a plurality of luminous fluxes;
   an optical axis changing part which is arranged along an optical path of the luminous flux from the semiconductor light-emitting diode to a measuring object, so as to change a direction of an optical axis of at least one luminous flux of the plurality of luminous fluxes;
   a photodetector for receiving scattered light by the measuring object; and
   a signal processing circuit part for calculating frequency shift quantity of the scattered light based on output from the photodetector, wherein at least one luminous flux of the plurality of luminous fluxes is irradiated onto a surface of the measuring object so as to form at least one detection point on the surface of the measuring object.

2. The velocimeter as set forth in claim 1, wherein
one luminous flux of the plurality of luminous fluxes is a first luminous flux which is emitted from a front end face of the semiconductor light-emitting diode, and
another luminous flux of the plurality of luminous fluxes is a second luminous flux which is emitted from a rear end face of the semiconductor light-emitting diode.

3. The velocimeter as set forth in claim 2, wherein
the first luminous flux and the second luminous flux overlap each other on the surface of the measuring object.

4. The velocimeter as set forth in claim 2, wherein
the optical axis changing part is provided with a first optical axis changing part and a second optical axis changing part,
directions in which the semiconductor light-emitting diode emits the first luminous flux and the second luminous flux are in general parallel with the surface of the measuring object,
a direction of an optical axis of the first luminous flux is changed by the first optical axis changing part and a direction of an optical axis of the second luminous flux is changed by the second optical axis changing part; and
an angle regarding the directional change of the optical axis of the first luminous flux by the first optical axis changing part and an angle regarding the directional change of the optical axis of the second luminous flux by the second optical axis changing part are approximately equal.

5. The velocimeter as set forth in claim 4, wherein
the optical axes of the first luminous flux and the second luminous flux before passing through the first optical axis changing part and the second optical axis changing part, and the optical axes of the first luminous flux and the second luminous flux after passing through the first optical axis changing part and the second optical axis changing part are contained in the same plane.

6. The velocimeter as set forth in claim 5, wherein
the plane which contains the optical axes of the first luminous flux and the second luminous flux is generally perpendicular to the surface of the measuring object.

7. The velocimeter as set forth in claim 2, wherein
the directions in which the semiconductor light-emitting diode emits the first luminous flux and the second luminous flux are in general parallel with a direction in which the measuring object moves.

8. The velocimeter as set forth in claim 4, wherein
the semiconductor light-emitting diode is arranged at an approximate middle point between the first optical axis changing part and the second optical axis changing part.

9. The velocimeter as set forth in claim 2, wherein
processing is applied on an end face of the semiconductor light-emitting diode so as to approximately equalize light quantities of a plurality of luminous fluxes incident on the respective detection points.

10. The velocimeter as set forth in claim 1, wherein
when an axis perpendicular to the surface of the measuring object is set as a z-axis, the z-axial length of an area where a plurality of luminous fluxes incident on the detection point overlap each other is longer than the z-axial length of an area where the surface of the measuring object is located.

11. The velocimeter as set forth in claim 1, wherein
an optical axis of light incident from a detection point on the photodetector is located generally within a plane which bisects an angle made between two luminous fluxes incident on the detection point.

12. The velocimeter as set forth in claim 1, wherein
an optical axis of light incident from the detection point on the photodetector and optical axes of the two luminous fluxes incident on a detection point are contained in the same plane.

13. The velocimeter as set forth in claim 1, wherein
the semiconductor light-emitting diode and the photodetector share a same board to be integrated into one body.

14. The velocimeter as set forth in claim 1, wherein
the optical axis changing part changes the direction of the optical axis of at least one luminous flux of the plurality of luminous fluxes and branches the luminous flux; and
at least two detection points are formed on the surface of the measuring object using at least two luminous fluxes of the plurality of luminous fluxes.

15. The velocimeter as set forth in claim 14, wherein
one luminous flux of the plurality of luminous fluxes is the first luminous flux which is emitted from the front end face of the semiconductor light-emitting diode, another luminous flux of the plurality of luminous fluxes is the second luminous flux which is emitted from the rear end face of the semiconductor light-emitting diode, and the optical axis changing part is a diffraction grating.

16. The velocimeter as set forth in claim 15, wherein
quantity of zero order diffracted light of the diffraction grating is smaller than quantity of first order diffracted light thereof.

17. The velocimeter as set forth in claim 14, wherein:
one luminous flux of the plurality of luminous fluxes is the first luminous flux which is emitted from the front end face of the semiconductor light-emitting diode, and another luminous flux of the plurality of luminous fluxes is the second luminous flux which is emitted from the rear end face of the semiconductor light-emitting diode;
the optical axis changing part is provided with a first diffraction grating on which the first luminous flux is made incident and a second diffraction grating on which the second luminous flux is made incident;
a first detection point is formed using +first order diffracted light by the first diffraction grating and +first order diffracted light by the second diffraction grating; and
a second detection point is formed using −first order diffracted light by the first diffraction grating and −first order diffracted light by the second diffraction grating.

18. The velocimeter as set forth in claim 17, wherein
the +first order diffracted light by the first diffraction grating and the +first order diffracted light by the second diffraction grating overlap each other on the surface of the measuring object, and the −first order diffracted light by the first diffraction grating and the −first order diffracted light by the second diffraction grating overlap each other on the surface of the measuring object.

19. The velocimeter as set forth in claim 18, wherein
an area where the +first order diffracted light by the first diffraction grating and the +first order diffracted light by the second diffraction grating overlap each other is separated from an area where the −first order diffracted light by the first diffraction grating and the −first order diffracted light by the second diffraction grating overlap each other.

20. The velocimeter as set forth in claim 17, wherein directions in which the semiconductor light-emitting diode emits the first luminous flux and the second luminous flux are in general parallel with a direction in which the measuring object moves; and
a first plane which contains the +first order diffracted light by the first diffraction grating and the second diffraction grating, a second plane which contains the −first order diffracted light by the first diffraction grating and the second diffraction grating and a third plane which contains the surface of the measuring object form an isosceles triangular prism.

21. The velocimeter as set forth in claim 20, wherein an optical axis of light incident from the first detection point on the photodetector is contained in a plane which is regularly reflected from the first plane relative to the third plane, and
an optical axis of light incident from the second detection point on the photodetector is contained in a plane which is regularly reflected from the second plane relative to the third plane.

22. The velocimeter as set forth in claim 17, wherein a direction in which a line connecting the first detection point and the second detection point extends is perpendicular to a direction in which the measuring object moves.

23. The velocimeter as set forth in claim 17, wherein an optical axis of the luminous flux incident from the first detection point on the photodetector is located generally within a plane which bisects an angle made between an optical axis of the +first order diffracted light by the first diffraction grating and an optical axis of the +first order diffracted light by the second diffraction grating; and
an optical axis of the luminous flux incident from the second detection point on the photodetector is located generally within a plane which bisects an angle made between an optical axis of the −first order diffracted light by the first diffraction grating and an optical axis the of −first order diffracted light by the second diffraction grating.

24. The velocimeter as set forth in claim 17, comprising:
a phase changing part which is arranged so as for the −first order diffracted light by the second diffraction grating to pass through, for changing a phase of the −first order diffracted light of the second diffraction grating.

25. The velocimeter as set forth in claim 24, wherein when phase changing quantity of light by the phase changing part is set as $\phi_0$, the $\phi_0$ satisfies $0 < \phi_0 < \lambda/2$.

26. The velocimeter as set forth in claim 25, wherein the $\phi_0 = \lambda/4$.

27. The velocimeter as set forth in claim 26, wherein an absolute value of a difference between a phase difference of the respective luminous fluxes which form the first detection point and a phase difference of the respective luminous fluxes which form the second detection point is smaller than $\pi/2$.

28. The velocimeter as set forth in claim 24, wherein a birefringent material is employed for a material of the phase changing part.

29. The velocimeter as set forth in claim 28, wherein an absolute value of a difference between a phase difference of the respective luminous fluxes which form the first detection point and a phase difference of the respective luminous fluxes which form the second detection point is smaller than $\pi/2$.

30. The velocimeter as set forth in claim 17, comprising:
a first phase changing part which is arranged so as for the +first order diffracted light by the first diffraction grating to pass through, for changing a phase of the +first order diffracted light of the first diffraction grating;
a second phase changing part which is arranged so as for the −first order diffracted light by the first diffraction grating to pass through, for changing a phase of the −first order diffracted light of the first diffraction grating; and
a third phase changing part which is arranged so as for the +first order diffracted light by the second diffraction grating to pass through, for changing a phase of the +first order diffracted light of the second diffraction grating.

31. The velocimeter as set forth in claim 30, wherein when phase changing quantity of light by the phase changing part is set as $\phi_0$, the $\phi_0$ satisfies $0 < \phi_0 < \lambda/2$.

32. The velocimeter as set forth in claim 31, wherein the $\phi_0 = \lambda/4$.

33. The velocimeter as set forth in claim 30, wherein a birefringent material is employed for a material of the phase changing part.

34. The velocimeter as set forth in claim 14, wherein when an axis perpendicular to the surface of the measuring object is set as a z-axis, the z-axial length of an area where a plurality of luminous fluxes incident on the detection point overlap each other is longer than the z-axial length of an area where the surface of the measuring object is located.

35. The velocimeter as set forth in claim 14, comprising a condenser lens which is arranged between the detection point and the photodetector, and which is a single component made of a lens array.

36. The velocimeter as set forth in claim 14, wherein the photodetector is a one-chip element which receives scattered light from at least two of the detection points.

37. The velocimeter as set forth in claim 36, wherein the photodetector is a divided type photodiode.

38. The velocimeter as set forth in claim 17, wherein the semiconductor light-emitting diode is arranged at the approximate middle point between the first diffraction grating and the second diffraction grating.

39. The velocimeter as set forth in claim 1, wherein:
the semiconductor light-emitting diode emits the first luminous flux from the front end face thereof and emits the second luminous flux from the rear end face thereof;
the optical axis changing part is composed of a first optical branch device group for changing a direction of the optical axes of the first luminous flux and the second luminous flux, and for branching the first luminous flux and the second luminous flux, and a second optical branch device group which is arranged along a plurality of optical axes between the first optical branch device group and the measuring object, for changing a direction of the optical axes of a luminous flux from the first optical branch device group, and for branching a luminous flux from the first optical branch device group; and
a first detection point and a second detection point are formed at least along an x-axis of an x-axis and a y-axis which intersect on a plane containing the surface of the measuring object, a third detection point and a fourth detection point are formed at least along the y-axis by irradiating a plurality of luminous fluxes branched in the second optical branch device group onto the surface of the measuring object.

40. The velocimeter as set forth in claim 39, wherein the second optical branch device group contains a first beam splitter, a second beam splitter, a third beam splitter and fourth beam splitter.

41. The velocimeter as set forth in claim 39, wherein the second optical branch device group contains a third diffraction grating, a fourth diffraction grating, a fifth diffraction grating and a sixth diffraction grating.

42. The velocimeter as set forth in claim 41, wherein quantity of zero order diffracted light of the third diffraction grating, the fourth diffraction grating, the fifth diffraction grating and the sixth diffraction is smaller than quantity of first order diffracted light thereof.

43. The velocimeter as set forth in claim 39, wherein the second optical branch device group contains a first optical branch device, a second optical branch device, a third optical branch device and a fourth optical branch device;
one luminous flux branched by the first optical branch device and one luminous flux branched by the third optical branch device form the first detection point;
one luminous flux branched by the second optical branch device and one luminous flux branched by the fourth optical branch device form the second detection point;
another luminous flux branched by the first optical branch device and another luminous flux branched by the third optical branch device form the third detection point; and
another luminous flux branched by the third optical branch device and another luminous flux branched by the fourth optical branch device form the fourth detection point.

44. The velocimeter as set forth in claim 43, wherein the first detection point, the second detection point, the third detection point and the fourth detection point are formed by overlapping the luminous fluxes on each other on the surface of the measuring object.

45. The velocimeter as set forth in claim 39, wherein a first plane which contains two luminous fluxes incident on the first detection point, a second plane which contains two luminous fluxes incident on the second detection point, and a third plane which contains the surface of the measuring object form an isosceles triangular prism, and two luminous fluxes incident on the respective first and second detection points have an approximately identical angle relative to the third plane.

46. The velocimeter as set forth in claim 45, wherein an angle made between the fourth plane containing optical axes of two luminous fluxes incident on the third detection point and the third plane;
an angle made between the fifth plane containing optical axes of two luminous fluxes incident on the fourth detection point and the third plane are approximately equal; and
two luminous fluxes incident on the respective third and fourth detection points have an approximately identical angle relative to the third plane.

47. The velocimeter as set forth in claim 39, wherein the x-axis is orthogonal to the y-axis.

48. The velocimeter as set forth in claim 39, wherein an optical axis of the luminous flux incident from the respective first, second, third and fourth detection points on the photodetector is located generally within a plane which bisects an angle made between two luminous fluxes incident on the respective first, second, third and fourth detection points.

49. The velocimeter as set forth in claim 39, wherein when a z-axis is set perpendicularly to the x-axis and the y-axis, the z-axial length of an area where two luminous fluxes incident on the respective first, second, third and fourth detection points overlap each other is longer than the z-axial length of an area where the surface of the measuring object is located.

50. The velocimeter as set forth in claim 39, wherein:
the first optical branch device group contains a first diffraction grating and a second diffraction grating, and is provided with a phase changing part which is arranged so as for the −first order diffracted light by the second diffraction grating to pass through, for changing a phase of the −first order diffracted light of the second diffraction grating.

51. The velocimeter as set forth in claim 50, wherein plurality of devices contained by the second optical branch device group are formed on a same first board, and
the phase changing part is arranged on the first board.

52. The velocimeter as set forth in claim 51, wherein a condenser lens is arranged between the first, second, third and fourth detection points and the photodetector, and
the condenser lens is formed on the first board.

53. The velocimeter as set forth in claim 52, further comprising:
a first optical axis changing part which is arranged between the semiconductor light-emitting diode and the first optical branch device group, for changing a direction of the optical axis of the first luminous flux; and
a second optical axis changing part which is arranged between the semiconductor light-emitting diode and the first optical branch device group, for changing a direction of the optical axis of the second luminous flux, wherein
a plurality of devices contained by the first optical branch device group are formed on a same second board.

54. The velocimeter as set forth in claim 53, wherein the first board and the second board are arranged in parallel.

55. The velocimeter as set forth in claim 53, wherein the first board and the second board are contained in a same optical block.

56. The velocimeter as set forth in claim 53, wherein the semiconductor light-emitting diode is arranged at the approximate middle point between the first optical axis changing part and the second optical axis changing part.

57. The velocimeter as set forth in claim 39, wherein the first optical branch device group contains the first diffraction grating and the second diffraction grating, further comprising:
a first phase changing part which is arranged so as for the +first order diffracted light by the first diffraction grating to pass through, for changing the phase of the +first order diffracted light of the first diffraction grating;
a second phase changing part which is arranged so as for the −first order diffracted light by the first diffraction grating to pass through, for changing the phase of the −first order diffracted light of the first diffraction grating; and a third phase changing part which is arranged so as for the +first order diffracted light by the second diffraction grating to pass through, for changing the phase of the +first order diffracted light of the second diffraction grating.

58. The velocimeter as set forth in claim 57, wherein plurality of devices contained by the second optical branch device group are formed on a same first board, and the phase changing part is arranged on the first board.

59. The velocimeter as set forth in claim 58, wherein a condenser lens is arranged between the first, second, third and fourth detection points and the photodetector, and the condenser lens is formed on the first board.

60. The velocimeter as set forth in claim 59, further comprising:
a first optical axis changing part which is arranged between the semiconductor light-emitting diode and the first optical branch device group, for changing a direction of the optical axis of the first luminous flux; and
a second optical axis changing part which is arranged between the semiconductor light-emitting diode and the first optical branch device group, for changing a direction of the optical axis of the second luminous flux, wherein
a plurality of devices contained by the first optical branch device group are formed on a same second board.

61. The velocimeter as set forth in claim 60, wherein the first board and the second board are arranged in parallel.

62. The velocimeter as set forth in claim 60, wherein the first board and the second board are contained in a same optical block.

63. The velocimeter as set forth in claim 60, wherein the semiconductor light-emitting diode is arranged at the approximate middle point between the first optical axis changing part and the second optical axis changing part.

64. The velocimeter as set forth in claim 39, wherein a condenser lens is arranged between the first, second, third and fourth detection points and the photodetector, and the photodetector is a one-chip element which receives scattered light from at least the first, second, third and fourth detection points.

65. The velocimeter as set forth in claim 1, wherein a condenser lens is arranged between the detection point and the photodetector.

66. The velocimeter as set forth in claim 1, wherein an aperture is arranged between the semiconductor light-emitting diode and the optical axis changing part so as for at least one luminous flux of a plurality of luminous fluxes emitted from the semiconductor light-emitting diode to pass through.

67. The velocimeter as set forth in claim 1, wherein a lens group is arranged between the semiconductor light-emitting diode and the optical axis changing part so as for at least one luminous flux of a plurality of luminous fluxes emitted from the semiconductor light-emitting diode to pass through.

68. The velocimeter as set forth in claim 1, wherein the semiconductor light-emitting diode is a laser diode.

69. The velocimeter as set forth in claim 1, wherein the semiconductor light-emitting diode has a plurality of light emission points.

70. The velocimeter as set forth in claim 1, wherein the photodetector incorporates a signal processing circuit.

71. A displacement meter which is provided with the velocimeter as set forth in claim 1, for obtaining position information of the measuring object based on speed information and time information regarding the measuring object.

72. An electronic device provided with the displacement meter as set forth in claim 71.

73. A vibrometer which is provided with the velocimeter as set forth in claim 1, for obtaining information regarding vibration of the measuring object based on speed information and time information regarding the measuring object.

74. An electronic device provided with the vibrometer as set forth in claim 73.

75. A velocimeter comprising:
a semiconductor light-emitting diode for emitting a first luminous flux from a front end face of the semiconductor light-emitting diode and emitting a second luminous flux from a rear end face thereof;
an optical branch device for branching the first luminous flux;
a first detection system for irradiating at least one luminous flux of a plurality of luminous fluxes branched from the first luminous flux onto a first detection point on the surface of the measuring object, and irradiating at least two luminous fluxes of the plurality of luminous fluxes branched from the first luminous flux onto a second detection point on the surface of the measuring object;
a second detection system for irradiating a second luminous flux onto the first detection point;
a photodetector for receiving scattered light from the first detection point and the second detection point; and
a signal processing circuit part for calculating frequency shift quantity of the scattered light based on output from the photodetector.

76. The velocimeter as set forth in claim 75, wherein the first detection system contains a first optical axis changing part for changing directions of optical axes of plurality of luminous fluxes branched by the optical branch device; and
the second detection system contains a second optical axis changing part for changing a direction of optical axis of the second luminous flux.

77. The velocimeter as set forth in claim 75, wherein the optical branch device is a first diffraction grating.

78. The velocimeter as set forth in claim 77, wherein the second detection point is formed using ±first order diffracted lights by the first diffraction grating.

79. The velocimeter as set forth in claim 77, wherein light intensity of zero order diffracted light by the first diffraction grating and light intensity of the second luminous flux is approximately equal.

80. The velocimeter as set forth in claim 77, wherein:
directions in which the semiconductor light-emitting diode emits the first luminous flux and the second luminous flux are in general parallel with a plane which contains the surface of the measuring object;
an angle regarding a directional change of an optical axis of zero order diffracted light by the first diffraction grating in the first optical axis changing part is approximately equal to an angle regarding a directional change of an optical axis of the second luminous flux in the second optical axis changing part; and
an angle regarding a directional change of an optical axis of the +first order diffracted light by the first diffraction grating in the first optical axis changing part is approximately equal to an angle regarding a directional change of an optical axis of the −first order diffracted light by the first diffraction grating in the first optical axis changing part.

81. The velocimeter as set forth in claim 77, wherein:
directions in which the semiconductor light-emitting diode emits the first luminous flux and the second luminous flux are in general parallel with a plane which contains the surface of the measuring object;
a plane which contains optical axes of two luminous fluxes incident on the first detection point is perpendicular to a plane which contains the surface of the measuring object; and
a plane which contains optical axes of two luminous fluxes incident on the second detection point is perpendicular to a plane which contains the surface of the measuring object.

82. The velocimeter as set forth in claim 81, wherein:
the first detection point is located within a plane which contains optical axes of two luminous fluxes incident on the second detection point; and
the second detection point is located within a plane which contains optical axes of two luminous fluxes incident on the first detection point.

83. The velocimeter as set forth in claim 77, comprising:
a first phase changing part which is arranged along an optical path of a luminous flux which connects the first diffraction grating to the second detection point, for changing a phase of light incident on the second detection point;
a second diffraction grating for branching a luminous flux passing from the second detection point to the photodetector; and
a first linear polarizer group which is arranged along optical paths of a plurality of luminous fluxes branched by the second diffraction grating, wherein
a plurality of luminous fluxes passing through the first linear polarizer group are received by the photodetector.

84. The velocimeter as set forth in claim 77, wherein
the semiconductor light-emitting diode is arranged at the approximate middle point between the first optical axis changing part for changing an optical axis of zero order diffracted light by the first diffraction grating and the second optical axis changing part.

85. The velocimeter as set forth in claim 75, wherein
two luminous fluxes incident on the first detection point overlap each other on the surface of the measuring object, and two luminous fluxes incident on the second detection point overlap each other on the surface of the measuring object.

86. The velocimeter as set forth in claim 75, wherein:
an optical axis of light incident from the first detection point on the photodetector is located within a plane which bisects an angle made between two luminous fluxes incident on the first detection point; and
an optical axis of light incident from the second detection point on the photodetector is located within a plane which bisects an angle made between two luminous fluxes incident on the second detection point.

87. The velocimeter as set forth in claim 75, comprising:
a second phase changing part which is arranged along an optical path of a luminous flux which connects the semiconductor light-emitting diode to the first detection point, for changing a phase of light incident on the first detection point;
a third diffraction grating for branching a luminous flux passing from the first detection point to the photodetector; and
a second linear polarizer group which is arranged along optical paths of a plurality of luminous fluxes branched by the third diffraction grating, wherein
a plurality of luminous fluxes passing through the second linear polarizer group are received by the photodetector.

88. The velocimeter as set forth in claim 75, wherein:
when an axis perpendicular to the surface of the measuring object is set as a z-axis;
the z-axial length of an area where a plurality of luminous fluxes incident on the first detection point overlap is longer than the z-axial length of an area where the surface of the measuring object is located; and
the z-axial length of an area where a plurality of luminous fluxes incident on the second detection point is longer than the z-axial length of an area where the surface of the measuring object is located.

89. An electronic device comprising:
a velocimeter comprising:
a semiconductor light-emitting diode emitting a plurality of luminous fluxes;
an optical axis changing part which is arranged along an optical path of the luminous flux from the semiconductor light-emitting diode to a measuring object, so as to change a direction of an optical axis of at least one luminous flux of the plurality of luminous fluxes;
a photodetector for receiving scattered light by the measuring object; and
a signal processing circuit part for calculating frequency shift quantity of the scattered light based on output from the photodetector, wherein
at least one luminous flux of the plurality of luminous fluxes is irradiated onto a surface of the measuring object so as to form at least one detection point on the surface of the measuring object;
a displacement meter which obtains position information of the measuring object based on speed information and time information regarding the measuring object provided by the velocimeter; and
a vibrometer which obtains information regarding vibration of the measuring object based on speed information and time information regarding the measuring object provided by the velocimeter.

* * * * *